(12) United States Patent
Gagner et al.

(10) Patent No.: US 12,471,922 B2
(45) Date of Patent: Nov. 18, 2025

(54) MAGNETIC IMPLANTS HAVING THROUGH-HOLES FOR FORMING AN ANASTOMOSIS

(71) Applicant: GT METABOLIC SOLUTIONS, INC., San Jose, CA (US)

(72) Inventors: Michel Gagner, Montréal (CA); Todd A. Krinke, Buffalo, MN (US); Thierry Thaure, San Jose, CA (US)

(73) Assignee: GT METABOLIC SOLUTIONS, INC., San Jose, CA (US)

( * ) Notice: Subject to any disclaimer, the term of this patent is extended or adjusted under 35 U.S.C. 154(b) by 0 days.

(21) Appl. No.: 18/749,137

(22) Filed: Jun. 20, 2024

(65) Prior Publication Data

US 2024/0423623 A1    Dec. 26, 2024

Related U.S. Application Data

(60) Provisional application No. 63/509,446, filed on Jun. 21, 2023.

(51) Int. Cl.
| | | |
|---|---|---|
| *A61B 17/11* | (2006.01) | |
| *A61B 17/00* | (2006.01) | |
| *A61B 17/32* | (2006.01) | |

(52) U.S. Cl.
CPC .......... *A61B 17/1114* (2013.01); *A61B 17/32* (2013.01); *A61B 2017/00017* (2013.01); *A61B 2017/00876* (2013.01)

(58) Field of Classification Search
CPC ................ A61B 17/1114; A61B 17/32; A61B 17/221; A61B 2017/00017; A61B 2017/00876; A61B 2017/00278; A61B 2017/00296; A61B 2017/00336; A61B 2017/0034; A61B 2017/00358; A61B 2017/00477; A61B 2017/1117; A61B 2017/1139; A61B 2017/2926; A61B 2017/00818

See application file for complete search history.

(56) References Cited

U.S. PATENT DOCUMENTS

| | | |
|---|---|---|
| 8,870,889 B2 | 10/2014 | Frey |
| 8,870,898 B2 | 10/2014 | Beisel et al. |
| 10,568,630 B2 * | 2/2020 | Hernandez ............ A61B 17/11 |

(Continued)

*Primary Examiner* — Anh T Dang
(74) *Attorney, Agent, or Firm* — The Belles Group, P.C.

(57) ABSTRACT

Systems and methods for forming an anastomosis between two adjacent walls of a digestive tract are provided. The system includes first and second magnetic implants comprising first and magnetic bodies, respectively. Each of the first and magnetic bodies comprises a tissue-oriented surface and a lumen-oriented surface, and defines a through-hole extending between the tissue-oriented surface and the lumen-oriented surface. The first and second magnetic implants are configured to magnetically couple to each other through the two adjacent walls of the digestive tract with the through-holes being at least partially superposable to each other to compress an annular portion of the two adjacent walls therebetween. The first and second magnetic implants can include various features such as being configured to selectively adopt a delivery or an anastomosis configuration, being dimensioned to maintain a preliminary passageway between the two adjacent walls within their outer periphery, being electrically insulated, etc.

24 Claims, 32 Drawing Sheets

(56) References Cited

U.S. PATENT DOCUMENTS

| | | | |
|---|---|---|---|
| 11,033,272 B2* | 6/2021 | Fegelman | A61B 17/1114 |
| 11,395,659 B2* | 7/2022 | Bakos | A61B 17/1114 |
| 11,583,280 B2* | 2/2023 | Gagner | A61B 17/1114 |
| 2006/0282106 A1* | 12/2006 | Cole | A61B 17/0643 606/153 |
| 2008/0114384 A1 | 5/2008 | Chang et al. | |
| 2009/0048618 A1* | 2/2009 | Harrison | A61B 17/66 600/12 |
| 2016/0022266 A1 | 1/2016 | Lukin et al. | |
| 2017/0035425 A1* | 2/2017 | Fegelman | A61B 17/1114 |
| 2018/0271531 A1 | 9/2018 | Beisel et al. | |
| 2020/0138438 A1 | 5/2020 | Harrison et al. | |
| 2022/0087678 A1 | 3/2022 | Gagner et al. | |
| 2022/0117603 A1 | 4/2022 | Laser et al. | |
| 2022/0401100 A1 | 12/2022 | Hernandez et al. | |

\* cited by examiner

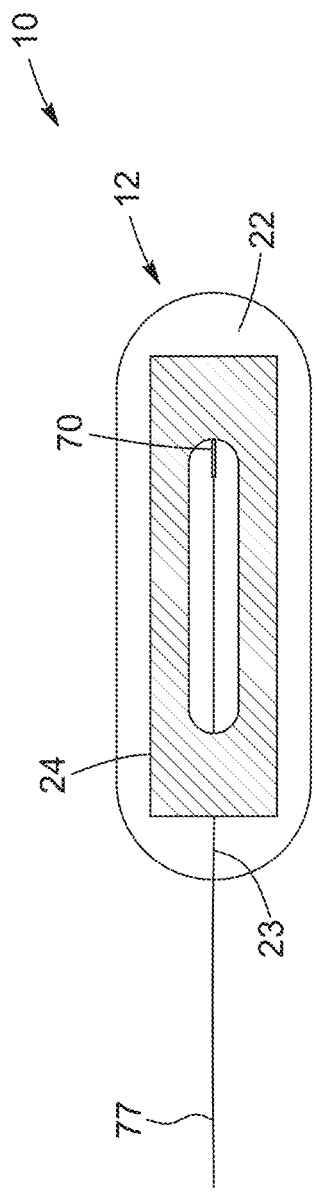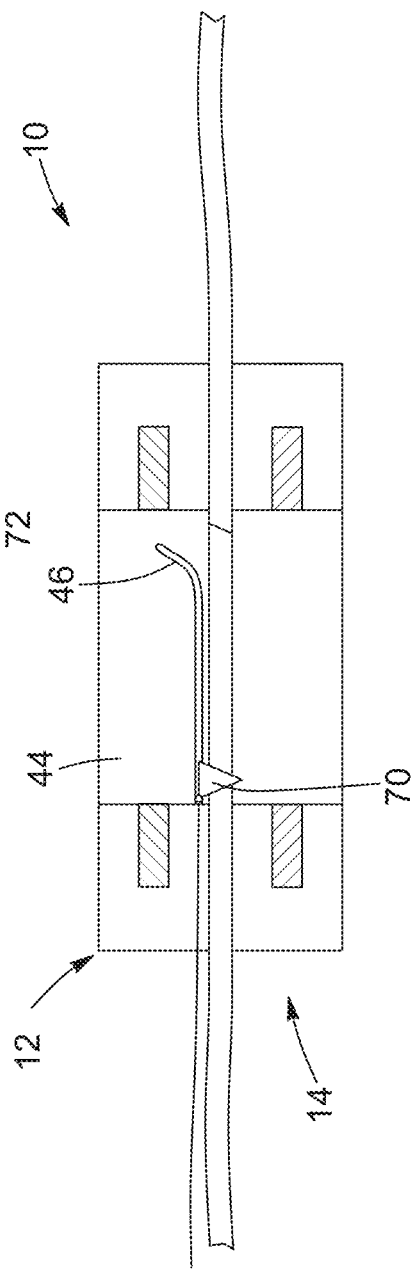# 
FIG. 15  FIG. 16  FIG. 17

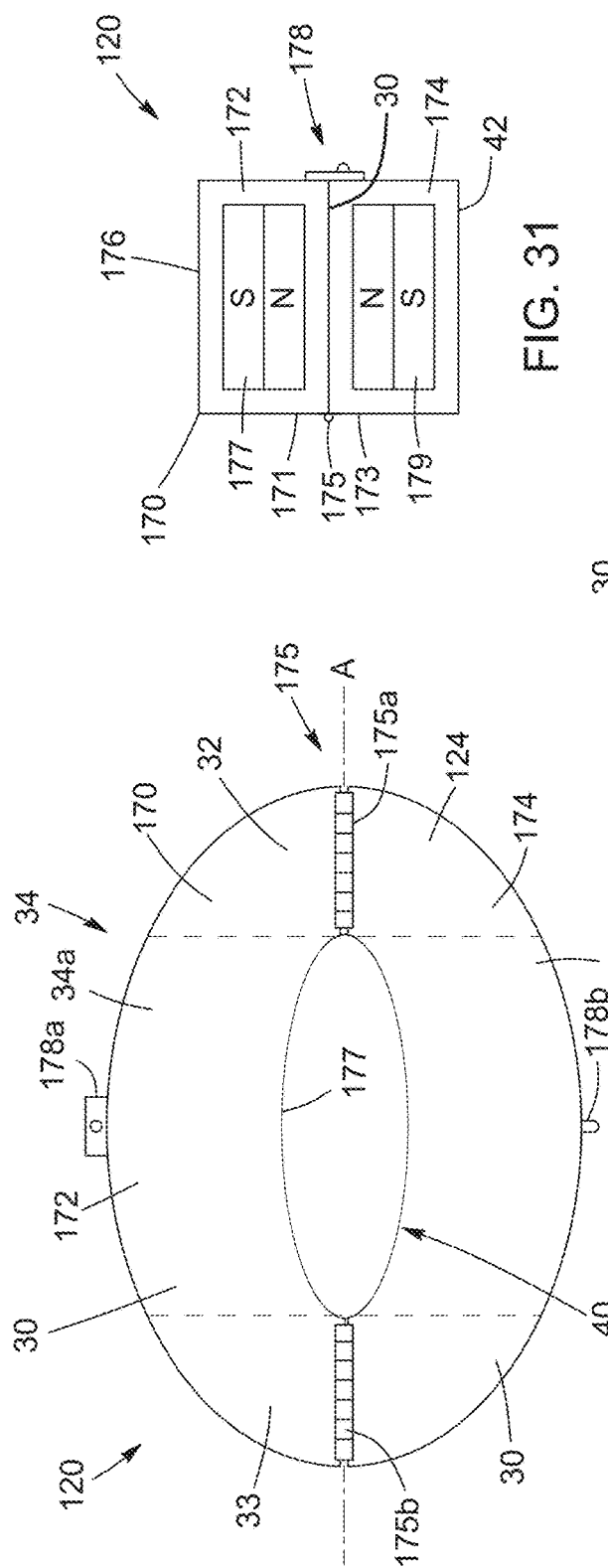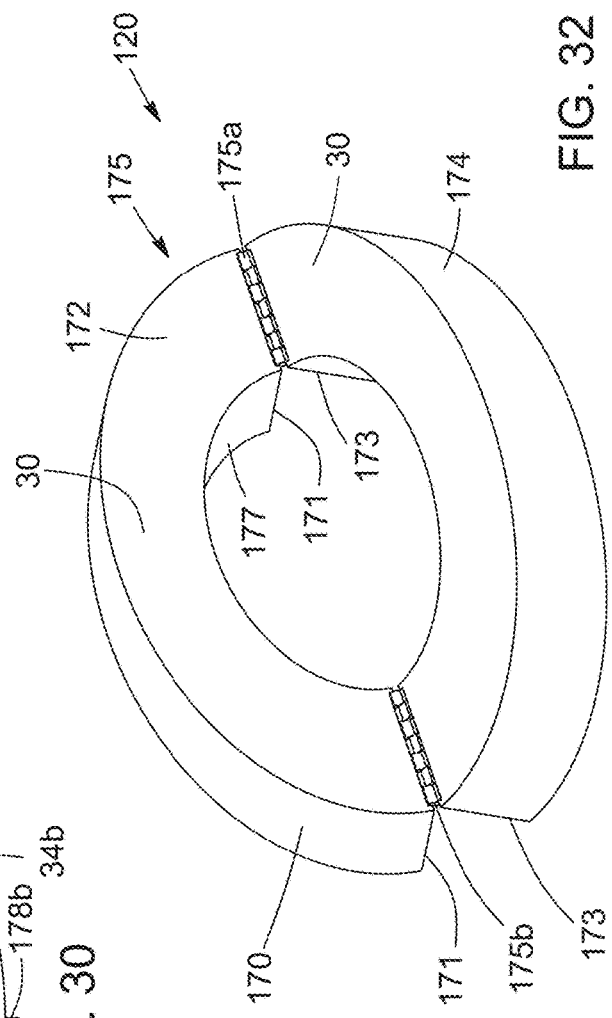

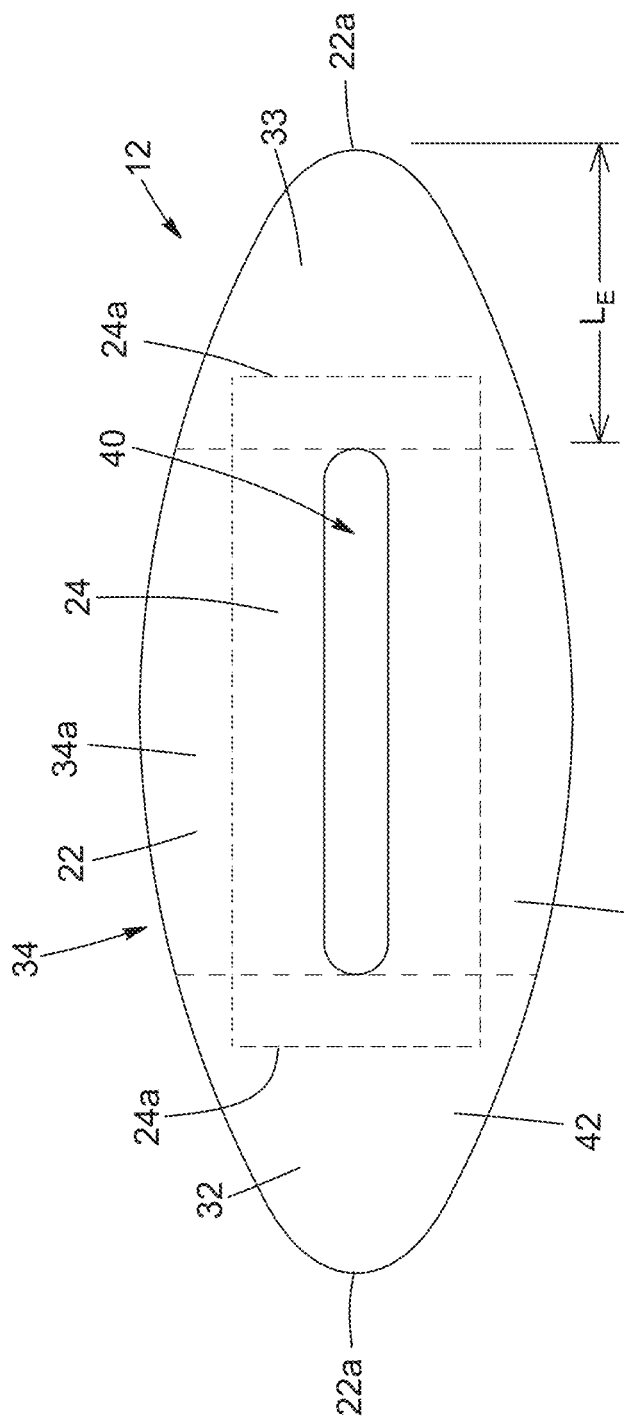
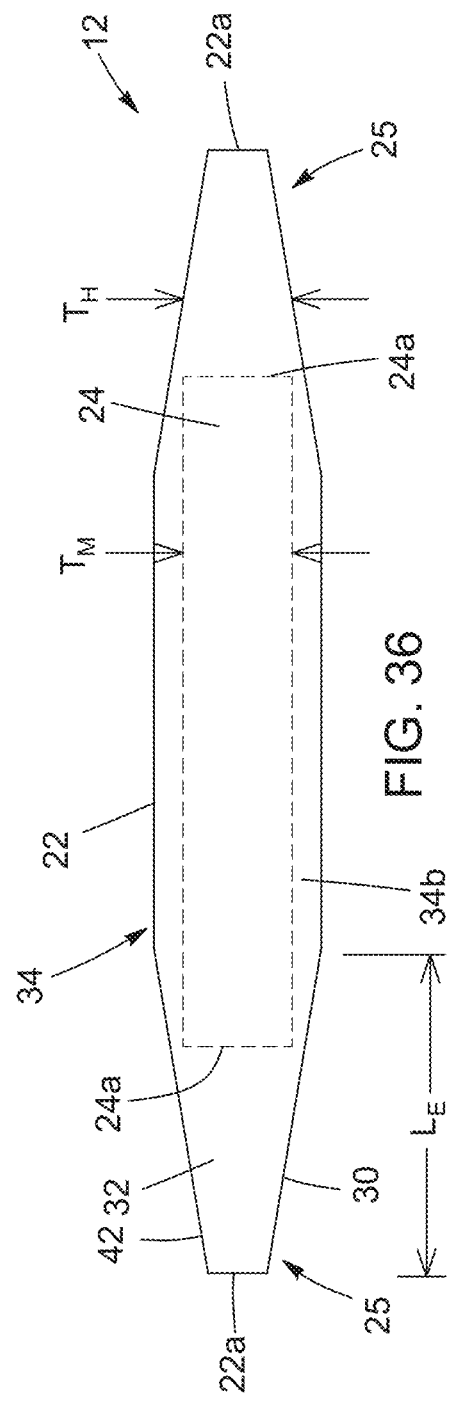

ated device with magnetic devices having through-holes and cutting mechanism", the disclosure of which is hereby incorporated by reference in its entirety.

MAGNETIC IMPLANTS HAVING THROUGH-HOLES FOR FORMING AN ANASTOMOSIS

CROSS-REFERENCE TO RELATED APPLICATION

The present application claims priority from U.S. provisional patent application No. 63/509,446, filed on Jun. 21, 2023, entitled "ANASTOMOSIS FORMATION DEVICE WITH MAGNETIC DEVICES HAVING THROUGH-HOLES AND CUTTING MECHANISM", the disclosure of which is hereby incorporated by reference in its entirety.

TECHNICAL FIELD

The technical field generally relates to medical techniques for treating digestive tract conditions. In particular, the technical field relates to medical techniques including devices for forming an anastomosis in the digestive tract.

BACKGROUND

Metabolic surgeries and medical procedures to treat conditions associated with the digestive tract, diabetes and obesity often require alteration of the digestive tract through incisions, sutures, punctures and/or stapling, which can cause trauma to the organ being altered and lead to bleeding. For instance, bariatric surgery procedures can be used to treat obesity, and can be aimed at bypassing a portion of the stomach and/or the intestine. Such medical procedures can also lead to an increased risk of infection or other complications.

Magnetic compression anastomosis can be used in the context of medical procedures to treat conditions associated with the digestive tract. With magnetic compression anastomosis, necrosis is induced in tissue sandwiched between two magnets. A healing process takes place around the magnets, while the compressed tissue eventually dies and separates from surrounding living tissue. The magnets are released along with the necrotic tissue, leaving an open passage known as an anastomosis.

There remain a number of challenges with respect to surgery procedures in the digestive tract, particularly in the formation of an anastomosis.

SUMMARY

In accordance with an aspect, there is provided a system for forming an anastomosis at a target site between two adjacent walls of a digestive tract, the system comprising:
  a first magnetic implant comprising a first magnetic body having a first tissue-oriented surface and a first lumen-oriented surface, the first magnetic body defining a first through-hole extending between the first tissue-oriented surface and the first lumen-oriented surface;
  a second magnetic implant comprising a second magnetic body having a second tissue-oriented surface and a second lumen-oriented surface, the second magnetic body defining a second through-hole extending between the second tissue-oriented surface and the second lumen-oriented surface;
  the first and second magnetic implants being configured to magnetically couple to each other through the two adjacent walls of the digestive tract with the first and second through-holes being at least partially superposable to each other to compress an annular portion of the two adjacent walls therebetween; and
  a cutting mechanism integrated into the first magnetic implant and configurable between a non-cutting configuration during delivery of the first and second magnetic implants to the target site and a cutting configuration once the first and second magnetic implants are coupled at the target site, the cutting mechanism comprising a cutting edge configured to cut through the two adjacent walls in a region located inwardly from an inner periphery of the annular portion when in the cutting configuration to provide fluid communication therethrough.

In accordance with another aspect, there is provided a system for forming an anastomosis at a target site between two adjacent walls of a digestive tract, the system comprising:
  a first magnetic implant comprising a first magnetic body having a first tissue-oriented surface and a first lumen-oriented surface, the first magnetic body defining a first through-hole extending between the first tissue-oriented surface and the first lumen-oriented surface;
  a second magnetic implant comprising a second magnetic body having a second tissue-oriented surface and a second lumen-oriented surface, the second magnetic body defining a second through-hole extending between the second tissue-oriented surface and the second lumen-oriented surface;
  the first and second magnetic implants being configured to magnetically couple to each other through the two adjacent walls of the digestive tract with the first and second through-holes being at least partially superposable to each other to compress an annular portion of the two adjacent walls therebetween; and
  a cutting mechanism integrable into the first magnetic implant and being configurable between a non-cutting configuration during delivery of the first and second magnetic implants to the target site and a cutting configuration once the first and second magnetic implants are coupled at the target site, the cutting mechanism comprising a wire electrode couplable to an electrosurgical generator, the wire electrode comprising a distal tip having a distal tip cross-section covering at least 10% of a through-hole cross-section of the first through-hole, the wire electrode being insertable into the first through-hole to cut through the two adjacent walls via cauterization when in the cutting configuration to provide fluid communication therethrough.

In accordance with another aspect, there is provided a system for forming an anastomosis at a target site between two adjacent walls of a digestive tract, the system comprising:
  a first magnetic implant comprising a first magnetic body having a first tissue-oriented surface and a first lumen-oriented surface, the first magnetic body defining a first through-hole extending between the first tissue-oriented surface and the first lumen-oriented surface;
  a second magnetic implant comprising a second magnetic body having a second tissue-oriented surface and a second lumen-oriented surface, the second magnetic body defining a second through-hole extending between the second tissue-oriented surface and the second lumen-oriented surface;
  the first and second magnetic implants being configured to magnetically couple to each other through the two adjacent walls of the digestive tract with the first and second through-holes being at least partially superposable to each other to compress an annular portion of the two adjacent walls therebetween; and a cutting mechanism integrated into the first magnetic implant and being configurable between a non-cutting configuration during delivery of the first and second magnetic implants to the target site and a cutting configuration once the first and second magnetic implants are coupled at the target site, the cutting mechanism comprising a wire electrode couplable to an electrosurgical generator, the wire electrode extending across the first through-hole to cut through the two adjacent walls in a region located inwardly from an inner periphery of the annular portion when in the cutting configuration to provide fluid communication therethrough.

In accordance with another aspect, there is provided a system for forming an anastomosis at a target site between two adjacent walls of a digestive tract, the system comprising:

a first magnetic implant comprising a first magnetic body having a first tissue-oriented surface and a first lumen-oriented surface, the first magnetic body defining a first through-hole extending between the first tissue-oriented surface and the first lumen-oriented surface;

a second magnetic implant comprising a second magnetic body having a second tissue-oriented surface and a second lumen-oriented surface, the second magnetic body defining a second through-hole extending between the second tissue-oriented surface and the second lumen-oriented surface;

the first and second magnetic implants being configured to magnetically couple to each other through the two adjacent walls of the digestive tract with the first and second through-holes being at least partially superposable to each other to compress an annular portion of the two adjacent walls therebetween such that a central region; and a cutting mechanism integrable into at least one of the first and second magnetic implants and configurable between a non-cutting configuration during delivery of the first and second magnetic implants to the target site and a cutting configuration once the first and second magnetic implants are at the target site, the cutting mechanism being configured to cut along at least a portion of a chord extending across a region located inwardly of an inner periphery of the annular portion through the two adjacent walls to provide fluid communication therethrough.

In accordance with another aspect, there is provided a method for forming an anastomosis between two adjacent walls of a digestive tract of a patient, the method comprising:

delivering a first magnetic implant comprising a first through-hole into the digestive tract to a first location on one side of a desired anastomose site;

delivering a second magnetic implant comprising a second through-hole into the digestive tract to a second location on another side of the desired anastomose site;

magnetically coupling the first and second magnetic implants together through the two adjacent vessel walls of the digestive tract to at least partially superpose the first and second through-holes and to compress an annular portion of the two adjacent walls therebetween;

operating a cutting mechanism integrable into at least one of the first and second magnetic implants and configurable between a non-cutting configuration and a cutting configuration to cut though the two adjacent walls in a cutting region located inwardly from an inner periphery of the annular portion, once the first and second magnetic implants are magnetically coupled, and the cutting mechanism is in the cutting configuration.

In accordance with another aspect, there is provided a system for forming an anastomosis at a target site between two adjacent walls of a digestive tract, the system comprising:

a first magnetic implant comprising a first magnetic body having a first tissue-oriented surface and a first lumen-oriented surface, the first magnetic body defining a first through-hole extending between the first tissue-oriented surface and the first lumen-oriented surface;

a second magnetic implant comprising a second magnetic body having a second tissue-oriented surface and a second lumen-oriented surface, the second magnetic body defining a second through-hole extending between the second tissue-oriented surface and the second lumen-oriented surface;

the first and second magnetic implants being configured to magnetically couple to each other through the two adjacent walls of the digestive tract with the first and second through-holes being at least partially superposable to each other to compress an annular portion of the two adjacent walls therebetween during a healing time period; and a compression device configured to compress an inwardly located portion of the two adjacent walls located inwardly from an inner periphery of the annular portion and comprising both layers of the two adjacent walls to cause ischemic pressure necrosis and form an initial anastomosis through the two adjacent walls during the healing time period.

In accordance with another aspect, there is provided a method for forming an anastomosis between two adjacent walls of a digestive tract of a patient, the method comprising:

delivering a first magnetic implant comprising a first through-hole into the digestive tract to a first location on one side of a desired anastomose site;

delivering a second magnetic implant comprising a second through-hole into the digestive tract to a second location on another side of the desired anastomose site;

magnetically coupling the first and second magnetic implants together through the two adjacent vessel walls of the digestive tract to at least partially superpose the first and second through-holes and to compress an annular portion of the two adjacent walls therebetween during a healing time period;

compressing an inwardly located portion of the two adjacent walls located inwardly from an inner periphery of the annular portion and comprising both layers of the two adjacent walls to cause ischemic pressure necrosis and form an initial anastomosis through the two adjacent walls during the healing time period.

In accordance with another aspect, there is provided a system for forming an anastomosis at a target site between two adjacent walls of a digestive tract, the system comprising:

first and second elongated magnetic implants, each comprising a magnetic body having a tissue-oriented surface and a lumen-oriented surface and defining a through-hole extending therebetween, the through-hole having a transverse through-hole width measured along a transverse axis of the magnetic body, the magnetic body comprising:

first and second end portions longitudinally spaced-apart from each other; and
an intermediate portion fixedly extending between the first and second end portions, the intermediate portion comprising first and second arms partially defining the through-hole and each having a transverse arm width measured along the transverse axis of the magnetic body, the transverse arm width of each of the first and second arms being greater than the transverse trough-hole width;
the first and second elongated magnetic implants being configured to magnetically couple to each other through the two adjacent walls of the digestive tract with the respective through-holes being at least partially superposable to each other to compress an annular portion of the two adjacent walls therebetween.

In accordance with another aspect, there is provided a system for forming an anastomosis at a target site between two adjacent walls of a digestive tract, the system comprising:
first and second electrically non-conductive magnetic implants, each comprising a magnetic body having a tissue-oriented surface and a lumen-oriented surface and defining a through-hole extending therebetween;
the first and second magnetic implants being configured to magnetically couple to each other through the two adjacent walls of the digestive tract with the respective through-holes being at least partially superposable to each other to compress an annular portion of the two adjacent walls therebetween.

In accordance with another aspect, there is provided a system for forming an anastomosis at a target site between two adjacent walls of a digestive tract, the system comprising:
first and second elongated magnetic implants, each comprising a magnetic body having a tissue-oriented surface and a lumen-oriented surface and defining a through-hole extending therebetween;
the first and second elongated magnetic implants being configured to magnetically couple to each other through the two adjacent walls of the digestive tract with the respective through-holes being at least partially superposable to each other to compress an annular portion of the two adjacent walls therebetween; and
an electrosurgical cutting instrument comprising a cutting tip couplable to an electrosurgical generator, the cutting tip being insertable within the through-hole of at least one of the first and second elongated magnetic implants and configured to cut through the two adjacent walls in a region located inwardly from an inner periphery of the annular portion once the first and second elongated magnetic implants are coupled at the target site to provide fluid communication therethrough.

In accordance with another aspect, there is provided a method for forming an anastomosis between two adjacent walls of a digestive tract of a patient, the method comprising:
delivering a first magnetic elongated implant comprising a first through-hole into the digestive tract to a first location on one side of a desired anastomose site;
delivering a second elongated magnetic implant comprising a second through-hole into the digestive tract to a second location on another side of the desired anastomose site;
magnetically coupling the first and second elongated magnetic implants together through the two adjacent vessel walls of the digestive tract to at least partially superpose the first and second through-holes and to compress an annular portion of the two adjacent walls therebetween;
operating an electrosurgical cutting instrument comprising a cutting tip being insertable into a through-hole of at least one of the first and second elongated magnetic implants to cut though the two adjacent walls in a cutting region located inwardly from an inner periphery of the annular portion, once the first and second elongated magnetic implants are magnetically coupled, to provide fluid communication therethrough.

In accordance with another aspect, there is provided a system for forming an anastomosis at a target site between two adjacent walls of a digestive tract, the system comprising:
first and second magnetic implants, each comprising:
a magnet; and
a housing having a tissue-oriented surface and a lumen-oriented surface and being configured to receive the magnet therein, the magnet and the housing together defining a through-hole extending between the tissue-oriented surface and the lumen-oriented surface, the housing comprising:
first and second end portions longitudinally spaced-apart from each other; and
an intermediate portion extending between the first and second end portions;
wherein the housing has a thickness defined between the tissue-oriented surface and the lumen-oriented surface, the thickness of the housing being continuously reduced over the longitudinal extent of the first end portion moving away from the intermediate portion to enable self-alignment of the first and second magnetic implants;
the first and second magnetic implants being configured to magnetically couple to each other through the two adjacent walls of the digestive tract with the respective through-holes being at least partially superposable to each other to compress an annular portion of the two adjacent walls therebetween.

In accordance with another aspect, there is provided a system for forming an anastomosis at a target site between two adjacent walls of a digestive tract, the system comprising:
first and second magnetic implants, each comprising:
a magnet having a tissue-oriented surface and a lumen-oriented surface, the magnet comprising:
first and second end portions longitudinally spaced-apart from each other; and
an intermediate portion extending between the first and second end portions, the intermediate portion defining a through-hole extending between the tissue-oriented surface and the lumen-oriented surface;
wherein the magnet has a thickness defined between the tissue-oriented surface and the lumen-oriented surface, the thickness of the magnet being continuously reduced over the longitudinal extent of the first end portion moving away from the intermediate portion to enable self-alignment of the first and second magnetic implants;
the first and second magnetic implants being configured to magnetically couple to each other through the two adjacent walls of the digestive tract with the respective through-holes being at least partially superposable to each other to compress an annular portion of the two adjacent walls therebetween.

In accordance with another aspect, there is provided a system for forming an anastomosis at a target site between two adjacent walls of a digestive tract, the system comprising:
first and second magnetic implants each configured to selectively adopt a delivery configuration and an anastomosis configuration, the first and second magnetic implants each comprising:
a magnetic body having a tissue-oriented surface and a lumen-oriented surface, the magnetic body comprising:
first and second subdivisions;
a hinge engaging the first and second subdivisions together and enabling the first and second subdivisions to be folded onto one another or unfolded, wherein when the first and second subdivisions are unfolded, the first and second subdivisions define a though-hole extending between the tissue-oriented surface and the lumen-oriented surface;
the first and second magnetic implants being configured to be delivered to the target site in the delivery configuration when the first and second subdivisions are folded onto one another, and subsequently be unfolded to the anastomosis configuration in order to magnetically couple to each other through the two adjacent walls of the digestive tract with the respective through-holes being at least partially superposable to each other to compress an annular portion of the two adjacent walls therebetween.

In accordance with another aspect, there is provided a system for forming an anastomosis at a target site between two adjacent walls of a digestive tract, the system comprising:
a first magnetic implant comprising a first magnetic body having a first tissue-oriented surface and a first lumen-oriented surface, the first magnetic body defining a first through-hole extending between the first tissue-oriented surface and the first lumen-oriented surface, the first magnetic implant comprising:
a first solid unitary magnet having a first multipole structure with magnetic poles provided according to a first pre-determined spatial arrangement to define a first resulting magnetic field;
a second magnetic implant comprising a second magnetic body having a second tissue-oriented surface and a second lumen-oriented surface, the second magnetic body defining a second through-hole extending between the second tissue-oriented surface and the second lumen-oriented surface, the second magnetic implant comprising:
a second solid unitary magnet having a second multipole structure with magnetic poles provided according to a second pre-determined spatial arrangement to define a second resulting magnetic field;
the first and second magnetic implants being configured to self-align with each other in accordance with the first and second resulting magnetic fields and magnetically couple through the two adjacent walls of the digestive tract to at least partially superpose the first and second through-holes and compress an annular portion of the two adjacent walls therebetween.

BRIEF DESCRIPTION OF THE DRAWINGS

The attached figures illustrate various features, aspects and implementations of the technology described herein.

FIG. 15 is cross-sectional top view of a first magnetic implant, in accordance with another implementation.

FIG. 16 is a cross-sectional side view of the first magnetic implant shown in FIG. 15 and a second magnetic implant, with the first magnetic implant being shown in a non-cutting configuration and in contact with the vessel wall of the first hollow organ and the second magnetic implant being shown in contact with the vessel wall of the second hollow organ, at the desired site of the anastomosis.

FIG. 17 is a cross-sectional side view of the first and second magnetic implants shown in FIG. 16, with the first magnetic implant being shown in a cutting configuration.

FIG. 30 is a top view of a first magnetic implant that includes a hinge, in accordance with an implementation, the first magnetic implant being shown in an anastomosis configuration.

FIG. 31 is a front elevation view of the first magnetic implant shown in FIG. 30, the first magnetic implant being shown in a delivery configuration.

FIG. 32 is a perspective view of the first magnetic implant shown in FIG. 30, the first magnetic implant being shown in a transitional state between the anastomosis configuration and the delivery configurations.

FIG. 35 is a top view of a first magnetic implant that includes a housing and a magnet received in the housing, in accordance with another implementation.

FIG. 36 is a side elevation view of the magnet of FIG. 35.

DETAILED DESCRIPTION

Figure 1:
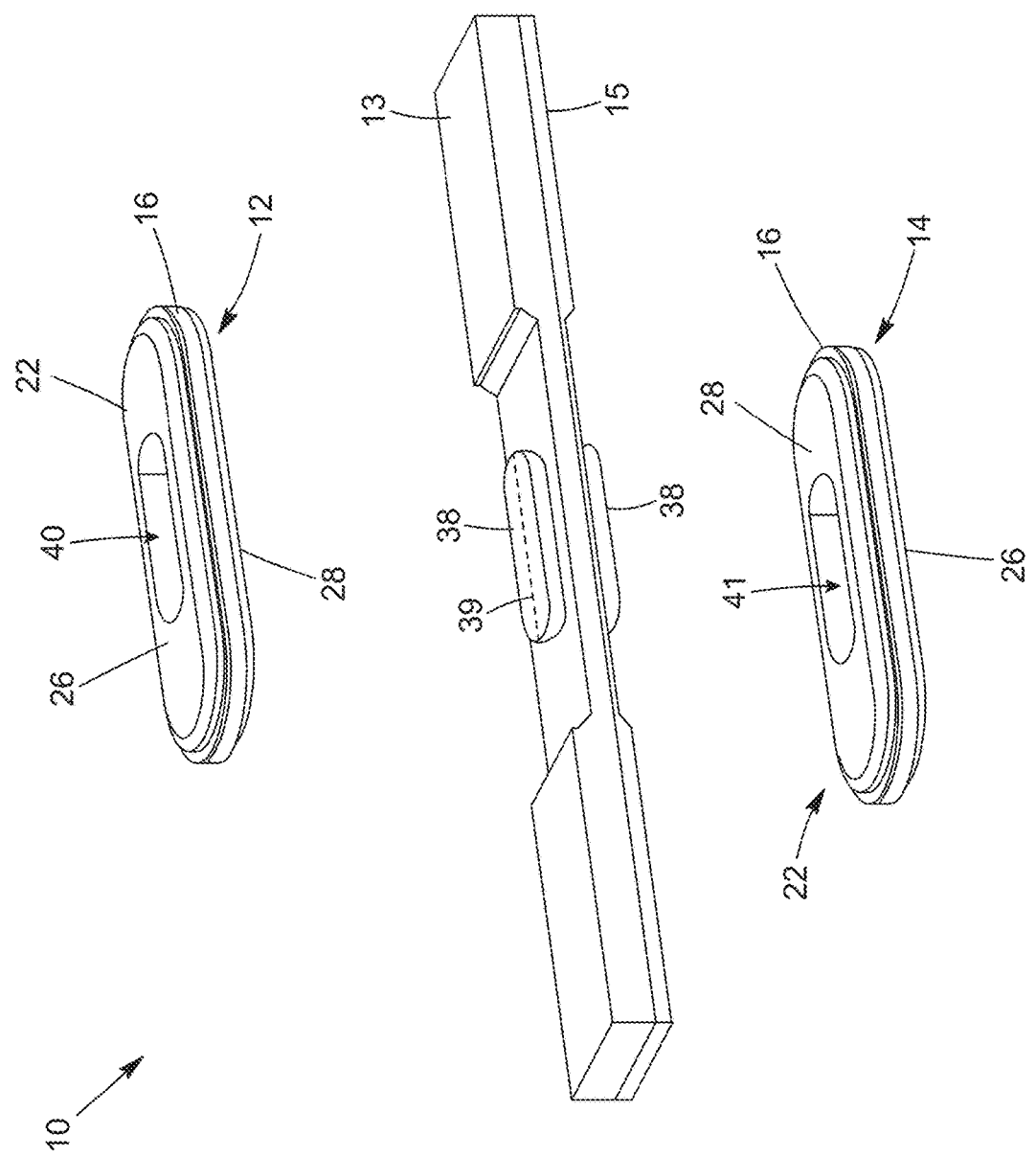
FIG. 1 is an exploded perspective view of a first magnetic implant shown on one side of a desired site of an anastomosis and of a second magnetic implant shown on another side of the desired site of the anastomosis, with a vessel wall of a first hollow organ and a vessel wall of a second hollow organ being shown therebetween, in accordance with an implementation.

Techniques described herein relate to systems, devices and methods for forming an anastomosis between two adjacent walls of hollow structures of the digestive tract of a patient, in the context of procedures to treat various medical conditions associated with the digestive tract. The formation of the anastomosis can be achieved by inserting a first magnetic implant into the lumen of a first hollow organ and a second magnetic implant into the lumen of a second hollow organ, positioning the first and second magnetic implants at a desired anastomosis site, and by magnetically coupling the first and second magnetic implants together to compress the tissue of the adjacent walls therebetween. Compression of the wall tissue between the two magnetic implants results in a necrotic area that corresponds approximately to the surface area of the compression surface of the magnetic implant pair. Over time, the necrotic area becomes surrounded by an edge of scar tissue, or scarred edge. The formation of scar tissue can include collagen fiber deposition, neovascularization, and epithelial regeneration, and represents a dynamic equilibrium involving cells, their milieu, and the extracellular matrix. Cytokines secreted by platelets and inflammatory cells can promote the formation of new blood vessels and collagen synthesis which, in dynamic balance with collagen degradation, can contribute to determining the healing response. Two components of collagen are hydroxyproline and hydroxylysine, with hydroxyproline being synthesized under conditions of oxidative stress via the hydroxylation of proline, and being involved in the cellular transport of collagen. The synthesis and transport of wound collagen can thus be understood by monitoring the hydroxyproline content of the wound. The edge of scar tissue can thus be characterized by the fusion, or mechanical bonding, of the walls of each hollow organ through which the anastomosis is formed that occurs in part via fibrosis mechanisms. The scarred edge can thus form a fluid-tight seal around the anastomosis.

The healing time period allowing for the ischemic pressure necrosis of the anastomosis area can extend beyond two weeks or more following the implantation of the magnetic implants. In some implementations, it can be desirable to provide fluid communication between the first and second hollow organs during the healing time period, i.e., prior to the magnetic compression anastomosis being formed, which can contribute for instance to reducing discomfort to the patient.

In order to do so, the first and second magnetic implants can each include a through-hole extending between a tissue-oriented surface and a lumen-oriented surface, such that once magnetically coupled through the adjacent walls of the first and second hollow organs, the through-holes are at least partially superposed to each other so as to compress an annular portion of the adjacent walls therebetween.

In some implementations, the through-hole of at least one of the first and second magnetic implants can be sized to receive a cutting tip of a surgical cutting instrument including, for instance, an electrosurgical cutting instrument, to cut an opening through the two adjacent walls in a region located inwardly from an inner periphery of the annular portion to provide fluid communication via a preliminary passageway between the first and second hollow organs prior to the magnetic compression anastomosis being formed.

In other implementations, a cutting mechanism can be provided with one or both of the first and second magnetic implants to cut through the two adjacent walls, inwardly from the inner periphery of the annular portion, to provide a preliminary fluid communication between the first and second hollow organs prior to the magnetic compression anastomosis being formed. The preliminary passageway can contribute to enabling a flow of liquid, gas and/or matter through the digestive tract, thus alleviating some discomfort that can potentially be experienced by the patient. The cutting mechanism can be integrated into at least one of the first and second magnetic implants, or can be releasably engaged with at least one of the first and second magnetic implants. For example, the cutting mechanism can include a mechanical system such as a blade or a punch having a cutting edge to cut through the adjacent walls, an electrical system for cauterizing the adjacent walls, or a combination of the two. The cutting mechanism can be configurable between a non-cutting configuration during delivery of the magnetic implants at a desired anastomosis site, and a cutting configuration once the magnetic implants are magnetically coupled at the desired anastomosis site. In other implementations, a compression device can be used to compress a portion of the two adjacent walls that is located within the through-holes, sufficiently to cause ischemic pressure necrosis and form an initial anastomosis through the two adjacent walls during the healing time period.

In some implementations, certain features of the first and second magnetic implants can further enable providing magnetic implants suitable for implantation in a hollow organ of the digestive tract via, for instance, an endoscopic or a laparoscopic procedure. In order to do so, in some implementations, at least one of first and second magnetic implants can be configurable between multiple configurations, including configurations that can contribute to facilitating a delivery of the magnetic implant to a desired anastomosis site. For instance, in some implementations, the magnetic implant can be configurable between a delivery configuration for delivery of the magnetic implant to the desired anastomosis site, and an anastomosis configuration once the magnetic implant is positioned at the anastomosis site.

In some implementations, certain features of the first and second magnetic implants can further enable a self-alignment of the first and second magnetic implants during a magnetic coupling of the first and second magnetic implants. For instance, in some implementations, a given portion of the magnet of at least one of the first and second magnetic implants can have a thickness being continuously reduced over a longitudinal extent of the given portion, for instance in a direction away from the through-hole, to facilitate translating the first and second magnetic implants relative to one another into a magnetic coupling alignment of the first and second magnetic implants in which the through-holes of the first and second magnetic implants are at least partially superposable to each other, so that the first and second magnetic implants can subsequently compress an annular portion of the two adjacent walls therebetween.

In some implementations, at least one of the first and second magnetic implants can include a housing configured to enclose a magnet therein. In such implementations, a given portion of the housing can have a thickness being continuously reduced over a longitudinal extent of the given portion, for instance in a direction away from the through-hole, to facilitate translating the first and second magnetic implants relative to one another into a magnetic coupling alignment of the first and second magnetic implants in which the through-holes of the first and second magnetic implants are at least partially superposable to each other, so that the first and second magnetic implants can subsequently compress an annular portion of the two adjacent walls therebetween.

In some implementations, each magnetic implant of a pair of magnetic implants can include a unity magnet having a multipole structure with magnetic poles provided according to a pre-determined spatial arrangement to define a resulting magnetic field, the respective resulting magnetic fields being selected to facilitate a self-alignment of the magnetic implants once delivered at the site of a desired anastomosis.

It is to be understood that throughout the present description, when reference is made to a first magnetic implant of a pair of first and second magnetic implants, this reference is made to simplify the text, and that the description made of the first magnetic implant is applicable to the second magnetic implant, unless stated otherwise.

Various implementations and features of the magnetic implants and associated cutting mechanism will now be described in greater detail in the following paragraphs.

General Description of the System for Forming an Anastomosis

Figure 2:
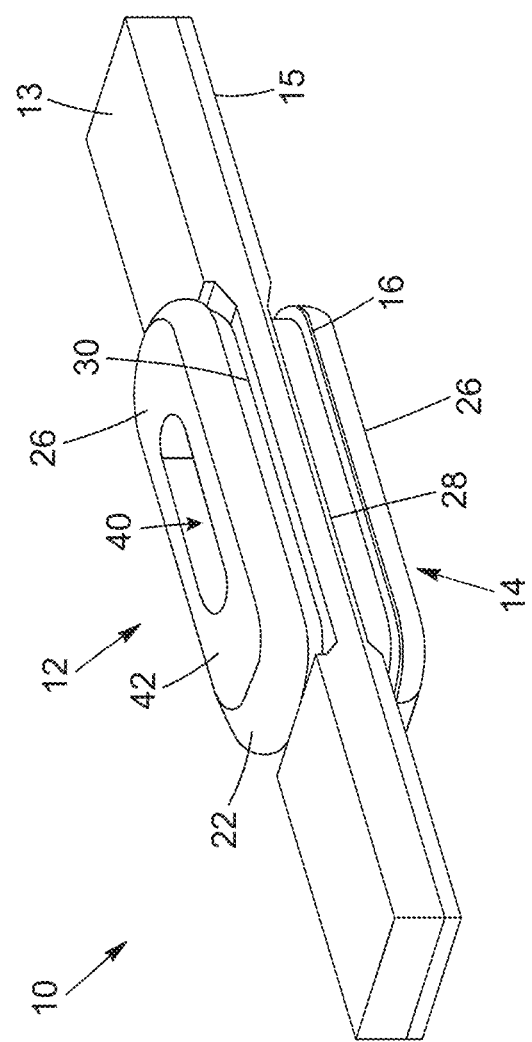
FIG. 2 is a perspective view of the first and second magnetic implants shown in FIG. 1, with the first magnetic implant being shown in contact with the vessel wall of the first hollow organ and the second magnetic implant being shown in contact with the vessel wall of the second hollow organ, at the desired site of the anastomosis.
Figure 3:
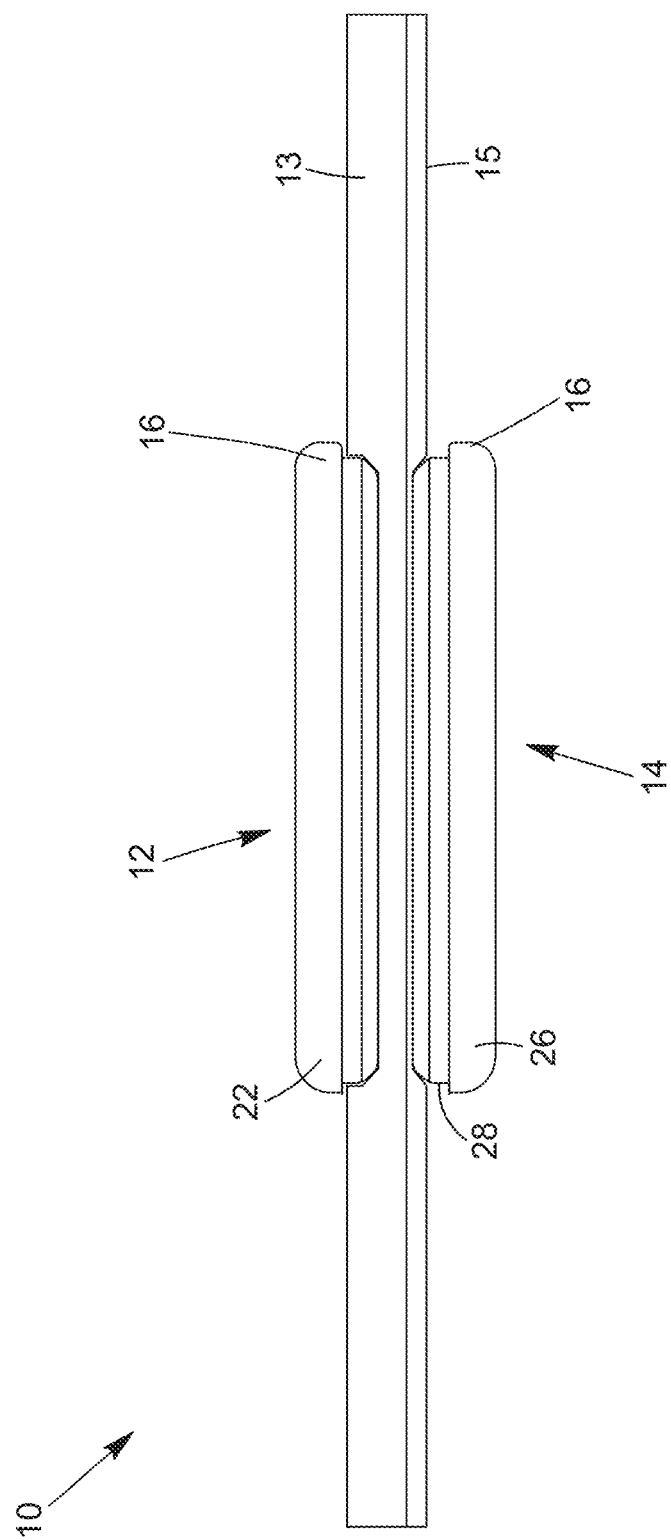
FIG. 3 is a side view of the first and second magnetic implants shown in FIG. 2.

With reference to FIGS. 1 to 3, a system 10 for forming an anastomosis between two adjacent walls of hollow organs of the digestive tract is shown. Referring more particularly to FIG. 1, in the implementation shown, the system 10 includes a first magnetic implant 12 for implantation in a first hollow organ; and a second magnetic implant 14 for implantation in a second hollow organ. It is to be understood that the term "implant" refers to a device that is implanted in the digestive tract for a certain period of time, e.g., the healing time period, and that it can be used interchangeably with the term "device" or "component" for instance. The first hollow organ of the digestive tract into which the first magnetic implant 12 can be implanted can be for instance the stomach, and the second hollow organ into which the second magnetic implant 14 can be implanted can be for instance the jejunum, so as to compress a portion of the stomach wall and a portion of the jejunum wall therebetween. It is to be understood that the first hollow organ and the second hollow organ can be different than the stomach and the jejunum, and can refer to any portions of the digestive tract that can be joined together to form an anastomosis as desired by a healthcare provider, as described in further detail below.

Figure 4A:
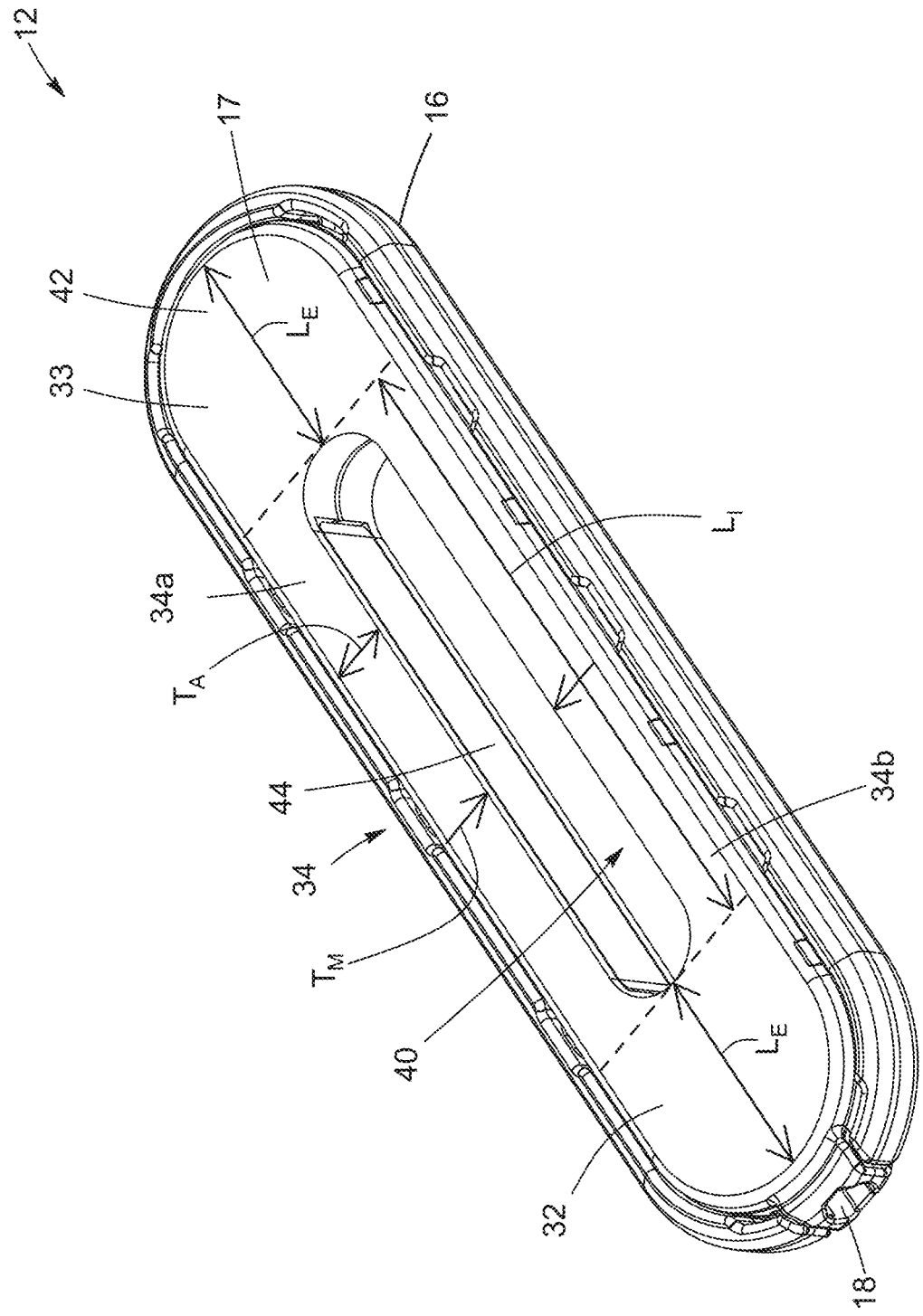
FIG. 4A is a top perspective view of a magnetic implant, in accordance with an implementation.
Figure 4B:
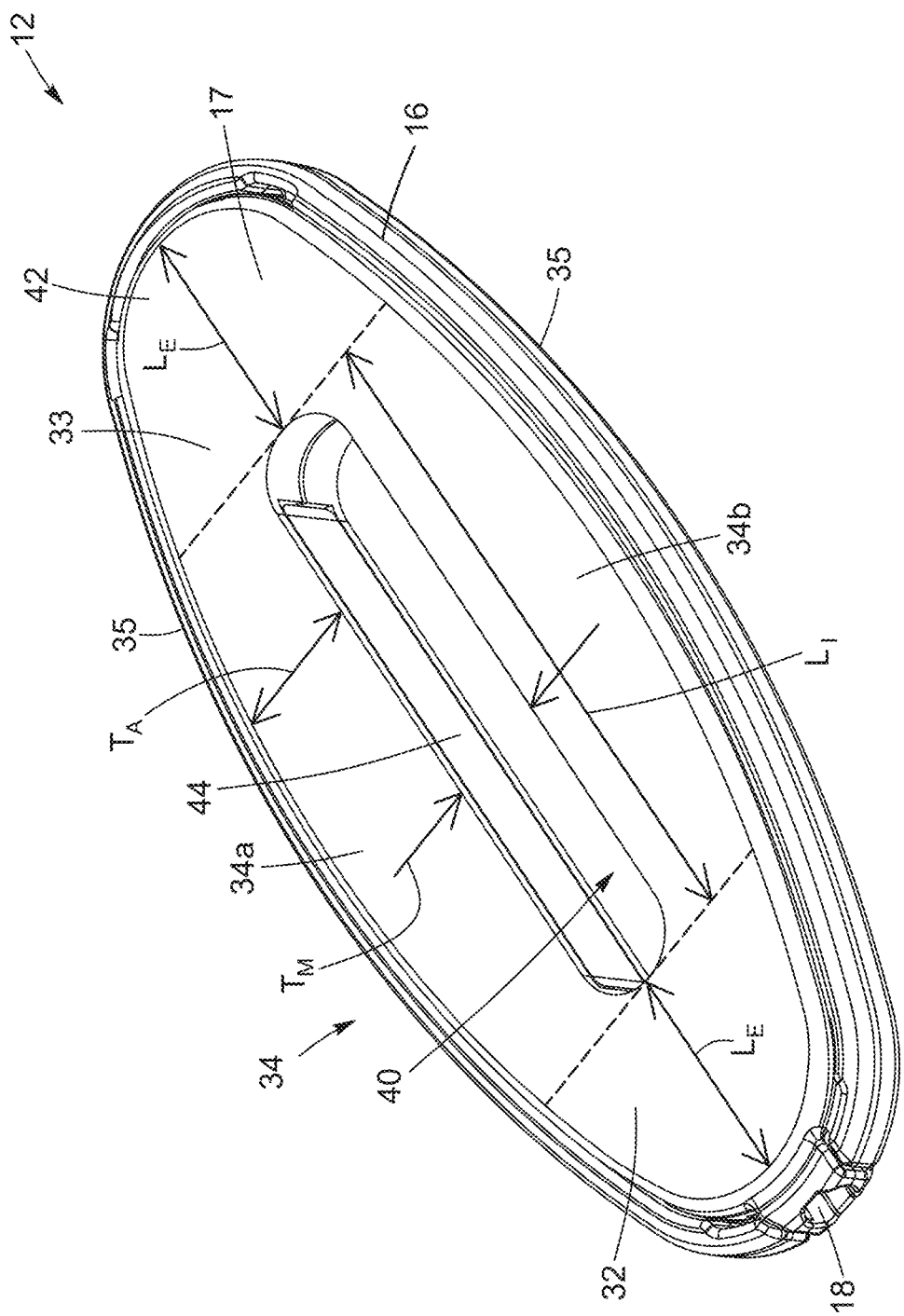
FIG. 4B is a top perspective view of a magnetic implant, in accordance with another implementation.

In FIGS. 1 to 3, each one of the first magnetic implant 12 and the second magnetic implant 14 is associated with a retention member 16. With reference to FIG. 4, an implementation of a first magnetic implant 12 is shown comprising a connecting member 18 that can be releasably engageable with a connector (not shown) of a delivery system. In other words, one or both of the first and second magnetic implants 12, 14 can include a feature that enables its connection to a connector for navigating the magnetic implant 12, 14 to a desired site for creating the anastomosis. In turn, the connecting member 18 can include any feature that enables a releasable connection of the magnetic implant 12, 14 with the connector. In FIGS. 4A and 4B, the connecting member 18 is shown as a "catheter attachment" that includes a catheter attachment assembly (not shown). The catheter attachment is configured as a receiving cavity that can receive a distal end of the connector therein, which as mentioned above can be a delivery system such as, for example, a delivery catheter. It is to be noted that in other implementations, the magnetic implants 12, 14 may not include such feature.

Figure 5A:
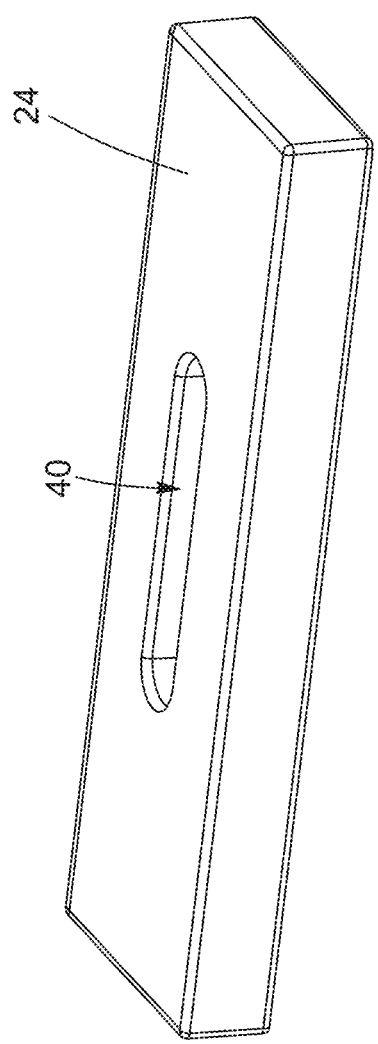
FIG. 5A is a side perspective view of a magnet that includes a through-hole, in accordance with an implementation.
Figure 5B:
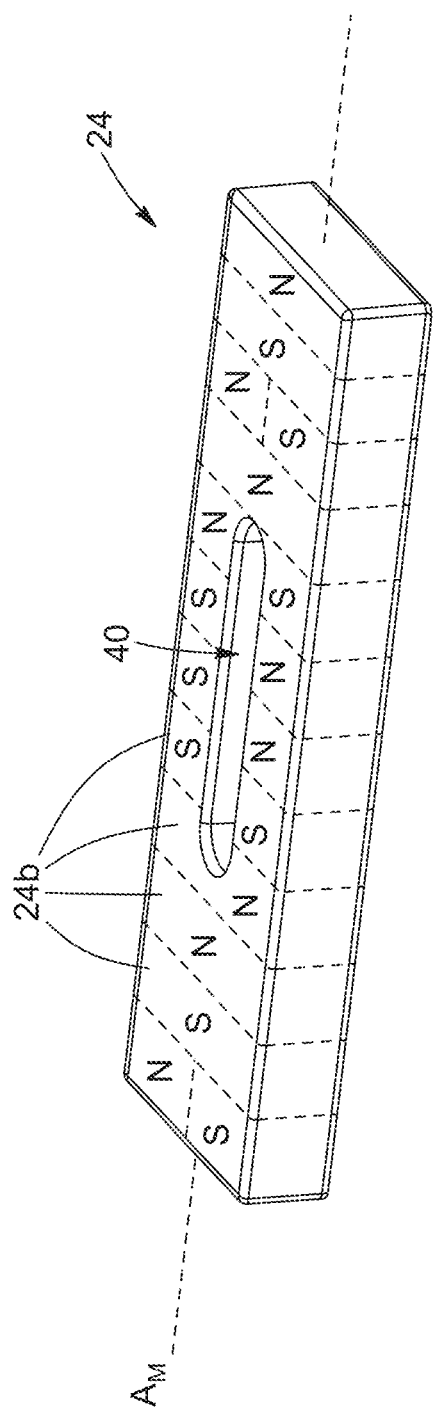
FIG. 5B is a side perspective view of a magnet that includes a through-hole and a multipole structure according to a pre-determined spatial arrangement, in accordance with an implementation.

In some implementations and as shown in FIGS. 1 to 3, the magnetic implant 12, 14 can include a housing 22 that encloses a magnet 24 therein (shown in FIGS. 5A and 5B). The housing 22 can be configured as a two-piece housing, and can include for instance an outward portion 26 and an inward portion 28. The inward portion 28 includes the portion of the housing that faces the corresponding other magnetic implant and is involved in the magnetic compression of the tissue, while the outward portion 26 is on the opposed side of the magnetic implant facing away from the tissue being compressed, i.e., facing the lumen of the hollow organ. In this example, the two housing components surround the magnet and can be coupled together around a periphery thereof. Other housing constructions are also possible, where one or more housing components are used to partly or fully enclose the magnet.

It will be appreciated that positional descriptions such as "above", "below", "left", "right", "inwardly", "outwardly" and the like should, unless otherwise indicated, be taken in the context of the figures, and should not be considered limiting. The term "outwardly" is intended to refer to a feature that extends toward an exterior side of a reference axis. The term "inwardly" is intended to refer to a feature that extends toward an interior side of a reference axis. It should also be understood that elongated objects described herein are considered to have an implicit "longitudinal axis" and "lateral axis". The expression "longitudinal axis" is intended to refer to an axis extending along the length of the object, and the expression "lateral axis", or "transverse axis" is intended to refer to an axis extending perpendicularly to the longitudinal axis, along the width of the object. When referring to a longitudinal direction, it is intended to refer to a direction that extends substantially parallel to the longitudinal axis of the object, encompassing as well as directions that deviate slightly from the longitudinal axis. When referring to a lateral direction or a transverse direction, it is intended to refer to a direction that extends substantially parallel to the lateral axis or transverse axis of the object, encompassing as well as directions that deviate slightly from the lateral axis or transverse axis.

Each of these components of the system for forming an anastomosis will now be described in further detail.

General Description of a Magnetic Implant

Still referring to FIGS. 1 to 4B, the first magnetic implant 12 is a device that is implantable into a first hollow organ of the digestive tract of a patient at a site of a desired anastomosis via the lumen of the first hollow organ. Examples of hollow organs of the digestive tract include the oesophagus, stomach, duodenum, jejunum, ileum, colon, biliary tract, and pancreatic duct. A site of desired anastomosis can be determined according to the condition of the patient, and this aspect will not be discussed further in the context of the present description. As used herein, the expression "magnetic implant" refers to a structure that can be implanted into the chosen hollow organ of the digestive tract, and that can be magnetically attracted to another magnetic implant due to magnetic forces. In some implementations, the magnetic implant can consist of a magnet, such as shown in FIGS. 5A and 5B. In some implementations, the magnetic implant can include a magnet and one or more additional features, such as a housing and/or a connecting member. The two magnetic implants can be substantially the same as each other, or different, in terms of their shape, configuration, construction, and/or material make-up. These features will be further discussed below.

The first magnetic implant 12 is used with a second magnetic implant 14 to form a pair of magnetic implants. The second magnetic implant 14 is a device implantable into a second hollow organ of the digestive tract of the patient to the site of the desired anastomosis via the lumen of the second hollow organ. The second hollow organ of the digestive tract is located in sufficiently close proximity of the first hollow organ to enable the convergence of the respective wall tissue of the first hollow organ and the second hollow organ to eventually form the anastomosis.

The first and second magnetic implants 12, 14 are configured to remain within the digestive tract for at least a given healing time period. The healing time period enables necrosis of the anastomosis area while providing enough time for the edge of scar tissue to form. In some implementations, after approximately 3 to 5 days following implantation of the pair of magnetic implants at the desired site of the anastomosis, the periphery of the anastomosis is strengthened by collagen deposition, with the formation an edge of scar tissue having an increased tensile strength occurring at an estimated of approximately 7 to 10 days following implantation. The duration for forming the scar tissue can vary depending on the overall health of the individual patient, and depending on the specific parts of the digestive tract being joined. The scar tissue can also gain strength over the course of several additional weeks. In some implementations, it can be desirable for the magnetic implants to be released and passed out of the body of the patient about two weeks after implantation. In some implementations, the healing time period can be about two weeks, or at least two weeks.

Each one of the first and second magnetic implants 12, 14 can be navigated to the site of the desired anastomosis using various techniques. For instance, the magnetic implants 12, 14 can be delivered to the site of the desired anastomosis endoscopically, or at least one of the first and second magnetic implants can be delivered to the site of the desired anastomosis laparoscopically. Alternatively, one or both of the first and second magnetic implants 12, 14 can be swallowed by the patient and be delivered to the site of the desired anastomosis via natural processes such as peristalsis.

Each one of the first and second magnetic implants 12, 14 can have any suitable shape and size determined in accordance with their intended purpose. In some implementations, the size and the shape of the magnetic implant can be determined for instance in accordance with the characteristics of the site of the desired anastomosis, the delivery technique chosen to deliver the magnetic implant to the site of the desired anastomosis, and so on. In some implementations, the magnetic implant can have for example an elliptic shape, a circular shape, an elongated shape, a rectangular shape, an octagonal shape, or any other polygonal shape in terms of its cross-section. The magnetic implant can include rounded corners to facilitate navigation into the digestive tract. The magnetic implant can have an aspect ratio of about 1:1 (e.g., in the case of a circular cross-section) or an aspect ratio of about 1:1.5, about 1:2 to about 1:40, about 1:2 to about 1:4, about 1:3 to about 1:20, about 1:4 to about 1:15, for example, or another aspect ratio. It is to be understood that when referring to an elongated magnetic implant, such magnetic implant is considered to have an aspect ratio greater than 1:1. In some implementations, the shape and size of the retention member 16 can be adapted in accordance with the shape and size of the corresponding magnetic implant. For instance, in some implementations, the height of the magnetic implant can be proportional to the thickness of the magnet contained therein and hence desired magnetic strength.

Each of the first and second magnetic implants 12, 14 includes a magnetic body 17 having a tissue-oriented surface 30 that is configured to be oriented toward the tissue of, and potentially contact, the corresponding hollow organ once the magnetic implant is delivered to the site of the desired anastomosis. The tissue-oriented surface 30 can also be referred to as a compression surface. The magnetic body 17 also includes a lumen-oriented surface 42 opposite the tissue-oriented surface 30, the lumen-oriented surface 42 generally facing the lumen of the hollow organ once the magnetic implant is delivered to the site of the desired anastomosis. Although the description made above relative to the tissue-oriented surface 30 and the lumen-oriented surface 42 is with reference to the magnetic body 17, it is to be understood that as used herein, these expressions can also be interpreted as being applicable to the overall magnetic implant, the magnet itself (for instance if the magnet is not received in a housing), or to the housing if the magnet is received in a housing. Each of these components can thus be interpreted as including a tissue-oriented surface 30 and a lumen-oriented surface 42 in order to determinate their orientation with respect to the wall of the hollow organ into which they are intended to be implanted.

In some implementations, the tissue-oriented surface 30 can be substantially continuous and flat, as shown in FIG. 1. This can contribute to evenly distribute the force of the magnetic implant onto the tissue once the first and second magnetic implants 12, 14 are magnetically coupled together. In other implementations, the tissue-oriented surface 30 of the first magnetic implant 12 can have a complementary shape compared to the tissue-oriented surface 30 of the second magnetic implant 14. For example, the first magnetic implant 12 can have a curvilinear surface that is inwardly curved, i.e., concave, and the second magnetic implant 14 has a complementary curvilinear surface that is outwardly curved, i.e., convex, for the first magnetic implant 12 to mate therewith.

In other implementations, the tissue-oriented surface 30 can include features such as ridges, crests, furrows, grooves, and the like. For instance, the tissue-oriented surface 30 of the first magnetic implant 12 can include a series of ridges, and the second magnetic implant 14 can include a complementary series of furrows such that when the first and second magnetic implants 12, 14 are magnetically coupled, the first and second magnetic implants 12, 14 can interlock and/or self-align to increase the stability of their positioning on their respective sides of the first and second hollow organs. In some implementations, only one of the magnetic implants can include a tissue-oriented surface 30 having a convex feature.

In some implementations, the first and second magnetic implants 12, 14 can have a similar size and a similar or complementary shape to facilitate the magnetic coupling through the wall tissues of the hollow organs. In other implementations, the first and second magnetic implants can 12, 14 can have a different size and shape depending on the application and the sought-after characteristics of the resulting anastomosis.

Still referring to FIGS. 1 to 4B, the first magnetic implant 12 includes a first through-hole 40 extending between the lumen-oriented surface 42 and the tissue-contacting surface 30, and the second magnetic implant 14 includes a second through-hole 41 extending between the lumen-oriented surface 42 and the tissue-contacting surface 30. In some implementations, at least one of the through-holes 40, 41 can be shaped and dimensioned to receive or accommodate at least a portion of a surgical cutting instrument or a cutting mechanism, as will be discussed in further detail below. For instance, the through-holes 40, 41 can have an elliptic shape, a circular shape, an elongated shape, a rectangular shape, an octagonal shape, or any other polygonal shape in terms of its cross-section. The through-holes 40, 41 can further include rounded corners or angled corners. Moreover, the through-holes 40, 41 can have an aspect ratio of about 1:1 (e.g., in the case of a circular cross-section) or an aspect ratio of about 1:2 to about 1:40, about 1:2 to about 1:4, about 1:3 to about 1:20, about 1:4 to about 1:15, for example, or another aspect ratio. In implementations illustrated in FIGS. 1 to 4B, each of the first and second through-holes 40, 41 has an elongated shape with rounded corners. Accordingly, given the presence of the first and second through-holes 40, 41 in the first and second magnetic implants 12, 14, the tissue-contacting surface 30 of each of the first and second magnetic implants 12, 14 forms an annular shape. In some implementations, when the first and second magnetic implants 12, 14 are elongated magnetic implants, each of the first and second through-holes 40, 41 can be an elongated through-hole defined in a same orientation as the first and second elongated magnetic implants 12, 14.

In some implementations, a cross-sectional area of the first through-hole 40 of the first magnetic implant 12 can be selected in relation to a surface area of the tissue contacting surface 30 of the first magnetic implant 12. For instance, a ratio between the surface area of the tissue-contacting surface 30 of the first magnetic implant 12 and the cross-sectional area of the first through-hole 40 can be, in some implementations greater than 2.5, in some implementations greater than 5, in some implementations greater than 7.5, and in some implementations greater than 10.

Referring to FIGS. 4A and 4B, a transverse width of the through-hole 40 of the first magnetic implant 12 (also referred to as a transverse through-hole width "$T_H$") can be selected according to various factors. For instance, in some implementations, the transverse through-hole width $T_H$ can be selected in accordance with a desired site of the anastomosis, i.e., the hollow organ into which the magnetic implant 12 is intended to be implanted. In some implementations, the transverse through-hole width $T_H$ can be selected in accordance with a desired size of the preliminary passageway that is intended to be created inwardly of the inner periphery of the annular portion during the healing time period. For instance, in implementations in which the first magnetic implant 12 is configured to be implanted in the stomach and the second magnetic implant 14 is configured to be implanted in the jejunum, the transverse through-hole width $T_H$ can be selected to enable creating a preliminary passageway sized to enable passage of fluids (including liquids and gas) from the stomach to the jejunum. In implementations in which one of the first and second magnetic implants 12, 14 is configured to be implanted, for instance, in the large intestine, the transverse through-hole width $T_H$ of the one of the first and second magnetic implants 12, 14 can be selected to enable creating a preliminary passageway sized to enable passage of solid matter, i.e., fecal matter therethrough. In some implementations, the transverse through-hole width $T_H$ can be at least 1 mm, at least 2 mm, or at least 5 mm. In some implementations, the transverse through-hole width $T_H$ can range between about 1 mm to about 10 mm, or between about 2 mm and about 9 mm. In some implementations, the transverse through-hole width $T_H$ can be determined in relation with another dimension of a given portion of the magnetic body 17, as will be discussed in further detail below. In some implementations, the transverse trough-hole width $T_H$ of the through-hole 40 can be substantially constant along a longitudinal axis of the magnetic body 17. In other implementations, the transverse trough-hole width $T_H$ of the through-hole 40 can vary along a longitudinal axis of the magnetic body 17.

As mentioned above, in some implementations, at least one of the through-holes 40, 41 can be shaped and dimensioned to receive or accommodate at least a portion of a surgical cutting instrument. In such implementations, the through-holes 40, 41 can be sized to receive a cutting tip of a surgical cutting instrument therein to enable cutting an opening through the two adjacent walls, inwardly from the inner periphery of the annular portion. For instance, the through-holes 40, 41 can be configured so that the cutting tip of the surgical cutting instrument can travel along a chord extending across a cutting region located inwardly of the inner periphery of the annular portion. It is to be understood that the term "chord" refers to a straight or substantially straight line extending between a first end and a second end located inwardly of the inner periphery of the annular portion. For instance, in the implementation shown in FIGS. 1 to 4B, the first through-hole 40 is an elongated through-hole, and there can be a chord 39 (shown in a dotted line in FIG. 1) extending across the cutting region, i.e., between a first end and a second end located inwardly of the inner periphery of the annular portion. In some implementations, a length of the chord can be defined in accordance with a size of the cutting tip of the surgical cutting instrument. For instance, in some implementations, the end points of the chord can be defined in accordance with an interference between the cutting tip of the surgical cutting instrument and an inner sidewall of the magnetic implant.

Still referring to FIGS. 4A and 4B, each of the first and second magnetic implants 12, 14 includes first and second end portions 32, 33 longitudinally spaced-apart from each other, and an intermediate portion 34 extending between the first and second end portions 32, 33. In the implementation shown, the transition from the first end portion 32 to the intermediate portion 34 and from the intermediate portion 34 to the second end portion 33 is shown by corresponding dotted lines. In this implementation, the transition from the first end portion 32 to the intermediate portion 34 occurs at one longitudinal end of the through-hole 40, and the transition from the intermediate portion 34 to the second end portion 33 occurs at the other longitudinal end of the through-hole 41. It is to be noted that the locations of these transitions are shown for exemplary purposes only, and that in other implementations, these locations can vary. The intermediate portion 34 includes first and second arms 34a, 34b extending between the first and second end portions 32, 33, and on opposite sides of the respective one of the first and second through-holes 40, 41, such that the first and second arms 34a, 34b at least partially define the respective one of the first and second through-holes 40, 41. In this implementation, the first and second arms 34a, 34b fixedly extend between the first and second end portions 32, 33. In other words, the first and second arms 34a, 34b are non-articulating arms and are configured to substantially retain their shape so as to maintain a fixed shape of the first magnetic implant 12. In some implementations, the intermediate portion 34 can thus be integral with the first and second end portions 32, 33. In other implementations, the intermediate portion 34 and the first and second end portions 32, 33 can form distinct elements of the first and second magnetic implants 12, 14 that are not necessarily integral with each other. In some implementations, a longitudinal extent $L_E$ of each one of the first and second end portions 32, 33, i.e., a longitudinal length of the first and second end portions 32, 33, can be determined in accordance with an intermediate portion length $L_I$, i.e., a longitudinal length of the intermediate portion 34. For instance, in some implementations, the longitudinal extent $L_E$ of each of the first and second end portions 32, 33 can be at least 50% of an intermediate portion length $L_I$, at least 75% of the intermediate portion length $L_I$, or be greater than the intermediate portion length $L_I$.

The first and second magnetic implants 12, 14 are configured to magnetically couple to each other at a target site of a desired anastomosis with the first through-hole 40 of the first magnetic implant 12 being at least partially superposable to the second through-hole 41 of the second magnetic implant 14. As used herein, the expression "superposable" refers to an alignment or positioning of the first through-hole 40 of the first magnetic implant 12 and the second through-hole 41 of the second magnetic implant 14 when the first and second magnetic implants 12, 14 are magnetically coupled to each other.

As mentioned above, given the presence of the first and second through-holes 40, 41 that are at least partially superposed once the first and second magnetic implants are magnetically coupled to each other and the tissue-contacting surfaces 30 of the first and second magnetic implants 12, 14 being annular, the portion of tissue of the adjacent walls of the first and second hollow organs that is compressed between the tissue-contacting surfaces 30 of the first and second magnetic implants 12, 14 is also annular, thus forming an annular portion of magnetically compressed tissue. In other words, the annular tissue-contacting surfaces 30 of the first and second magnetic implants 12, 14 compress the tissue of the two adjacent walls to form an annular portion of compressed tissue. In such implementations, a region located inwardly from an inner periphery of the annular portion of the compressed tissue and thus composed of the tissue positioned within the superposed through-holes 40, 41 of the first and second magnetic implants 12, 14 can remain substantially uncompressed. As used herein, the expression "uncompressed" refers to tissue 38 of the two adjacent walls that is located inwardly of the inner periphery of the annular portion, which can or can not be subjected to a compression force generated by the magnetic coupling of the first and second magnetic implants 12, 14, albeit a compression force that is lesser than the compression force that is generated directly between the annular tissue-contacting surfaces 30 of the first and second magnetic implants 12, 14.

Once implanted in the digestive tract, the first and second magnetic implants 12, 14 may be subjected to external forces, which in turn can result in an undesired movement, e.g., translation, of one or both of the first and second magnetic implants 12, 14 along a corresponding one of the adjacent walls. This movement of the one or both of the first and second magnetic implants 12, 14 can undesirably lead to a positioning of the preliminary passageway in a region located outwardly from an outer periphery of the annular portion, which in turn can potentially result in an undesirable leakage of digestive fluids out of the digestive tract, for instance if the translation of the one or both of the first and second magnetic implants 12, 14 occurs prior to the fusion, or mechanical bonding, of the adjacent walls of each of the first and second hollow organs.

To address this challenge, in some implementations, the first and second arms 34a, 34b can be sized such that if such movement occurs, the preliminary passageway can nonetheless remain within the outer periphery of the magnetic body 17, i.e., within the annular portion of the compressed tissue.

Figure 33:
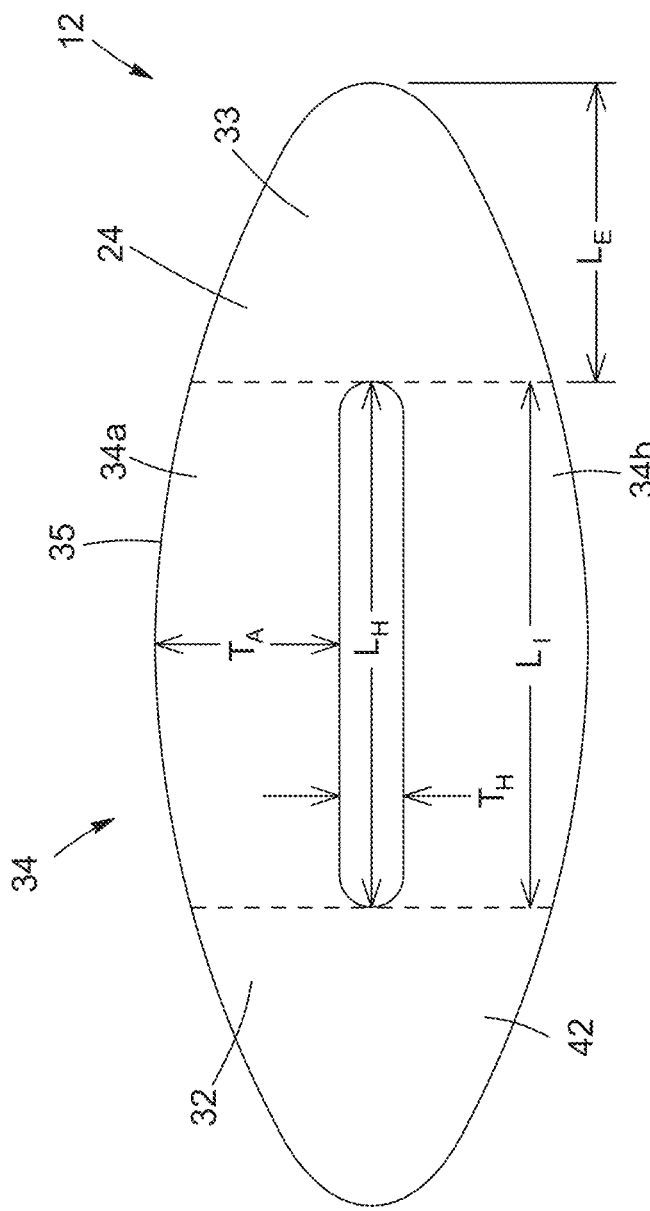
FIG. 33 is a top view of a magnet that includes a through-hole, in accordance with another implementation.

To illustrate this aspect, reference is now made to FIGS. 4B and 33. In FIGS. 4B and 33, each of the first and second arms 34a, 34b has a transverse arm width $T_A$ measured along a transverse axis of the magnetic body 17. The transverse arm width $T_A$ of the first and second arms 34a, 34b is shown as being greater than the transverse through-hole width $T_H$. As mentioned above, this configuration of the magnetic body 17 can contribute to reduce the risk that the preliminary passageway ends up in a region located outwardly from an outer periphery of the annular portion, following a potential movement, e.g., translation, of the magnetic implant 12, 14, for instance in a transverse direction. Thus, even if the magnetic implant 12, 14 moves slightly, the first and second arms 34a, 34b that are wider (i.e., that have a greater transverse arm width $T_A$) relative to the transverse through-hole width $T_H$ can facilitate maintaining the preliminary passageway within the outer periphery of the magnetic implant 12, 14. In some implementations, a ratio between the transverse arm width $T_A$ of the first and second arms 34a, 34b and the transverse through-hole width $T_H$ can be greater than 1.1, greater than 1.2, greater than 1.25, greater than 1.5, greater than 2, greater than 3, greater than 4, or greater than 5. In some implementations, the transverse arm width $T_A$ of the first and second arms 34a, 34b can be substantially constant along a longitudinal axis of the magnetic body 17 (for instance as shown in FIG. 4A). Alternatively, in other implementations, the transverse arm width $T_A$ of the first and second arms 34a, 34b can vary along the longitudinal axis of the magnetic body 17. For instance, in the implementation shown in FIGS. 4B and 33, each of the first and second arms 34a, 34b includes an outer sidewall 35 curved outwardly in the transverse direction of the magnetic implant 17, such that the transverse arm width $T_A$ of the first and second arms 34a, 34b is widest in a central region of the intermediate portion 34 compared to the transverse arm width $T_A$ of the first and second arms 34a, 34b in a region closer to the first and second end portions 32, 33. Providing an outer sidewall 35 that is curved outwardly can enable increasing the transverse arm width $T_A$ of the first and second arms 34a, 34b, while maintaining the overall elongated shape of the magnetic body 17. The elongated shape of the magnetic body 17 can facilitate delivery of the magnetic implant to the desired site of the anastomosis, while the outer sidewall 35 being curved outwardly can provide the increased transverse arm width $T_A$ of the first and second arms 34a, 34b compared to the transverse through-hole width $T_H$. Thus, although there can be variations in the transverse arm width $T_A$ and the transverse through-hole width $T_H$ along the longitudinal axis of the magnetic body 17, the transverse arm width $T_A$ of the first and second arms 34a, 34b can remain greater than the transverse through-hole width $T_H$, when measured along a given transverse axis of the magnetic body 17.

Still referring to FIGS. 4B and 33, each of the first and second end portions 32, 33 has a longitudinal length $L_E$ measured along a longitudinal axis of the magnetic body 17. In some implementations, the longitudinal length $L_E$ of the first and second end portions 32, 33 can be selected in relation to a through-hole length $L_H$ to further contribute to maintaining the preliminary passageway within the region located inwardly from the inner periphery of the annular portion or within the annular portion of the compressed tissue, for instance if a translation of the first and second magnetic implants 12, 14 in a longitudinal direction would occur. In some implementations, the longitudinal length $L_E$ of a given one, or each one, of the first and second end portions 32, 33 can be at least 50% of the through-hole length $L_H$, at least 75% of the through-hole length $L_H$, or the longitudinal length $L_E$ of the first and second end portions 32, 33 can be greater than the through-hole length $L_H$.

In some implementations, the cross-sectional area of the through-hole 40 of the first magnetic implant 12, measured on a plane being coplanar with the tissue-contacting surface 30, can be selected in relation to a surface area of the annular portion of magnetically compressed tissue, i.e., the surface area of the magnetic implant, for instance when the second through-hole has a different cross-section, e.g., larger, compared to the cross-section of the first through-hole. For instance, in some implementations, a ratio between the surface area of the annular portion of magnetically compressed tissue and the cross-sectional area of the first through-hole 40 can be, greater than 1.25, greater than 1.5, greater than 2, greater than 5, greater than 7.5, greater than 10, or greater than 15.

Figure 6:
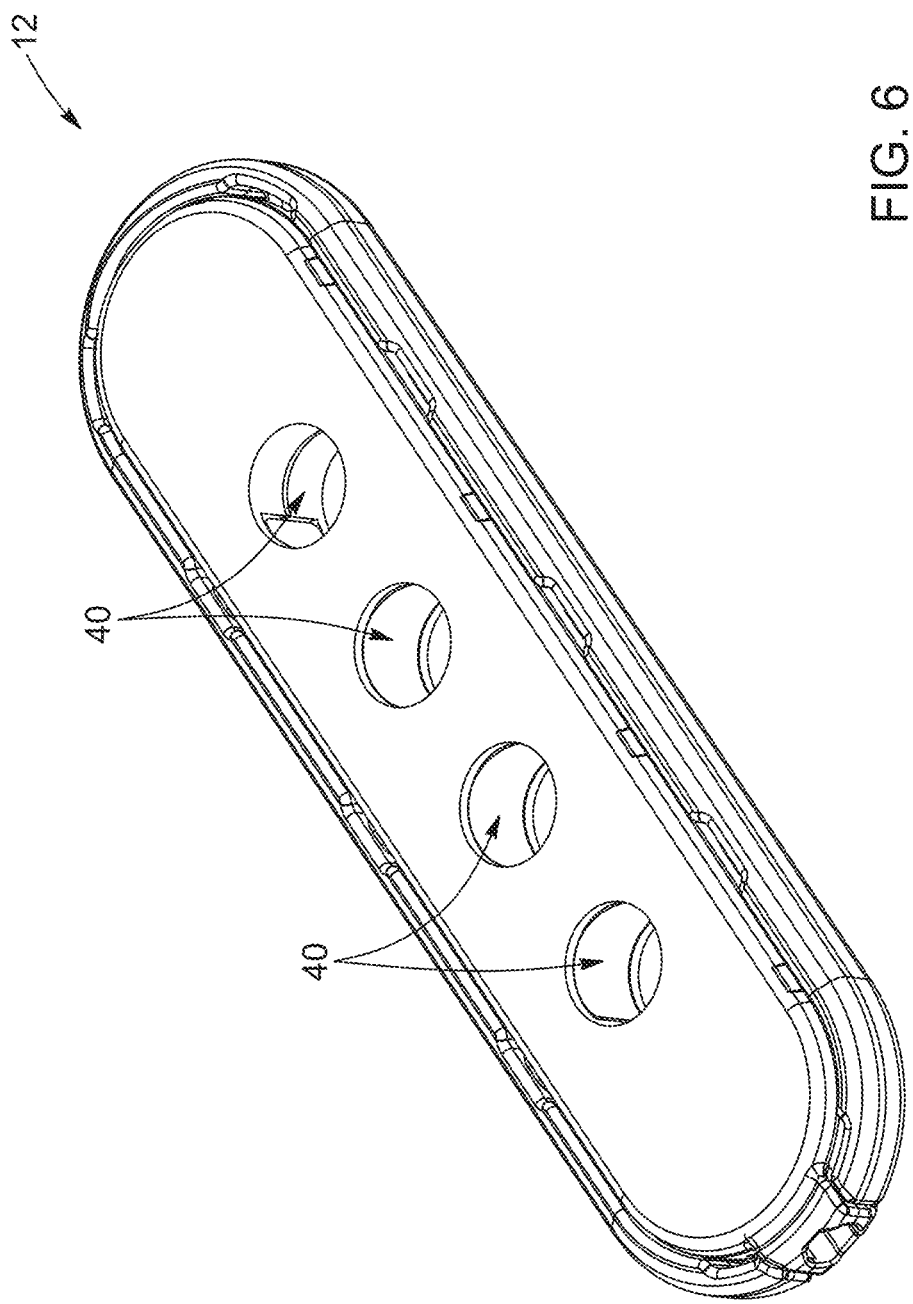
FIG. 6 is a top view of a magnetic implant that includes a plurality of through-holes, in accordance with an implementation.

Referring to FIG. 6, another implementation of a first magnetic implant 12 is illustrated, the first magnetic implant 12 comprising a plurality of first through-holes 40. In this implementation, the first magnetic implant 12 can be coupled with a second magnetic implant 14 that includes a same number of second through-holes 41, with each first through-hole 40 of the plurality of through-holes 40 of the first magnetic implant 12 being at least partially superposable to a corresponding second through-hole 41 of the plurality of second through-holes 41 when the first and second magnetic implants 12, 14 are magnetically coupled to each other. In other implementations, the first magnetic implant 12 comprising a plurality of first through-holes 40 can be magnetically coupled to a second magnetic implant 14 comprising any other suitable number of second through-holes 41. In other implementations, the first magnetic implant 12 can be coupled with a second magnetic implant 14 comprising a greater or fewer number of second through-holes 41. For instance, in some implementations, the second magnetic implant 14 can include a single though-hole 41 having a cross-section that encompasses the plurality of first through-holes 40. Alternatively, the second magnetic implant 14 can include one through-hole 41 per set of two first through-holes 40, one though-hole 41 per set of three through-holes 40 and so on. In some implementations, the number of first though-holes 40 can be determined in accordance with the number of openings that are desired to be created in the portion of tissue located inwardly of the inner periphery of the annular portion, as long as the single second though-hole 41 or the plurality of second though-holes 41 are provided such that the tissue can be cut therethrough.

As will be discussed in further detail below, the system 10 for forming an anastomosis between two adjacent walls can include one or more cutting mechanisms. In some implementations, when a plurality of cutting mechanism is present, each cutting mechanism of the plurality of cutting mechanisms can be insertable into a corresponding first through-hole of the plurality of first through-holes of the first magnetic implant, although other configurations are also possible.

Housing

In some implementations, the magnetic implant 12, 14 can include a magnet 24 and a housing 22 configured to house the magnet 24 therein. An example of housing 22 is shown in FIGS. 1 to 4B. As mentioned above, the housing 22 is shown as including an outward portion 26 and an inward portion 28. In the context of the present description, the terms "outward" and "inward" when referring to the housing 22 are used in accordance with a radial reference system, in which the wall of the hollow organ is considered to be outwardly positioned relative to the lumen of the hollow organ. When the housing 22 is present, the outward portion 26 of the housing 22 is the portion that includes the lumen-oriented surface 42 of the magnetic implant, and the inward portion 28 of the housing 22 is the portion that includes the tissue-contacting surface 30. In the implementation shown, the outward portion 26 and the inward portion 28 together fully enclose a single magnet 24 therein. In other implementations, the single magnet can be fully enclosed in a single-piece housing, i.e., a housing 22 that is made of a single unit, the single unit including the tissue-contacting surface 30 and the lumen-oriented surface 42 in accordance with the description above.

When the housing 22 is present, the outward portion 26 and the inward portion 28 of the housing 22 of the first magnetic implant 12 can be shaped to define the first through-hole 40 together with a corresponding magnet 24, and the outward portion 26 and the inward portion 28 of the housing 22 of the first magnetic implant 12 can be shaped to define the first through-hole 40 together with another corresponding magnet 24. In addition, when present, the housing 22 of the first magnetic implant 12 further defines a sidewall 44 of the first through-hole 40 that extends between the lumen-oriented surface of the outward portion 26 and the tissue-oriented surface of the inward portion 28 of the housing 22. Similarly, when present, the housing 22 of the second magnetic implant 12 further defines a sidewall 44 of the second through-hole 40 that extends between the lumen-oriented surface of the outward portion 26 and the tissue-oriented surface of the inward portion 28 of the housing 22.

In some implementations, the magnetic implant can include a housing that is configured to receive multiple magnets therein. Providing multiple magnets within a single housing can contribute to enhancing the flexibility of the magnetic implant, such that it can become easier to bend when subjected to a force.

In the same order of ideas, the description made above regarding the characteristics of the tissue-oriented surface 30 of the magnetic implant is applicable to the housing 22 when the housing is present or when housings are present.

Magnet

The magnet 24 can be any type of suitable magnet composed of the appropriate material. In some implementations, the magnet 24 can be chosen according to its attractive force, i.e., according to the pressure that will be exerted on the surface area of the tissue that will eventually be compressed between the first and second magnetic implants 12, 14. Factors influencing the attractive force of the magnet 24 can include the shape of the magnet 24, the thickness of the magnet 24, the material of which the magnet 24 is made, etc. Example materials include neodymium magnets (e.g., NdFeB magnets), rare earth magnets, and ferrite magnets.

In some implementations, the magnet or magnets of a first magnetic implant 12 can be made of a magnetic material that is not permanently magnetized, such as soft magnetic alloys, e.g., nickel-iron, silicon iron, iron, iron-cobalt, and ferritic stainless steels. In other words, the magnet(s) of respective magnetic implants may not be constructed of two permanent magnets. In other implementations, the magnets of a first and second magnetic implants can be constructed of two permanent magnets.

Referring to FIGS. 5A and 5B, an implementation of a magnet 24 of a magnetic implant is shown. The magnet 24 can be configured to be received within a housing 22 as described above. When the magnetic implant includes the magnet 24 without a housing, the magnet 24 includes a magnetic body defining the through-hole, such that the through-hole can be defined in the magnet 24 itself. When the magnetic implant includes a housing and a magnet, the housing and the magnet together form a magnetic body defining the though-hole.

In some implementations, each one of the first and second magnetic implants 12, 14 includes a housing 22 and a magnet 24 received in the housing, the housing and the magnet together forming the magnetic body defining a corresponding though-hole. It is to be understood that although only a single magnet 24 is shown within each housing 22, for instance in FIGS. 4A and 4B, in other implementations, the housing 22 can be configured to house any other suitable number of magnets. For instance, a series of adjacent magnets can be received within a single housing, with the succession of adjacent magnets being positioned annularly so as to define a through-hole.

Figure 34:
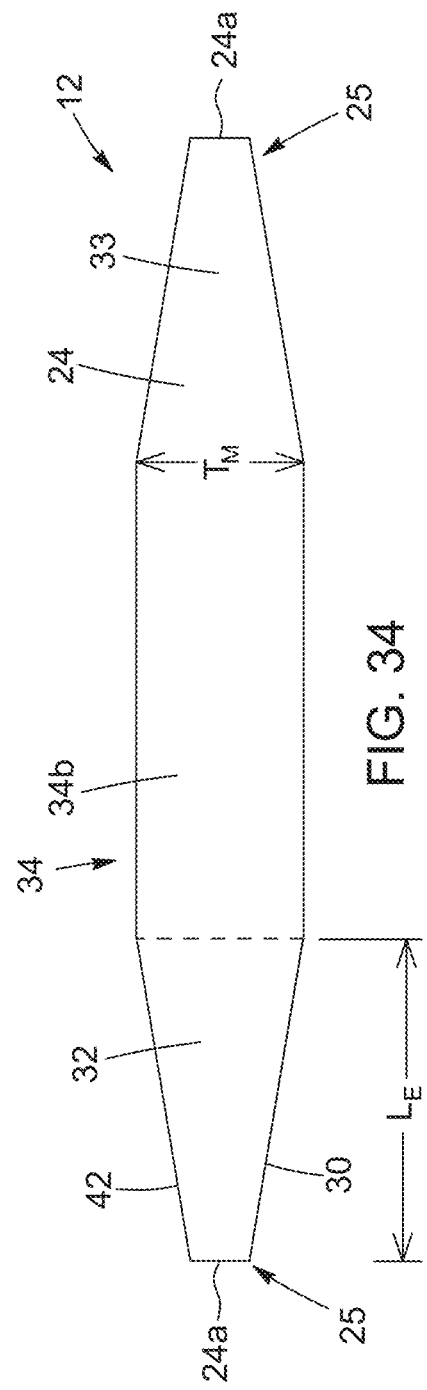
FIG. 34 is a side elevation view of the magnet of FIG. 33.

Predefined Shape of Magnet and/or Housing to Facilitate Self-Alignment of Magnetic Implants In some implementations, a shape of the magnet 24 can be chosen to facilitate a self-alignment of the first and second magnetic implants 12, 14 during magnetic coupling thereof. FIGS. 33 and 34 illustrate an implementation of such magnet 24. In this implementation, the magnet 24 includes a tissue-oriented surface 30 and a lumen-oriented surface 42, and has a magnet thickness $T_M$ defined between the tissue-oriented surface 30 and the lumen-oriented surface 42. The magnet thickness $T_M$ varies in a longitudinal direction of the magnet 24. In the illustrated implementation, the magnet thickness $T_M$ is continuously reduced over a longitudinal extent ($L_E$) of each one of the first and second end portions 32, 33 of the magnet 24. In the illustrated implementation, the magnet thickness $T_M$ is continuously reduced over a longitudinal extent of each one of the first and second end portions 32, 33 in a direction moving away from the intermediate portion 34, to define tapered ends 25 of the magnet 24.

In some implementations, the magnet thickness $T_M$ of the magnet 24 can be reduced by having the tissue-oriented surface 30 of a given one of the first and second end portion 32, 33, or both, converge toward the lumen-oriented surface 42, while the lumen-oriented surface 42 can remain substantially straight rather than being angled, or by having the lumen-oriented surface 42 of a given one of the first and second end portion 32, 33, or both, converge toward the tissue-oriented surface 30, while the tissue-oriented surface 30 can remain substantially straight rather than being angled. Alternatively, in other implementations, the magnet thickness $T_M$ of the magnet 24 can be reduced by having the tissue-oriented surface 30 and the lumen-oriented surface 42 of a given one of the first and second end portions 32, 33, or both, converge toward each other, such that the given one of the first and second end portions 32, 33 forms a truncated triangle when viewed from the side, as shown in FIG. 34. It is to be understood that although FIG. 34 illustrates a truncated triangle, in other implementations, the convergence the tissue-oriented surface 30 and the lumen-oriented surface 42 can alternatively result in a triangle that is not truncated. Furthermore, even though sharp edges are shown in the schematic representation of the magnet 24 in FIG. 34, the edges of the magnet 24 can be modified to define atraumatic, i.e., rounded edges.

During the implantation of the first and second magnetic implants 12, 14 at the desired site of the anastomosis, the first magnetic implant 12 may be located within the first hollow organ at a position that is longitudinally spaced-apart from the second magnetic implant 14 within the second hollow organ. The attractive force of the respective magnets 24 of the first and second magnetic implants 12, 14 can drive the first and second magnetic implants 12, 14 to translate towards one another, for instance as a result of the physical structure of the magnet itself (e.g., a reduced magnet thickness $T_M$ at the end portions 32, 33), and/or due to a multipole structure of the magnet 24. In some implementations, the tapered end(s) 25 of the magnet 24 can enable a self-alignment of the first and second magnetic implants 12, 14 during the translation of the first and second magnetic implants 12, 14 towards each other. In some implementations, the tapered end(s) 25 of the magnet 24 can enable the first and second magnetic implants 12, 14 to translate relative to one another into a magnetic coupling alignment of the first and second magnetic implants 12, 14 in which the respective through-holes 40, 41 of the first and second magnetic implants 12, 14 are superposable, or at least partially superposable, to each other, and the first and second magnetic implants 12, 14 compress an annular portion of the two adjacent walls therebetween. Accordingly, the self-alignment of the first magnetic implant with the second magnetic implant can thus be considered as a longitudinal self-alignment, i.e., a sliding movement of the first magnetic implant 12 relative to the second magnetic implant 14, or vice versa.

Still referring to FIG. 34, in the implementation shown, the magnet thickness $T_M$ of the magnet 24 is continuously reduced over the longitudinal extent of both the first and second end portions 32, 33 in a direction moving away from the intermediate portion 34. In other implementations, the magnet thickness $T_M$ of the magnet 24 can be continuously reduced over the longitudinal extent of one the first and second end portions 32, 33 in a direction moving away from the intermediate portion 34.

In some implementations, when the magnetic implant includes a housing 22, the housing 22 can adopt a shape of the magnet 24. In such implementations, the housing 22 can have a thickness that does not significantly vary in a longitudinal direction of the magnetic implant, but given that the housing 22 adopts the shape of the magnet 24, the resulting magnetic body or magnetic implant has a thickness that varies in accordance with a variation of the magnet thickness $T_M$ to enable the self-alignment of the first and second magnetic implants 12, 14 described above, resulting in an overall shape of the magnetic body as shown in FIGS. 33 and 34.

Figure 37:
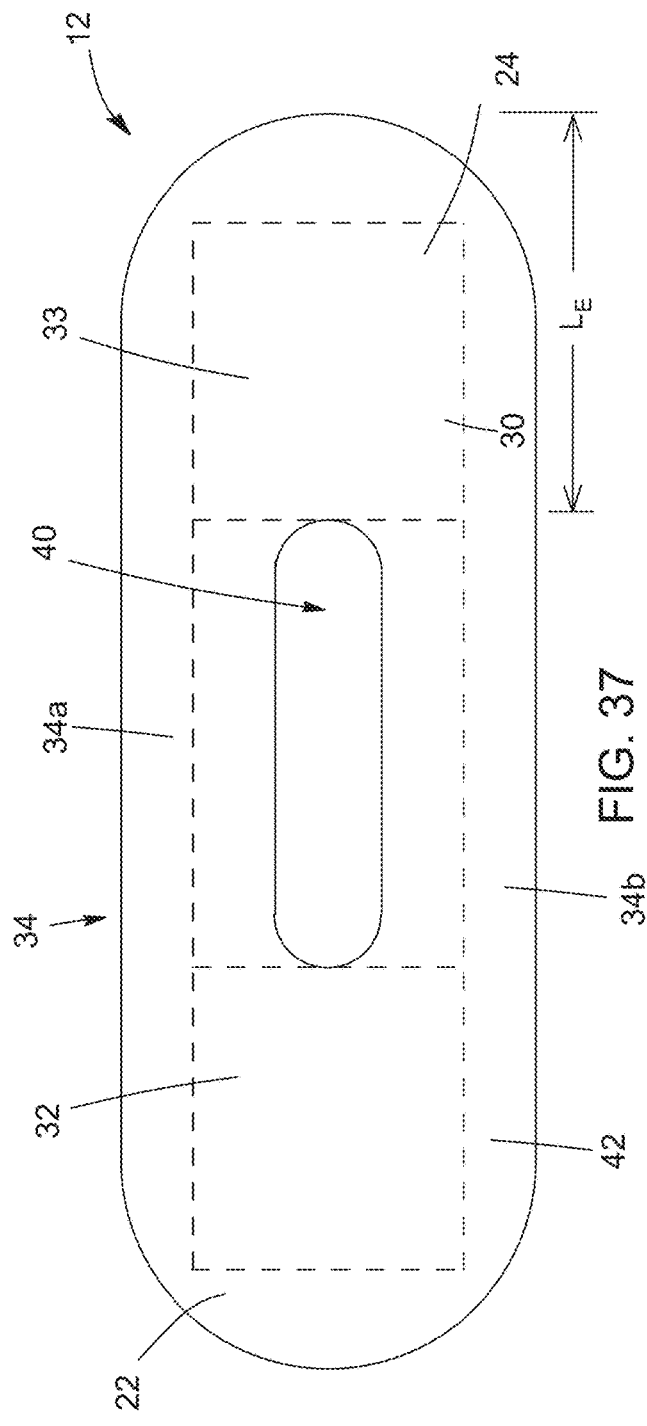
FIG. 37 is a top view of a first magnetic implant that includes a housing and a magnet received in the housing, in accordance with another implementation.
Figure 38:
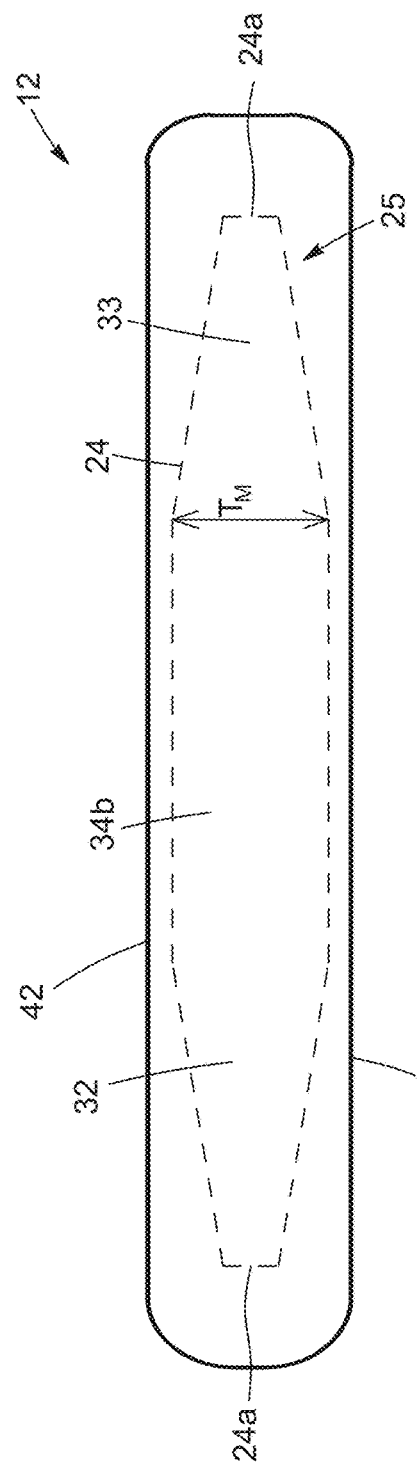
FIG. 38 is a side elevation view of the magnet of FIG. 37.

With reference to FIGS. 37 and 38, in other implementations, the thickness of the housing 22 can vary along the longitudinal extent of the end portions 32, 33 compared to the thickness of the housing 22 along the intermediate portion 34. In such implementations, the housing 22 does not adopt the shape of the magnet 24 and can rather define a substantially continuous and flat tissue-contacting surface 30 over the end portions 32, 33 and the intermediate portion 34 (the housing being thicker at the end portions 32, 33 compared to the intermediate portion 34, such that overall the housing 22 is substantially flat), while the magnet 24 can be as described with reference to FIGS. 33 and 34. When the magnetic implant is configured in this manner, a magnetic field generated by the magnet 24 housed within the housing 22 can promote a self-alignment of the first and second magnetic implants 12, 14. In some implementations, portions of the magnet 24 extending along the end portions 32, 33 of the first magnetic implant 12, i.e., the portions of the magnet 24 having a reduced magnet thickness $T_M$, can generate a magnetic field that is different compared to a magnetic field generated by a portion of the magnet extending along the intermediate portion 34 of the first magnetic implant 12, for instance as a result of the physical structure of the magnet itself (e.g., a reduced magnet thickness $T_M$ at the end portions 32, 33), and/or due to a multipole structure of the magnet 24. When the first magnetic implant 12 is coupled with a second magnetic implant 14 having a similar (complementary) configuration, the interaction between the magnetic fields generated by different zones or regions of the magnet 24 of the first and second magnetic implants 12, 14 can overall enable the first and second magnetic implants 12, 14 to translate relative to one another and self-align into a magnetic coupling alignment of the first and second magnetic implants 12, 14 in which the respective through-holes 40, 41 of the first and second magnetic implants 12, 14 are superposable, or at least partially superposable, to each other.

The variation in the magnet thickness $T_M$ of the magnet 24 in the longitudinal direction of the magnet 24 can define a thickness reduction factor expressed as a ratio between the magnet thickness $T_M$ at the transition between the intermediate portion and a given one of the end portions 32, 33 of the magnet 24 and the magnet thickness $T_M$ at the longitudinal end 24a of the magnet 24. In some implementations, the thickness reduction factor of the magnet 24 over the longitudinal extent of the end portion 32, 33 can range between about 80% and about 90%, between about 70% and about 80%, or between about 50% and about 60%.

Referring to FIGS. 35 and 36, another implementation of a first magnetic implant 12 is shown. In this implementation, the first magnetic implant 12 includes a housing 22 configured to receive a magnet 24 therein. The magnet 24 has a magnet thickness $T_M$ that may or may not vary in a longitudinal direction of the magnet 24. In the implementation shown, the magnet 24 is shaped substantially as a rectangular prism (such as shown in FIGS. 5A and 5B), and thus the magnet thickness $T_M$ of the magnet 24 can be considered as being substantially constant in a longitudinal direction thereof. In this implementation, the housing 22 has a housing thickness $T_H$ that is continuously reduced over a longitudinal extent of each one of the first and second end portions 32, 33 of the first magnetic implant 12 to enable the self-alignment of the first and second magnetic implants 12, 14 described above. The housing 22 extends beyond a longitudinal end 24a of the magnet 24, a majority of the magnet 24 being located in the intermediate portion 34 of the first magnetic implant 12. In such implementations, the housing thickness $T_H$ at the end portions 32, 33 can be considered independent of the magnet thickness $T_M$, and the housing thickness $T_H$ can potentially be reduced to a thickness being less than the magnet thickness $T_M$ of the magnet 24 to define tapered ends 25 of the housing 22. As described above, in some implementations, the tapered end 25 of the housing 22 can enable the first and second magnetic implants 12, 14 to translate relative to one another into a magnetic coupling alignment of the first and second magnetic implants 12, 14 in which the respective through-holes 40, 41 of the first and second magnetic implants 12, 14 are superposable, or at least partially superposable, to each other, and the first and second magnetic implants 12, 14 compress an annular portion of the two adjacent walls therebetween. The variation of the housing thickness $T_H$ of the housing 22 in the longitudinal direction of the housing 22 can define a thickness reduction factor expressed as a ratio between the housing thickness $T_H$ at the transition between the intermediate portion 34 and a given one of the end portions 32, 33 of the first magnetic implant 12 and the housing thickness $T_H$ at the longitudinal end 22a of the housing 22. In some implementations, the thickness reduction factor of the housing 22 over the longitudinal extent of the end portion 32, 33 can range between about 80% and about 90%, between about 70% and about 80%, or between about 50% and about 60%.

In some implementations, the magnet thickness $T_M$ of the magnet 24 can be substantially constant over the intermediate portion length $L_I$ so as to define a substantially continuous and flat tissue-contacting surface 30 over the intermediate portion 34 of the first and second implants 12, 14, as shown in FIGS. 34 and 36. The substantially continuous and flat tissue-contacting surface 30 over the intermediate portion 34 can, in some implementations, contribute to evenly distribute the force of the magnetic implant onto the tissue once the first and second magnetic implants 12, 14 are magnetically coupled together.

Regardless of the shape of the magnet 24 (e.g., whether the magnet 24 includes tapered ends 25 or not, includes a hinge or not, etc.), the magnet 24 of the first magnetic implant 12 can be configured to generate one or more resulting magnetic fields capable of providing a desired magnetic interaction between the first magnetic implant 12 and the second magnetic implant 14 when the first magnetic implant 12 is placed in sufficiently close proximity of the second magnetic implant, this magnetic interaction being dependent on the spatial orientation or positioning of the first magnetic implant 12 relative to the second magnetic implant 14. In order to do so, the magnet 24 can be provided as a unitary magnet (in contrast to a train of a plurality of magnets with adjacent magnets being moveable relative to each other), and can have a multipole structure. To provide the multipole structure, the magnet 24 can include multiple magnetic poles positioned according to a pre-determined spatial arrangement that defines the resulting magnetic field(s). The magnet 24 of the second magnetic implant 14 can also be configured to generate one or more resulting magnetic field(s) capable of providing a desired magnetic interaction when placed in proximity of the first magnetic implant 12 that is dependent on the spatial orientation or positioning of the second magnetic implant 14 relative to the first magnetic implant 12, such that the resulting magnetic field(s) of the first magnetic implant 12 and the resulting magnetic field(s) of the second magnetic implant 14 can interact with each other and be magnetically couple to each other in a self-alignment configuration, i.e., in a pre-determined spatial orientation. The self-alignment configuration can be the result of a selected translation of the first magnetic implant 12 relative to the second magnetic implant 14 or vice versa, and/or a rotation of the first magnetic implant 12 relative to the second magnetic implant 14 or vice versa, for instance, among other interactions.

This effect can be achieved in various ways. For instance, in the implementation shown in FIG. 5B, the magnet 24 includes discrete magnet elements 24b each having a given magnetic pole distribution. In some implementations, the discrete magnet elements 24b can be permanent magnets provided in a fixed spatial arrangement to define one or more resulting magnetic field(s) of the magnet 24. The discrete magnet elements 24b are provided according to a pre-determined spatial arrangement to define the resulting magnetic field(s). For instance, in the implementation shown in FIG. 5B, the magnet 24 includes an array of discrete magnet elements 24b disposed along a longitudinal axis $A_M$ of the magnet 24, with each of the discrete magnet elements 24b having a given magnetic pole distribution (indicated by the magnetic pole N, S) to achieve the pre-determined spatial arrangement of magnetic poles and the multipole structure. The pole distribution of each discrete magnet element 24b can be a North-South pole distribution, a South pole only, or a North pole only. It will be understood that the spatial arrangement of the discrete magnet elements 24b shown in FIG. 5b is presented for purposes of exemplification only and that, in other implementations, the discrete magnet elements 24b can have any other spatial arrangement and magnetic pole distribution to obtain the desired resulting magnetic field(s). Accordingly, the size of the discrete magnet elements 24b can vary, the number of discrete magnet elements 24b can vary, their respective magnetic pole distribution can vary, etc.

When the first magnetic implant 12 having such magnet 24 is brought in sufficiently close proximity of the second magnetic implant 14, the discrete magnet elements 24b of the first magnetic implant 12 can magnetically interact with the discrete magnet elements 24b of the second magnetic implant 14 such that their position relative to one another can result in their alignment. This preferential alignment of the first and second magnetic implants 12, 14 can be the result of a peak spatial attraction force between corresponding ones of the discrete magnet elements 24b of the first and second magnetic implants 12, 14, determined in accordance with their pre-determined spatial arrangements. In contrast, when the discrete magnet elements 24b of the first magnetic implant 12 are in misalignment with the discrete magnet elements 24b of the second magnetic implant 14, the discrete magnet elements 24b of the first magnetic implant 12 can cancel out or generate a repelling force relative to the discrete magnet elements 24b of the second magnetic implant 14, such that the first and second magnetic implants 12, 14 would not be magnetically coupled unless being repositioned in the desired self-alignment configuration. The magnetic interaction between the discrete magnet elements 24b of the first magnetic implant 12 and the discrete magnet elements 24b of the second magnetic implant 14 can result in the first magnetic implant 12 translating and/or rotating relative to the second magnetic implant 14, or vice versa, via interaction of the first and second resulting magnetic fields, to achieve the self-alignment configuration. As such, in some implementations, a pre-determined attractive force can therefore be produced in accordance with the relative alignment of the first and second magnetic implants 12, 14 to achieve a precise self-alignment of the first and second magnetic implants 12, 14, for instance so that the first magnetic implant 12 can latch and lock into place with the second magnetic implant 14.

The characteristics of the magnet 24 with the multiple discrete magnet elements 24b described above can therefore provide first and second magnetic implants 12, 14 having respective resulting magnetic fields configured to interact with one another when the first and second magnetic implants 12, 14 are sufficiently close proximity, thereby forcing an alignment of the first magnetic implant 12 with the second magnetic implant 14 and their magnetic coupling only when the self-alignment configuration is achieved, and otherwise repelling or modifying a spatial orientation of the first and second magnetic implants 12, 14 via the interaction of the resulting magnetic fields until the desired self-alignment configuration is achieved.

In some implementations, the multipole structure of the unitary magnet 24 can be achieved by providing selected magnetized regions on or in the magnet 24 (or on or in a magnetizable material) in accordance with a pre-determined spatial arrangement to obtain desired resulting magnetic field(s). For instance, the unitary magnet 24 can be a coded magnet having magnet zones that are selectively and individually magnetized with maxels (magnetic pixels each having a given polarity, North or South) to achieve a desired pre-determined spatial arrangement of magnetic poles (for instance with a plurality of North poles and a plurality of South poles being defined on the surface of the magnet 24). Commercial examples of coded magnets include for instance correlated magnets such as Polymagnets™. In some implementations, the selective magnetization of the magnet zones can generate resulting magnetic fields that enable any type of spatial magnetic interaction between the first magnetic implant 12 and the second magnetic implant 14. These spatial interactions between the first magnetic implant 12 and the second magnetic implant 14 can include a translation of the first magnetic implant 12 relative to the second magnetic implant 14 or vice versa, a rotation between the first magnetic implant 12 and the second magnetic implant 14, a latch between the first magnetic implant 12 and the second magnetic implant 14 (with the first and second magnetic implants hovering over each other until the self-alignment configuration is achieved and the first magnetic implant 12 and the second magnetic implant 14 can be together locked into place), etc.

Description of an Integrated Cutting Mechanism

Referring to FIGS. 7 to 24, a system for forming an anastomosis at a target site between two adjacent walls of a digestive tract according to various implementations is shown. The system includes the first and second magnetic implants 12, 14 as described above, and further includes a cutting mechanism 50 integrated or integrable into at least one of the first and second magnetic implants 12, 14. The cutting mechanism 50 is configured to cut through the tissue of the two adjacent walls that is located inwardly from an inner periphery of the annular portion as described above. In some implementations, the region located inwardly relative to the inner periphery of the annular portion can be referred to as a "cutting region" or "central region", since it is generally located centrally of the annular portion. In other words, the region of the tissue located within the cross-section of the through-hole can be considered as being located centrally of the annular portion. The cutting mechanism can be configured to cut through the two adjacent walls during the implantation and coupling of the first and second magnetic implants 12, 14, or at any desirable time thereafter during the healing time period. It is to be understood that the term "cutting mechanism" refers to any system of parts configured to operate cooperatively to cut through the two adjacent walls located inwardly from an inner periphery of the annular portion when in the cutting configuration, and that it can be used interchangeably with the expressions "cutting device" or "cutting system" for instance. Following the cutting through the two adjacent walls, a cut extending through the thickness of the two adjacent walls is formed, such that fluid communication between the first and second hollow organs can be established. When referring to a "cut", it is intended to encompass any type of alteration in the tissue wall that enables creating a passage between the first and second hollow organs, and that it can be used interchangeably with the term "incision", "laceration" or "piercing" for instance. The cut can thus refer to an alteration made by a cutting edge of a blade or of a punch, by shear stress, cauterization, etc. These various implementations are each described in further detail below. It is also to be noted that when referring to a "cut", it is intended to encompass linear cuts such as slits, or cuts having any given shape, for instance in accordance with the shape of the punch used to make the cut. When the cut is made via cauterization, the cut can be a single point cut resulting from the contact of the distal end of a wire electrode with the tissue. In some implementations, the cutting mechanism 50 can be integrated into one or both of the first and second magnetic implants 12, 14. When the cutting mechanism 50 is integrated or integrable into at least one of the first and second magnetic implants, it is intended to mean that the at least one of the magnetic implants includes a feature enabling a cooperating between the at least one of the magnetic implants and the cutting mechanism. In implementations where the cutting mechanism 50 is integrable into at least one of the first and second magnetic implants 12, 14, the cutting mechanism 50 can be releasably connected, or engageable, to the at least one of the first or second magnetic implants 12, 14, such that when the cutting mechanism is indeed connected or engaged with the at least one of the first or second magnetic implants 12, 14, the cutting mechanism can be operated to cut through the adjacent walls and thereafter be selectively or automatically released from the at least one of the first or second magnetic implant 12, 14 after the cut has been performed.

In some implementations, the cutting mechanism 50 can be configurable between a non-cutting configuration and a cutting configuration. In particular, the cutting mechanism 50 can be configured in a non-cutting configuration during delivery of the first and second magnetic implants 12, 14 to the target site, and in a cutting configuration once the first and second magnetic implants 12, 14 are magnetically coupled at the target site. As will be discussed in further detail, the cutting mechanism 50 can selectively or automatically transition from the non-cutting configuration to the cutting configuration once the first and second magnetic implants 12, 14 are magnetically coupled to each other to perform the cut through the two adjacent walls located inwardly from an inner periphery of the annular portion. In some implementations, the cutting mechanism 50 can further be configured to transition from the cutting configuration back to the non-cutting configuration once the cut has been achieved. It will be appreciated that, when in the non-cutting configuration, the cutting mechanism 50 can be considered as being substantially inoperative while being engaged with the at least one of the magnetic implants to avoid cutting tissue at undesired locations. Accordingly, the non-cutting configuration of the cutting mechanism 50 can be desirable during delivery of the first and second magnetic implants 12, 14 so as to prevent an undesirable cutting of tissue along the digestive tract.

In some implementations, the cutting edge of the cutting mechanism 50 is configured to project beyond a first plane defined by the first tissue-oriented surface 30 of the first magnetic implant 12 when in the cutting configuration. In some implementations, the cutting edge of the cutting mechanism 50 is configured to project successively beyond the first plane and a second plane defined by the second tissue-oriented surface 30 of the second magnetic implant 14 when in the cutting configuration, as described in further detail below. In some implementations, the cutting edge of the cutting mechanism 50 can further be configured to extend beyond the second plane and into the second through-hole 41 of the second magnetic implant 14 when in the cutting configuration.

In some implementations, the cutting mechanism 50 can be configured to cut along at least a portion of a chord extending across a region located inwardly of the inner periphery of the annular portion through the two adjacent walls to provide fluid communication therethrough. It is to be understood that the term "chord" refers to a straight or substantially straight line extending between a first point and a second point located on the inner periphery of the annular portion. In some implementations, a cross-sectional shape of the first through-hole 40 of the first magnetic implant 12 can be substantially circular, and the chord can extend along a diameter of the substantially circular cross-section. Alternatively, a cross-sectional shape of the first through-hole 40 of the first magnetic implant 12 can be substantially oblong or substantially rectangular, and the chord can extend along a longest axis of the cross-section of the first through-hole 40. In some implementations, the chord can extend radially across the region located inwardly of the inner periphery of the annular portion through the two adjacent walls.

Cutting Mechanism with a Cutting Edge

Figure 7:
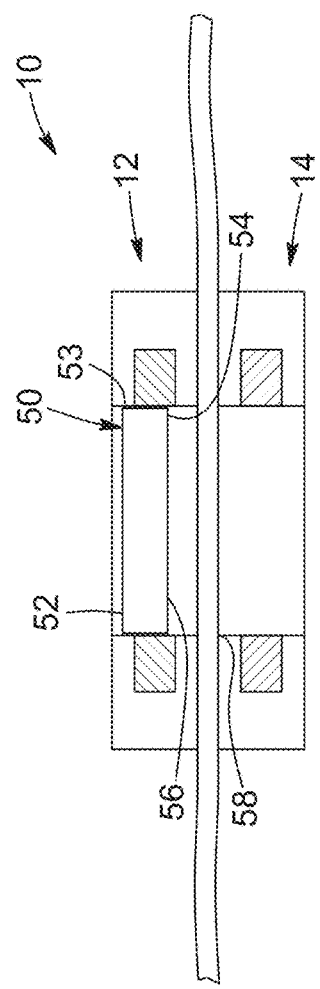
FIG. 7 is a cross-sectional side view of a first magnetic implant and a second magnetic implant, in accordance with an implementation, the first magnetic implant being shown in a non-cutting configuration and in contact with the vessel wall of the first hollow organ and the second magnetic implant being shown in contact with the vessel wall of the second hollow organ, at the desired site of the anastomosis.
Figure 8:
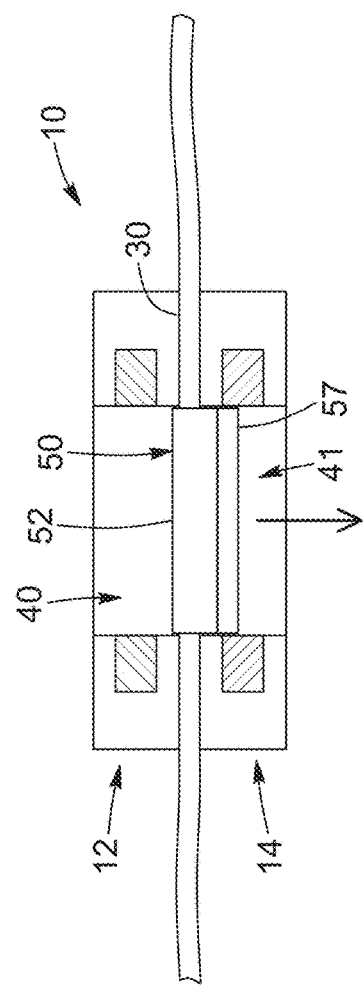
FIG. 8 is a cross-sectional side view of the first and second magnetic implants shown in FIG. 7, with the first magnetic implant being shown in a cutting configuration.
Figure 9:
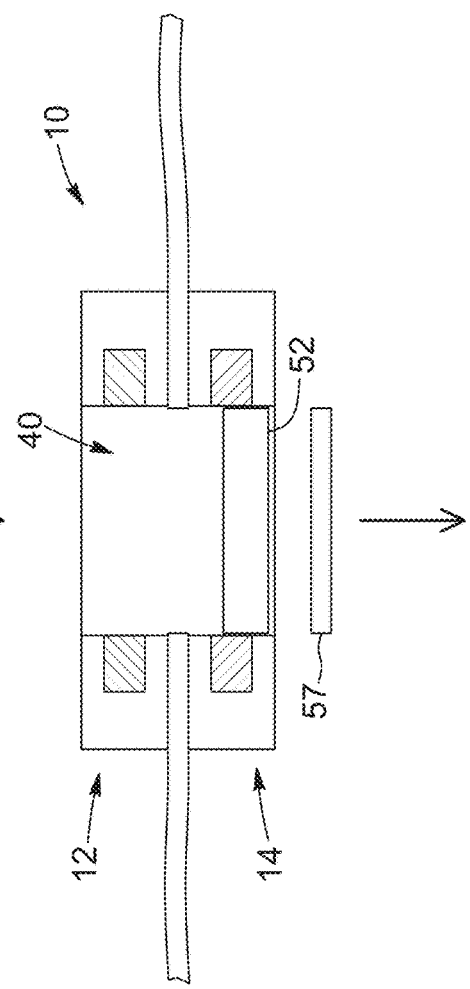
FIG. 9 is a cross-sectional side view of the first and second magnetic implants shown in FIG. 7, with the first magnetic implant being shown in the cutting configuration and a punched-out portion of the vessel walls being discharged into the second hollow organ.
Figure 10:
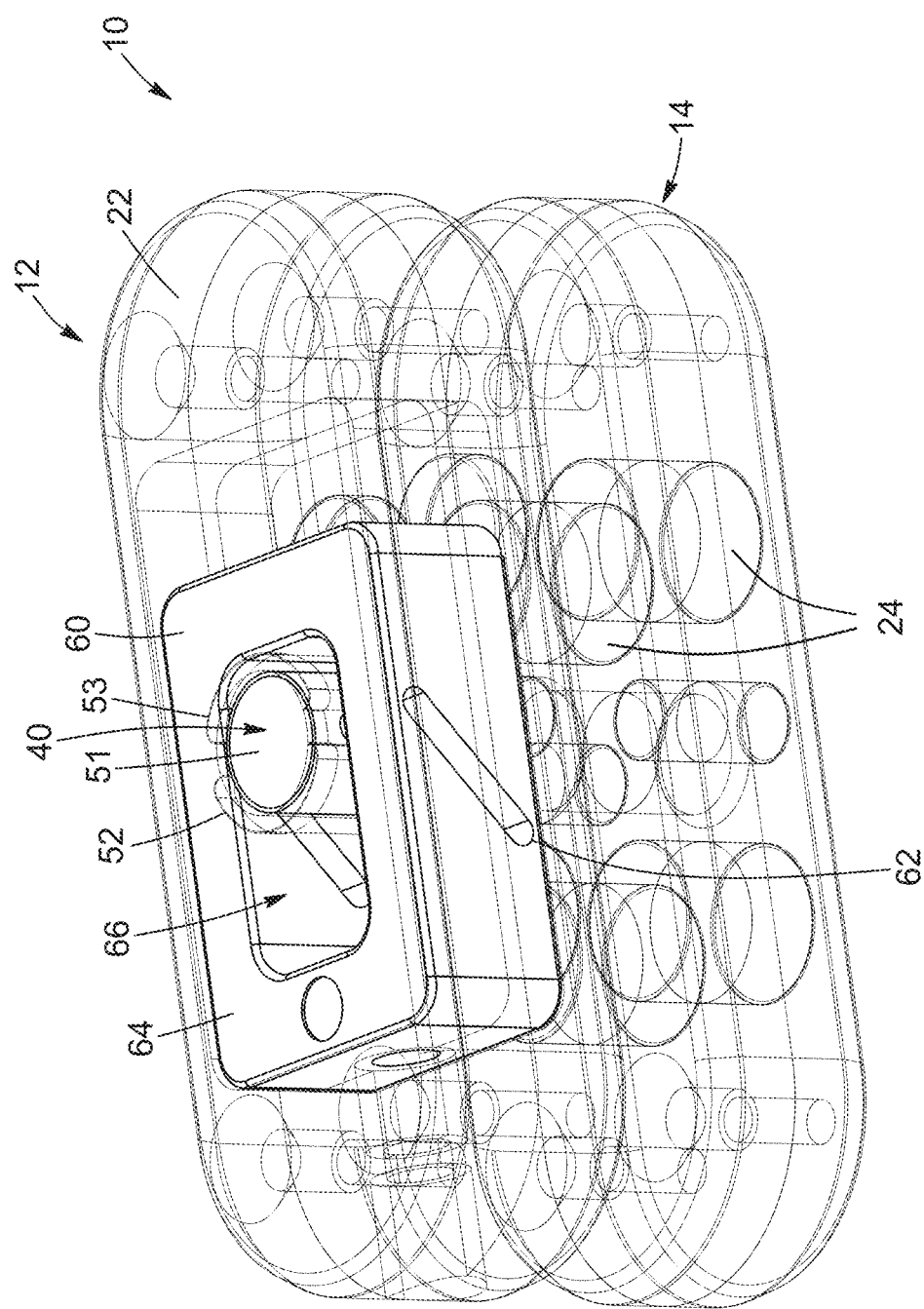
FIG. 10 is a top perspective view of a first magnetic implant and a second magnetic implant, in accordance with another implementation.
Figure 11:
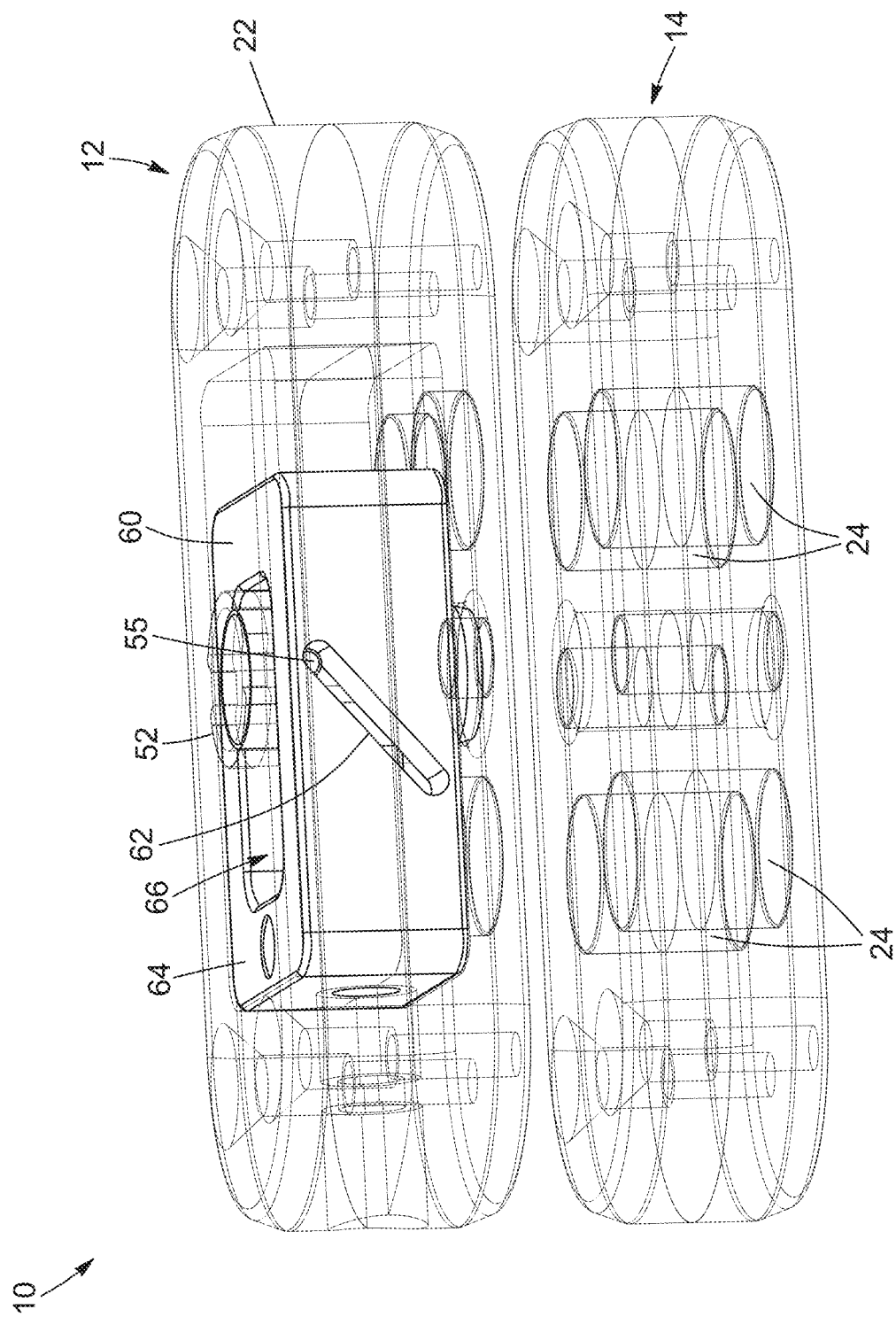
FIG. 11 is a side perspective view of the first magnetic implant and the second magnetic implant of FIG. 10.
Figure 12:
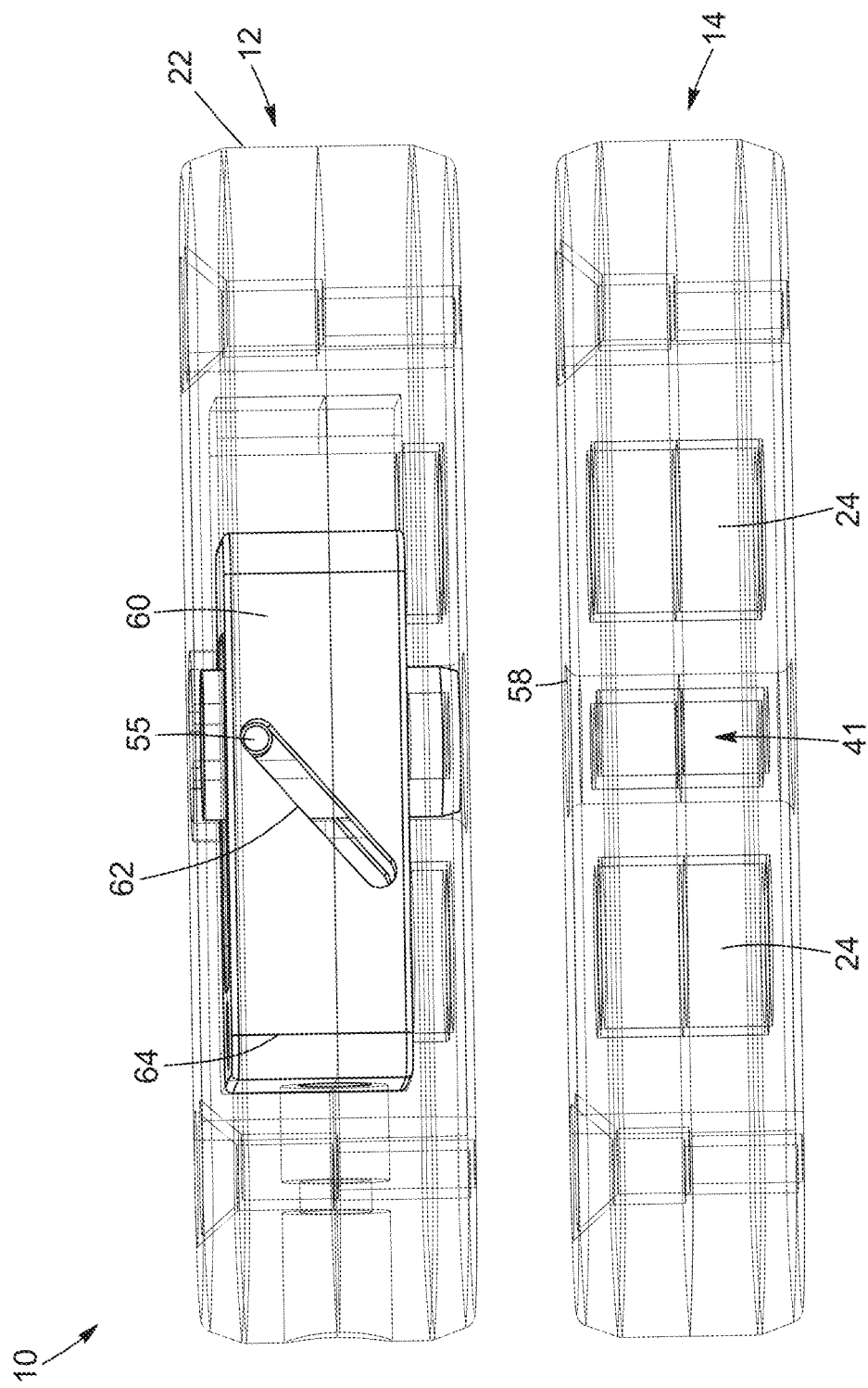
FIG. 12 is a side elevation view of the first magnetic implant and the second magnetic implant of FIG. 10, with the first magnetic implant being shown in a non-cutting configuration.
Figure 13:
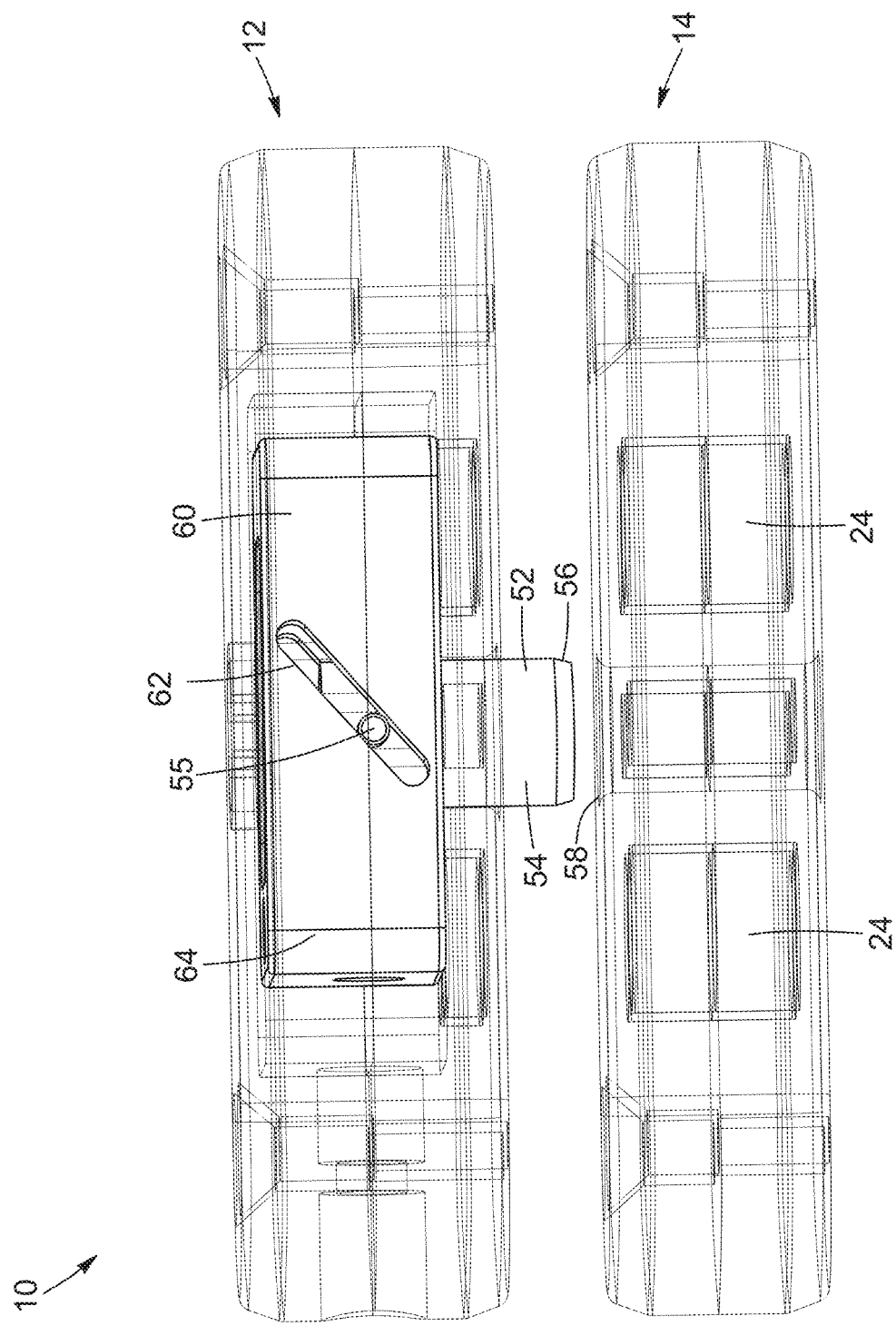
FIG. 13 is a side elevation view of the first magnetic implant and the second magnetic implant of FIG. 10, with the first magnetic implant being shown in a non-cutting configuration.

Referring to FIGS. 7 to 9, an implementation of the cutting mechanism 50 is illustrated. In this implementation, the cutting mechanism 50 comprises a punch 52 integrated into the first through-hole 40 of the first magnetic implant 12 when the cutting mechanism 50 is in the non-cutting configuration. The punch 52 is configured to cut an opening through the central region of the two adjacent walls. The punch 52 includes a tissue-contacting end 54 configured to engage the two adjacent walls once in the cutting configuration and defining a cutting edge 56. The punch 52 further includes a lumen-facing end 53 opposite the tissue-contacting end 54.

Figure 14:
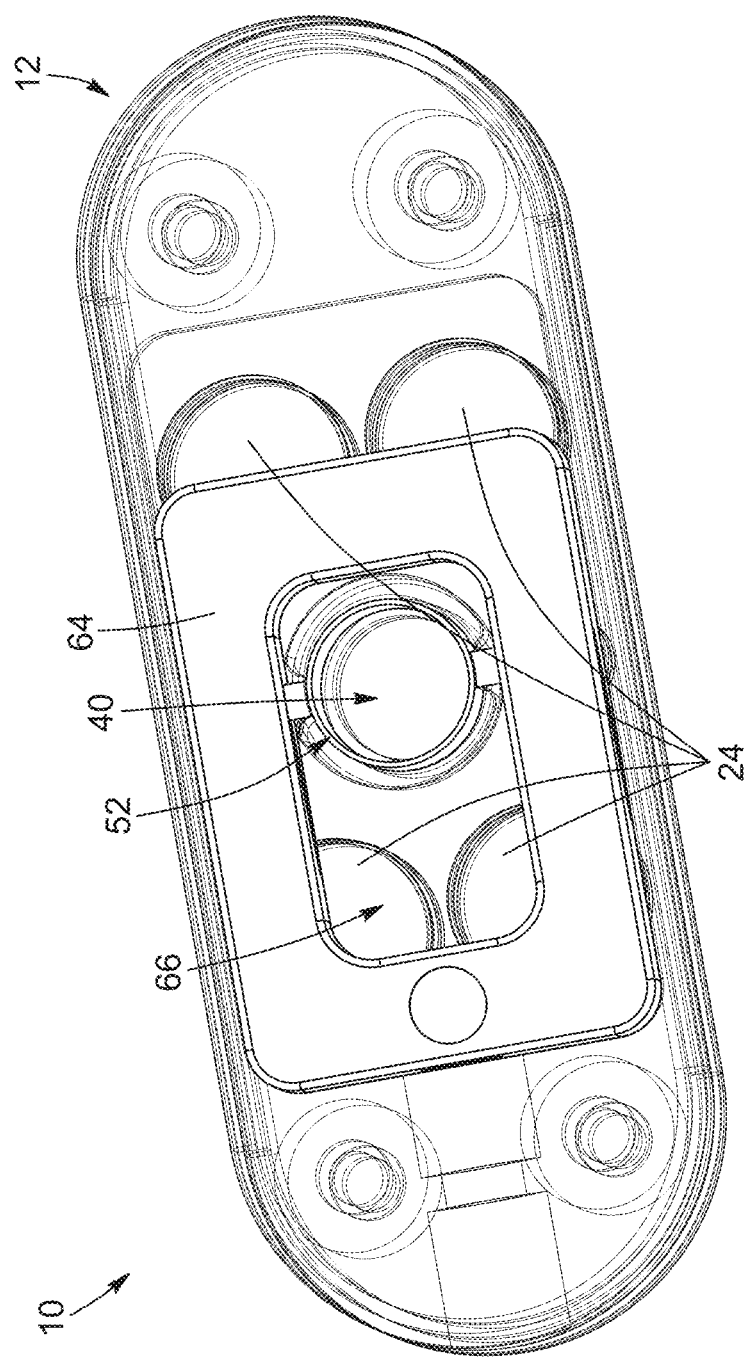
FIG. 14 is a top view of the first magnetic implant of FIG. 10.

In some implementations, the punch 52 can have any suitable size and shape for fitting within the through-hole 40 of the first magnetic implant 12 and in accordance with its intended purpose. For example and as illustrated in FIG. 14, the punch 52 can have an annular shape, which can enable fluid communication between the first and second hollow organs once the cutting mechanism has transitioned from a non-cutting configuration to a cutting configuration (and optionally back to the non-cutting configuration) and a punch-out portion of the two adjacent walls has been discharged from the punch 52. In other implementation, the punch 52 can be a solid structure without an opening extending axially therethrough. In such implementations, if needed, the punch 52 itself can be retrieved from the cutting mechanism 50 once the cut between the first and second hollow organs has been done, to enable fluid communication therebetween. The overall shape of the punch 52, defined by the outer peripheral wall of the punch 52, can be any suitable shape, such as an elliptic shape, a circular shape, an elongated shape, a rectangular shape, an octagonal shape, etc. In some implementations, the configuration of the punch 52 can be selected in accordance with the configuration of one or both of the through-holes 40, 41 of the magnetic implants 12, 14 in particular with respect to their shape, or vice versa. For instance, the shape of the punch can be selected to be complementary to the shape of the through-hole. In the implementation shown in FIGS. 10 to 15, the punch 52 has an annular shape with an outer peripheral wall defining a circular shape, and the cross-section of the first and second through-holes 40, 41 of the first and second magnetic implants 12, 14 is also circular. In some implementations, the cross-sectional shape of the punch 52 can vary along an axial direction of the punch 52. For instance, when the punch 52 is shaped as a triangular prism or a cone, with a hollow center or not, the tissue-contacting end 54 of the punch 52 can be relatively pointy while the lumen-facing end 53 can have another shape, e.g., triangular or circular depending on whether the punch 52 is shaped as a triangular prism or a cone. The punch 52 can also include two or more sections along its length, each having their respective characteristics with respect to their shape and cross-sections.

In some implementations, the punch 52 can be made of a material having a coefficient of friction that can facilitate discharging a punched-out portion of the two adjacent walls. For instance, when the punch 52 is configured as an annular punch 52, the surface 51 of the inner peripheral wall of the punch 52 can be made of polytetrafluoroethylene (PTFE), polyetheretherketone (PEEK), polyphenylene sulfide (PPS), nylon, or any other suitable material for reducing friction between the tissue of the two adjacent walls and the surface 51 of the punch 52, which in turn can contribute to achieving a "clean" cut and also facilitate discharging a punched-out portion of tissue 57 out of the punch 52 and into the lumen of the first hollow organ or the second hollow organ. In some implementations, the surface 51 of the inner peripheral wall of the punch 52 can have superomniphobic properties to reduce friction between the tissue of the two adjacent walls and the surface 51 of the punch 52.

Referring to FIG. 7, the punch 52 is illustrated in the non-cutting configuration. In the non-cutting configuration, the tissue-contacting end 54 of the punch 52 can be retracted within the first through-hole 40 of the first magnetic implant 12 such that the cutting edge 56 does not extend beyond a plane defined by the tissue-contacting surface 30 of the first magnetic implant 12. Accordingly, when the punch 52 is in the non-cutting configuration, the positioning of the cutting edge 56 within the through-hole 40 of the first magnetic implant 12 can avoid undesirable or untimely cutting through the two adjacent walls 13, 15 or any other tissue.

FIGS. 8 and 9 illustrate the transition of the punch 52 from the non-cutting configuration to the cutting configuration. The transition of the punch 52 from the non-cutting configuration to the cutting configuration comprises a translation of the punch 52 along an axial direction of the through-holes 40, 41. In other implementations, the punch 52 can transition from the non-cutting configuration to the cutting configuration by translating in any other suitable direction. For instance, in some implementations, the punch 52 can translate in a direction that is angled with respect to the axial direction of the through-holes 40, 41. In FIG. 9, the punch 52 is illustrated in the cutting configuration, with the cutting edge 56 of the punch 52 projecting beyond the plane defined by the tissue-oriented surface 30 of the first magnetic implant 12 to engage the wall of the first hollow organ. In the cutting configuration, the cutting edge 56 of the punch 52 further extends beyond a plane defined by the tissue-oriented surface 30 of the second magnetic implant 14 to extend into the second through-hole 41 to cut the two adjacent walls to provide fluid communication therethrough.

In some implementations, the punch 52 can be configured to toggle axially from the first through-hole 40 of the first magnetic implant 12 to the second through-hole 41 of the second magnetic implant 14 and back to the first through-hole 40 of the first magnetic implant 12, thereby transitioning from the non-cutting configuration to the cutting configuration and back to the non-cutting configuration. It is to be understood that the term "toggle" refers to the back-and-forth movement of the punch 52 when transitioning from the non-cutting configuration to the cutting configuration and vice-versa.

In some implementations, the punch 52 can be sized and configured to secure the first and second magnetic implants 12, 14 together when in the cutting configuration. In other words, the punch 52 can include any structure that restricts a relative displacement between the first and second magnetic implants when the punch 52 is extended within the second through-hole 41 of the second magnetic implant 14. For instance, the punch 52 can be configured to engage the sidewall 44 of the second through-hole 41 of the second magnetic implant 14 when in the cutting configuration via any suitable means to mechanically interlock the first and second magnetic implants 12, 14. For instance, the punch 52 may comprise one of a male and female connector configured to interlock with the other of a male and female connector when the punch 52 is in the cutting configuration thus mechanically interlocking the first and second magnetic implants 12, 14.

Referring to FIGS. 10 to 14, an implementation of a punch 52 that can be driven from the non-cutting configuration to the cutting configuration by a mechanical system or an electromechanical system is shown. In this implementation, the cutting mechanism 50 includes the punch 52 as described above and a carriage 60 engageable with the punch 52. In the illustrated implementation, the carriage 60 is integrated into the first magnetic implant 12 and configured to translate along a longitudinal direction. It is to be understood that in other implementations, the carriage 60 can be configured to translate along a lateral direction.

Referring to FIG. 14, the carriage 60 comprises a hollow body 64 having an elongated opening 66, with the long edges of the elongated opening 66 extending along the longitudinal axis of the first magnetic implant 12. In the illustrated implementation, the hollow body 64 of the carriage 60 is shown as a hollow rectangular prism. Alternatively, the hollow body 64 of the carriage 60 can be shaped as a square prism, for instance. The carriage 60 is located within the housing the magnetic implant 12, with the punch 52 being located within the elongated opening 66. The elongated opening 66 is elongated along an axis of translation of the carriage 60 to allow the carriage 60 to translate longitudinally relative to the punch 52 without abutting the punch 52, and thus without interfering with the axial translation of the punch 52 when the punch 52 is moved from a non-cutting configuration to a cutting configuration.

Referring to FIGS. 10 to 13, in order to enable the translation of the carriage 60 along the longitudinal axis of the first magnetic implant 12, the carriage 60 comprises an angled slot 62 configured to receive a pin 55 that extends outwardly from an outer peripheral wall of the punch 52. In the implementation shown, the pin 55 extends outwardly from the outer peripheral wall of the punch 52 in a substantially normal direction, although the pin 55 can also be slightly angled depending on the interaction with the angled slot 62. The pin 55 is configured to be translated along a cam path defined by the angled slot 62 such that a translation of the carriage 60 can drive the punch 52 from the non-cutting configuration (shown in FIG. 12) to the cutting configuration (shown in FIG. 13). It will be understood that the above description of the slot 62 and the pin 55 is provided as an example, and that the punch 52 and the carriage 60 can be positioned and configured according to any other suitable configuration. For instance, in some implementations, the above-described configuration can be reversed, such that the carriage 60 can include an inwardly extending pin engageable with a slot defined on an outer peripheral wall of the punch 52 to achieve the cam actuation of the punch 52 from the non-cutting configuration to the cutting configuration. In such implementations, the punch 52 can be shaped as a rectangular or square prism to facilitate the positioning of the angled slot and interaction with the inwardly extending pin of the carriage 60.

In some implementations, the carriage 60 can be driven or actuated within the first magnetic implant 12 via the action of the delivery system used to deliver the magnetic implant to the target site of the desired anastomosis, or via any other suitable system. For instance, translation of the carriage 60 can be achieved via the action of the delivery system once the distal end of the delivery system is received within the receiving cavity of the connecting member 18. It is to be understood that the carriage 60 can be driven by any other suitable mechanical or electromechanical system without departing from the scope of the present application. For instance, the carriage 60 can be driven by a resilient member or an electrical motor integrated within the housing 22 of the first magnetic implant 12.

In other implementations, the cutting mechanism 50 can comprise a resilient member (not shown) integrated into the first magnetic implant 12 and configured to drive the punch 52 from the non-cutting configuration into the cutting configuration. For instance, the punch 52 can be spring-loaded into the first magnetic implant 12. The cutting mechanism 50 can further comprise a stopper (not shown) configured to retain the punch 52 in the non-cutting configuration. In some implementations, the stopper can extend from the housing 22 into the through-hole 40 of the first magnetic implant 12 and can comprise any suitable shape for restricting a translation of the punch 52 and retaining the punch 52 within the first magnetic implant 12. The stopper can further be configured to be retracted within the housing 22 of the first magnetic implant 12 to release the punch 52 from the non-cutting configuration into the cutting configuration. In some implementations, the stopper can be spring-loaded into the housing of the first magnetic implant 12 and configured to release the punch 52, for instance automatically, by retracting within the housing 22 when the first and second magnetic implants 12, 14 are magnetically coupled to each other, thereby releasing the punch 52 from the non-cutting configuration to the cutting configuration. Alternatively, the stopper can be retracted and retained in the non-cutting configuration by any other mechanical or electromechanical system such as, for instance, the delivery system, until a release to the cutting configuration is desired. In other implementations, the stopper can be bioresorbable and configured to naturally dissolve in the lumen of the first or second hollow organ to release the punch 52 from the non-cutting configuration into the cutting configuration. In some implementations, the stopper can be configured to dissolve following a predetermined period of time following the implantation of the first and second magnetic implants. For instance, in some implementations, the stopper can be configured to dissolve and release the punch 52 from the non-cutting configuration into the cutting configuration after less than 3 hours following implantation, less than a day following implantation, or less than 3 days following implantation.

The punch 52 can also take several other forms and can include various other features than the ones described above, for instance with regard to the materials of which the punch 52 is made. In some implementations, the punch 52 can be made of a magnetic material and configured to be driven from the non-cutting configuration to the cutting configuration by a magnetic force generated by the magnet 24 of the second magnetic implant 14. In such implementations, once the punch 52 has reached the second magnetic implant 14, the punch 52 can be retained within the through-hole 41 of the second magnetic implant 14 by a stopper as described above.

It is to be understood that the punch 52 can be driven from the non-cutting configuration to the cutting configuration by any other suitable mechanical or electromechanical system without departing from the scope of the present application. For example, the punch 52 can be cam actuated.

In some implementations, the punch 52 can be configured to create an opening through the two adjacent walls via shearing. In order to localize the shearing forces around the second through-hole 41 of the second magnetic implant 14 can be configured as a die. The die 58 can provide an abutting surface against which the two adjacent side walls can be pressed to localize the shearing forces generated by the punch 52 onto the two adjacent side walls. In such implementations, the tissue-contacting end 54 of the punch 52 can have a cross-sectional shape similar to the cross-sectional shape of the through-hole 41 of the second magnetic implant 14 to encourage an effective punching of the two adjacent side walls. In such implementations, the punch 52 comprises a tissue-contacting end 54 that may or may not include a cutting edge. When the tissue-contacting end 54 is said not to include a cutting edge 56, it is meant that the tissue-contacting end 54 can include round edges, such that it is the shearing force described above that enable cutting through the two adjacent walls.

Referring to FIGS. 15 to 17, another implementation of the cutting mechanism 50 is illustrated. In this implementation, the cutting mechanism 50 comprises a blade 70 defining the cutting edge of the cutting mechanism 50. In some implementations, the blade 70 is configured to be translated across at least a portion of the region of the two adjacent walls located inwardly from an inner periphery of the annular portion to cut through the adjacent walls.

Referring to FIG. 16, the cutting mechanism 50 can be provided in a non-cutting configuration during delivery of the first magnetic implant 12 in which a cutting edge 72 of the blade 70 does not extend beyond the plane defined by the tissue-contacting surface 30 of the first magnetic implant 12. In order to do so, the blade 70 can be received within a blade receiving cavity (not shown) of the housing 22 of the first magnetic implant 12 when in the non-cutting configuration. The blade receiving cavity can be configured to receive the blade 70 to shield the cutting edge 72 of the blade 70 so as to prevent an undesired cutting of tissue. When the first and second magnetic implants 12, 14 are magnetically coupled to each other at the target site, the blade 70 can be directed toward the two adjacent side walls 13, 15 to transition the cutting mechanism 50 into the cutting configuration.

In some implementations, the blade 70 can be retractable. The retractable blade includes the cutting edge 72 and be configured to retract, for instance within a blade housing when the cutting mechanism is in the non-cutting configuration. When the cutting mechanism 50 transitions to the cutting configuration, the retractable blade can be released from the blade housing to expose the cutting edge 72 of the blade 70. The retractable blade can be released from the blade housing using any suitable mechanism. For instance, the retractable portion can be spring-loaded, or cam actuated.

In some implementations, the system 10 can comprise a delivery wire 77 having a distal end 78 configured to be coupled to the blade 70. In particular, the delivery wire 77 can be configured to be tensioned to exert a pulling force on the blade 70 so as to move the blade 70 into the cutting configuration, for instance by moving about a pivot. As stated above, the delivery wire 77 can be configured to be pulled to in turn pull the blade 70 across at least a portion of the region of the two adjacent walls located inwardly from an inner periphery of the annular portion to cut through the two adjacent walls 13, 15. The delivery wire 77 can be tensioned by any suitable mechanical or electromechanical tensioning system. For instance, the delivery wire 77 can extend into the through-hole 40 of the first magnetic implant 12 from a delivery wire receiving channel or a delivery wire receiving recess 23 defied in the housing 22 of the first magnetic implant 12 and into the lumen of the first hollow organ to be engaged by the tensioning system.

In some implementations, a sidewall 44 of the through-hole 40 of the first magnetic implant 12 can comprise a slotted path 46 and the blade 70 can comprise a first pin (not shown) configured to be received within the slotted path 46. The slotted path can define a predetermined path 74 of the blade 70 to enable controlling a displacement of the blade 70. In some implementations, the blade 70 can further comprise a second pin (not shown) configured to be received within the slotted path 46 and to prevent a rotation of the blade 70 about the first pin during translation of the blade 70 along the predetermined path 74.

In implementations comprising an elongated through-hole 40 of the first magnetic implant 12, the predetermined path 74 of the blade 70 can extend along a longitudinal axis of the through-hole 40 to provide a cut having a suitable length.

Figure 29:
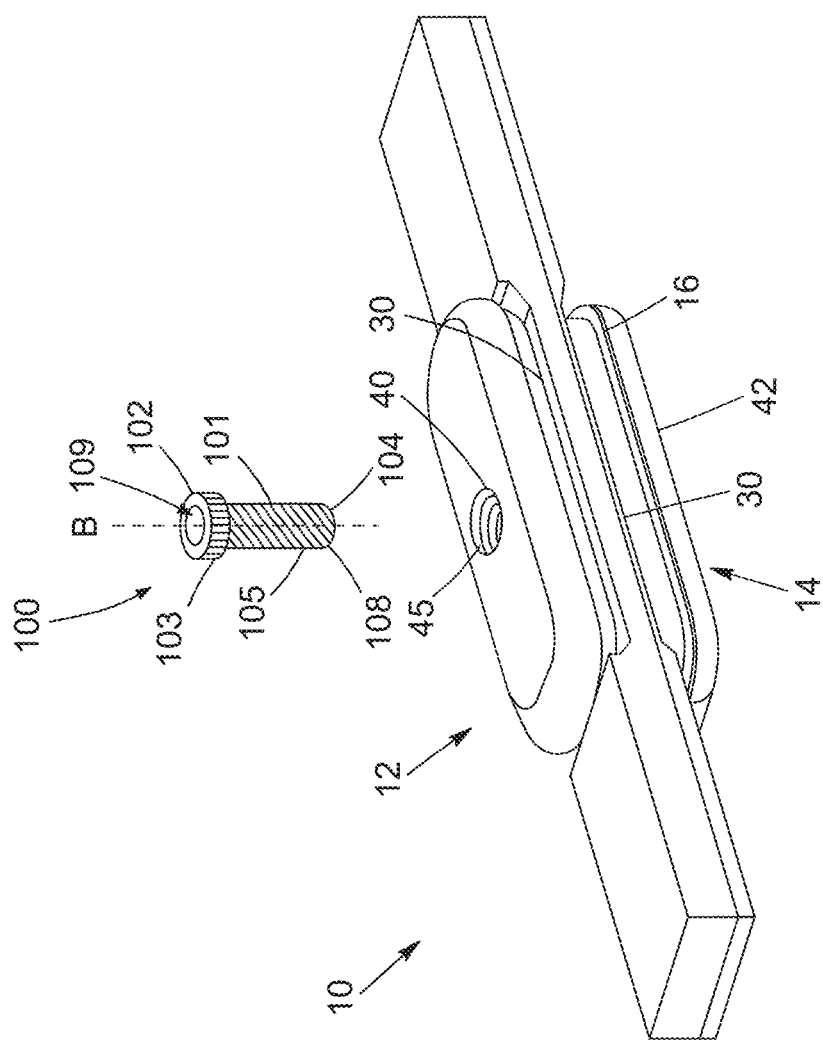
FIG. 29 is a perspective view of a first magnetic implant shown on one side of a desired site of an anastomosis, a second magnetic implant shown on another side of the desired site of the anastomosis, with corresponding vessel walls of first and second hollow organs being shown between the first and second magnetic implants, and a cutting mechanism shown in a non-cutting configuration, in accordance with another implementation.

Referring to FIG. 29, yet another implementation of a cutting mechanism is illustrated. In this implementation, the cutting mechanism 50 includes a screw 100 having an elongated screw body 101 extending between a lumen-facing end 102 and a tissue-contacting end 104, along a longitudinal axis B of the screw 100. The tissue-contacting end 104 includes a cutting edge 108 configured to engage the two adjacent walls and cut through the two adjacent walls and create an opening once in the cutting configuration.

In the implementation shown in FIG. 29, the elongated screw body 101 has an annular shape with a circular cross-section that is sized in accordance with the cross-section of the first through-hole 40 of the first magnetic implant 12, and optionally the cross-section of the second through-hole 41, to enable insertion of the tissue-contacting end 104 of the elongated screw body 101 into the first through-hole 40 of the first magnetic implant 12. In addition, the elongated screw body 101 is configured such that the cutting edge 108 successively projects beyond the first plane defined by the tissue-oriented surface 30 of the first magnetic implant 12 and the second plane defined by the second tissue-oriented surface 30 of the second magnetic implant 14 when in the cutting configuration, as described in further detail below. In some implementations, the size or transverse cross-sectional shape of the elongated screw body 101 can vary along the longitudinal axis B of the screw 100. For instance, the elongated screw body 101 can include a conical portion or a tapered portion.

The elongated screw body 101 includes screw threads 105 configured to engage at least the sidewall 44 of the through-hole 40 the first magnetic implant 12 which, in this implementation, includes sidewall threads 45. For instance, the pitch and thread angle of the screw threads 105 can be selected to be complementary to the pitch and thread angle of the sidewall threads 45 of the sidewall 44 of the through-hole 40 of the first magnetic implant 12. For transitioning the screw 100 from the non-cutting configuration to the cutting configuration the elongated screw body 101 can be rotated about the longitudinal axis B of the screw 100 with the screw threads 105 of the elongated screw body 101 engaging the sidewall threads 45 of the sidewall 44 of the through-hole 40, thus translating the screw 100 along the axial direction of the through-hole 40. The translation of the screw 100 along the axial direction of the through-hole 40 drives the sharp edge 108 of the screw 100 to cut through two adjacent walls.

In some implementations, the screw 100 comprises a screw bore 109 extending from the lumen-facing end 102 to the tissue-contacting end 104 of the elongated screw body 101 along the longitudinal axis B of the screw 100. The screw bore 109 can enable fluid communication between the first and second hollow organs once the cutting mechanism has transitioned from the non-cutting configuration to the cutting configuration. In some implementations, a cut-out portion of the two adjacent walls can be discharged from the screw bore 109 of the screw 100 to facilitate fluid communication between the first and second hollow organs. In other implementation, the screw 100 can be retrieved from the first magnetic implant 12 once the cut between the first and second hollow organs has been done to enable fluid communication therethrough.

The screw 100 can be navigated to the site of the first magnetic implant 12 and operated using various techniques. For instance, the screw 100 can be delivered endoscopically or laparoscopically to the first magnetic implant 12 and driven from the non-cutting configuration to the cutting configuration with an appropriate instrument. In some implementations, the tissue-contacting end 104 of the screw 100 can include a screw head 103 configured to be engaged with an appropriate instrument to impart rotation to the screw 100 and drive the screw 100 through the adjacent walls.

In some implementations, the sidewall of the second magnetic implant 14 can also include threads (not shown) configured to engagingly receive the screw threads 105 of the screw 100 when the screw 100 is in the cutting configuration. In such implementations, the engagement of the screw threads 105 of the screw 100 with the threads of the sidewall of the second magnetic implant 14 can contribute to secure the first and second magnetic implants 12, 14 together once implanted at the target site of a desired anastomosis.

In some implementations, the screw threads 105 can be provided along an entire length of the elongated screw body 101 of the screw 100, as shown in FIG. 29. In alternative implementations, the screw threads 105 can be provided along a portion of the elongated screw body 101 of the screw 100. For instance, when the elongated screw body 101 includes a tapered portion or a conical portion directly adjacent to the cutting edge 108, the tapered portion or the conical portion can be free of threads and have a smaller cross-section relative to the cross-section of the through-holes 40, 41 of the first and second magnetic implants 12, 14, such that the tapered portion of the screw 100 would not engage the sidewall threads 45 of the sidewall 44 of the first and second magnetic implants 12, 14.

Cutting Mechanism with a Wire Electrode

In some implementations, the cutting mechanism 50 can comprise a wire electrode 80 couplable to an electrosurgical generator, the wire electrode being configured to cut through the two adjacent walls via cauterization when the cutting mechanism 50 is in the cutting configuration. It is to be understood that the term "cauterization" refers to a technique involving the use of an electric current to heat the wire electrode 80, such that the generated heat can achieve varying degrees of tissue destruction, including cutting through the tissue. As used herein the term "cauterization" can be used interchangeably with the term "electrocauterization". In such implementations, the cutting mechanism 50 is configurable between a non-cutting configuration, which can include ceasing the supply of an electric current to the wire electrode 80, and a cutting configuration, which includes supplying an electric current to the wire electrode 80 to generate heat suitable for cauterization. In some implementations, a transition of the cutting mechanism 50 from the non-cutting configuration to the cutting configuration can be controlled laparoscopically.

Referring to FIGS. 18 to 23, an implementation of the wire electrode 80 is shown. The wire electrode 80 includes a distal tip 82 inserted into the first through-hole 40 of the first magnetic implant 12 to cauterize a region located inwardly from an inner periphery of the annular portion when in the cutting configuration. In some implementations, the distal tip 82 of the wire electrode 80 can comprise a metal probe 84 configured to be heated by an electric current generated by the electrosurgical generator and to cauterize the tissue of the two adjacent walls.

The distal tip 82 of the wire electrode 80 has a tip cross-section configured to cover a portion of a cross-section of the through-hole 40 of the first magnetic implant 12. In some instances, the tip cross-section of the distal tip 82 can cover at least 10% of the cross-section of the through-hole 40 of the first magnetic implant 12. In other instances, the tip cross-section of the distal tip 82 can cover at least 20%, at least 30%, at least 40%, or at least 50% of the cross-section of the through-hole 40 of the first magnetic implant 12.

In some implementations, the distal tip 82 can be translated along at least one of a longitudinal direction and a lateral direction of the through-hole 40 when in the cutting configuration. In particular, the distal tip 82 can be translated along at least one of a longitudinal direction and a lateral direction of the through-hole 40 when in the cutting configuration to form a substantially linear cut through the two adjacent walls. It will be appreciated that a tip cross-section of the distal tip 82 covering a majority of the cross-section of the through-hole 40, i.e., more than 50% of the cross-section of the through-hole 40, can be translated over a shorter distance within the through-hole 40 to cut a suitable passage between the first and second hollow organs. In some implementations, for instance when the tip cross-section of the distal tip 82 covers a majority of the cross-section of the through-hole 40, the distal tip 82 can be used to perform a single contact point on the tissue to cut therethrough and create the opening between the first and second hollow organs.

In some implementations, the distal tip 82 of the wire electrode 80 is configured to translate from the first through-hole 40 of the first magnetic implant 12 to the second through-hole 41 of the second magnetic implant 14 along an axial direction of the through-hole 40. The translation of the distal 82 can enable a contact suitable for cauterization between the distal tip 82 and the two adjacent walls. Accordingly, the distal tip 82 of the wire electrode 80 can be configured to translate beyond the first plane defined by the tissue-oriented surface 30 of the first magnetic implant 12 to engage the wall of the first hollow organ. In some implementations, the distal tip 82 can be configured to further translate beyond the second plane defined by the tissue-oriented surface 30 of the second magnetic implant 14 to extend into the second through-hole 41 to cut the two adjacent walls. In some implementations, the wire electrode 80 can further be resiliently 56 as able toward the region located inwardly from an inner periphery of the annular portion by, for instance, a resilient member (not shown). The distal tip 82 of the wire electrode 80 can be resiliently biased or driven by any other suitable mechanical or electromechanical system.

In some implementations, the cutting mechanism 50 can be releasably engageable with the first magnetic implant 12. More specifically, the wire electrode 80 can be configured to be released from the first magnetic implant 12 and removed from the first through-hole 40 of the first magnetic implant 12 at any desirable time. For instance, in some implementations, the wire electrode 80 can be released from the first magnetic implant 12 after the formation of a cut when in the non-cutting configuration. Since the cutting mechanism 50 can partially obstruct a flow of liquid, gas and/or matter through the first through-hole 40 when the cutting mechanism 50 is engaged with the first magnetic implant 12, the removal of the cutting mechanism 50 from the first through-hole 40 can thus facilitate establishing fluid communication between the first and second hollow organs. It will be understood that the cutting mechanism 50 can be releasably engageable with the first magnetic implant 12 using any suitable structure. For instance, the cutting mechanism 50 can be configured to magnetically engage the first magnetic implant 12 or to mechanically engage the first magnetic implant 12 using a fastener, an interlocking structure or any other suitable means.

Figure 18:
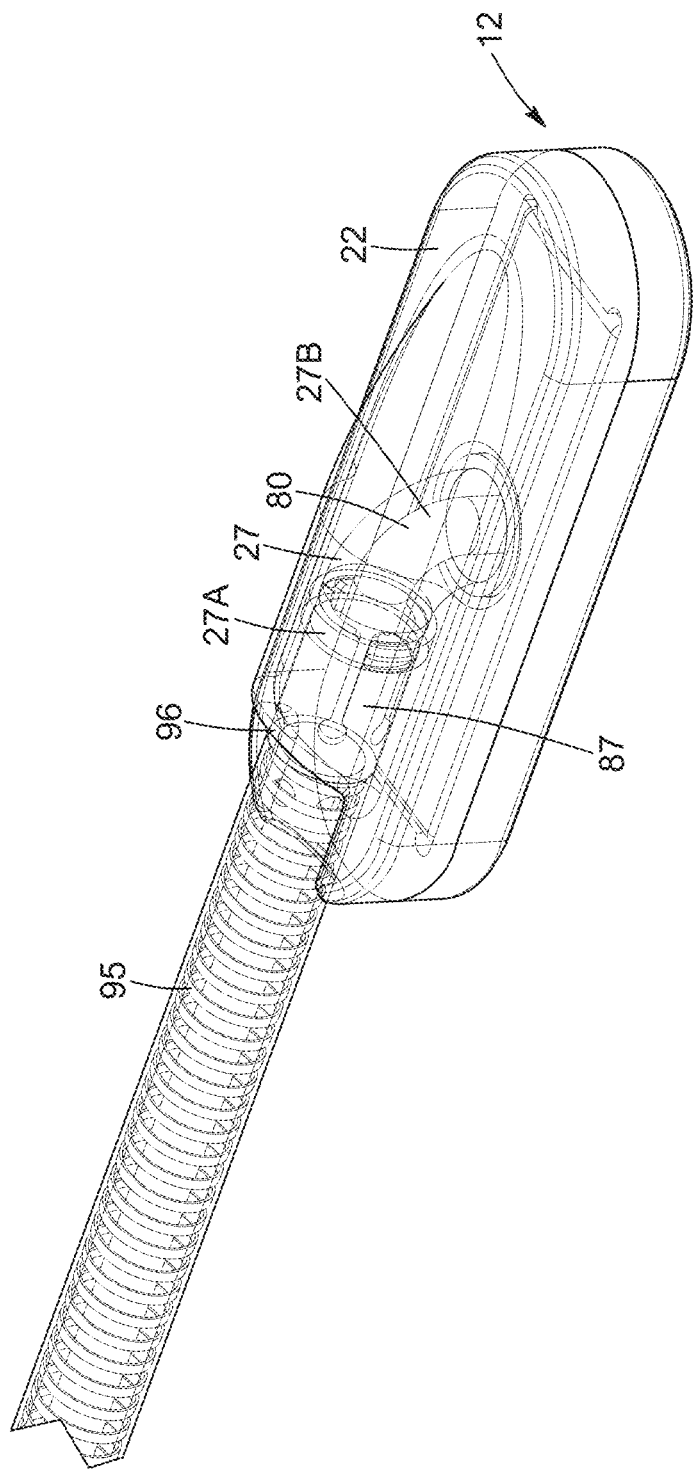
FIG. 18 is a top front perspective view of a portion of a delivery system, of a wire electrode extending outwardly from the delivery system, and of a magnetic implant that includes a housing, in accordance with an implementation.
Figure 19:
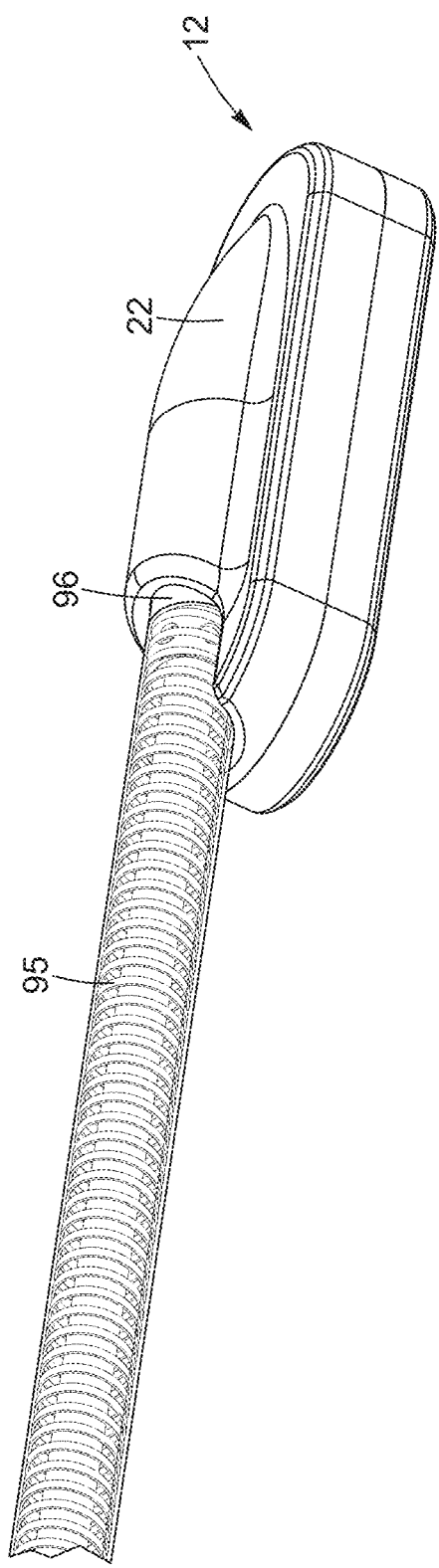
FIG. 19 a top rear perspective view of the portion of the delivery system, the wire electrode and the magnetic implant of FIG. 18.
Figure 20:
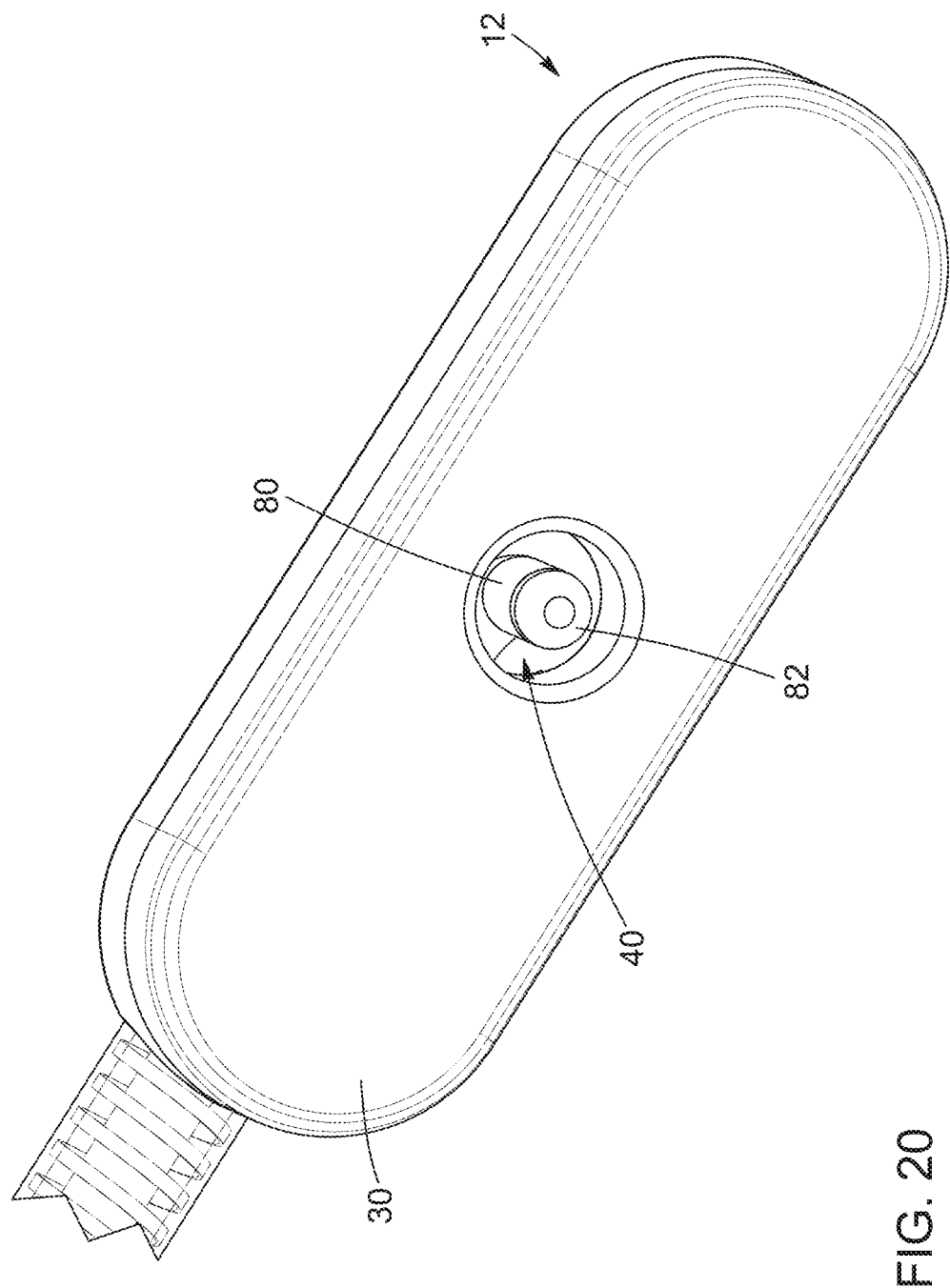
FIG. 20 a bottom perspective view of the portion of the delivery system, the wire electrode and the magnetic implant of FIG. 18.
Figure 21:
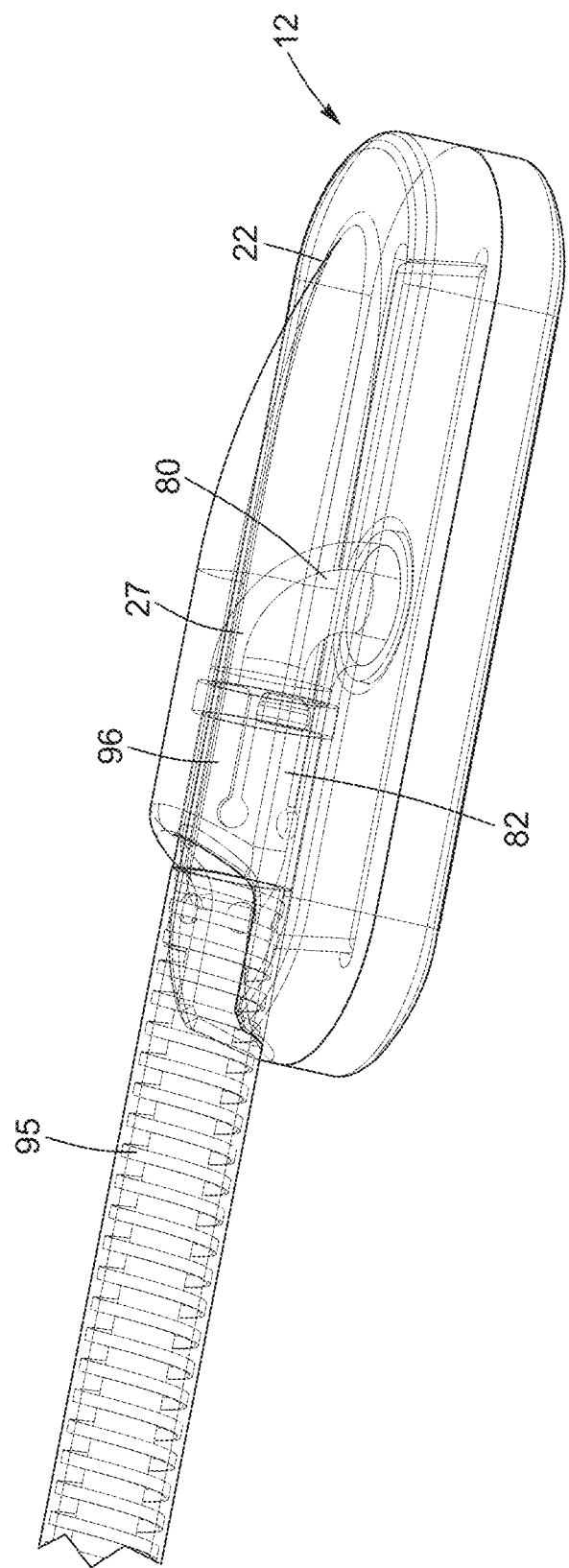
FIG. 21 a side perspective view of the portion of the delivery system, the electrode and the magnetic implant of FIG. 18.
Figure 22:
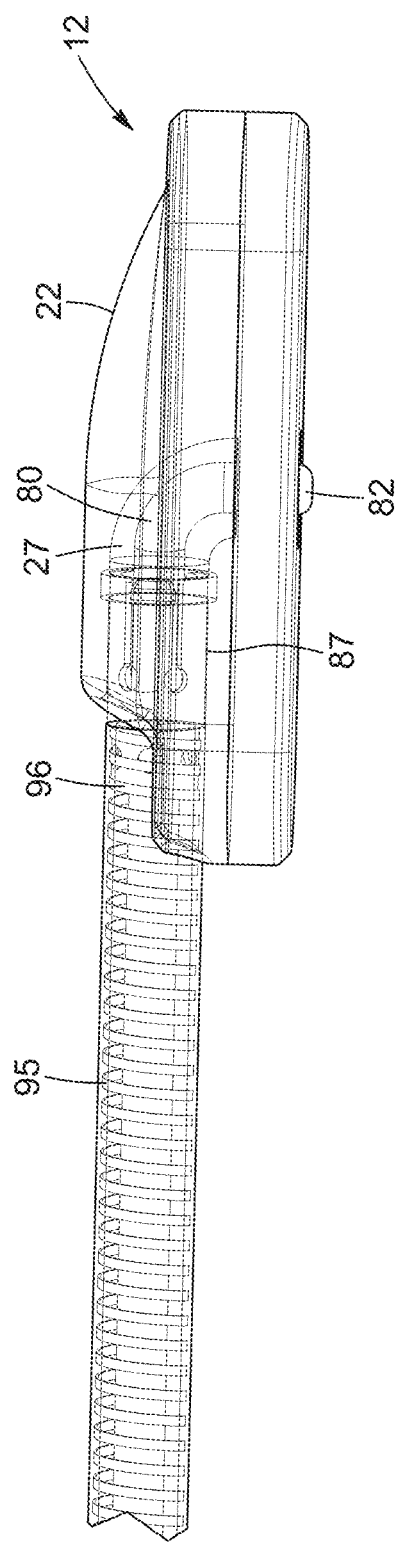
FIG. 22 a side elevation view of the portion of the delivery system, the electrode wire and the magnetic implant of FIG. 18.
Figure 23:
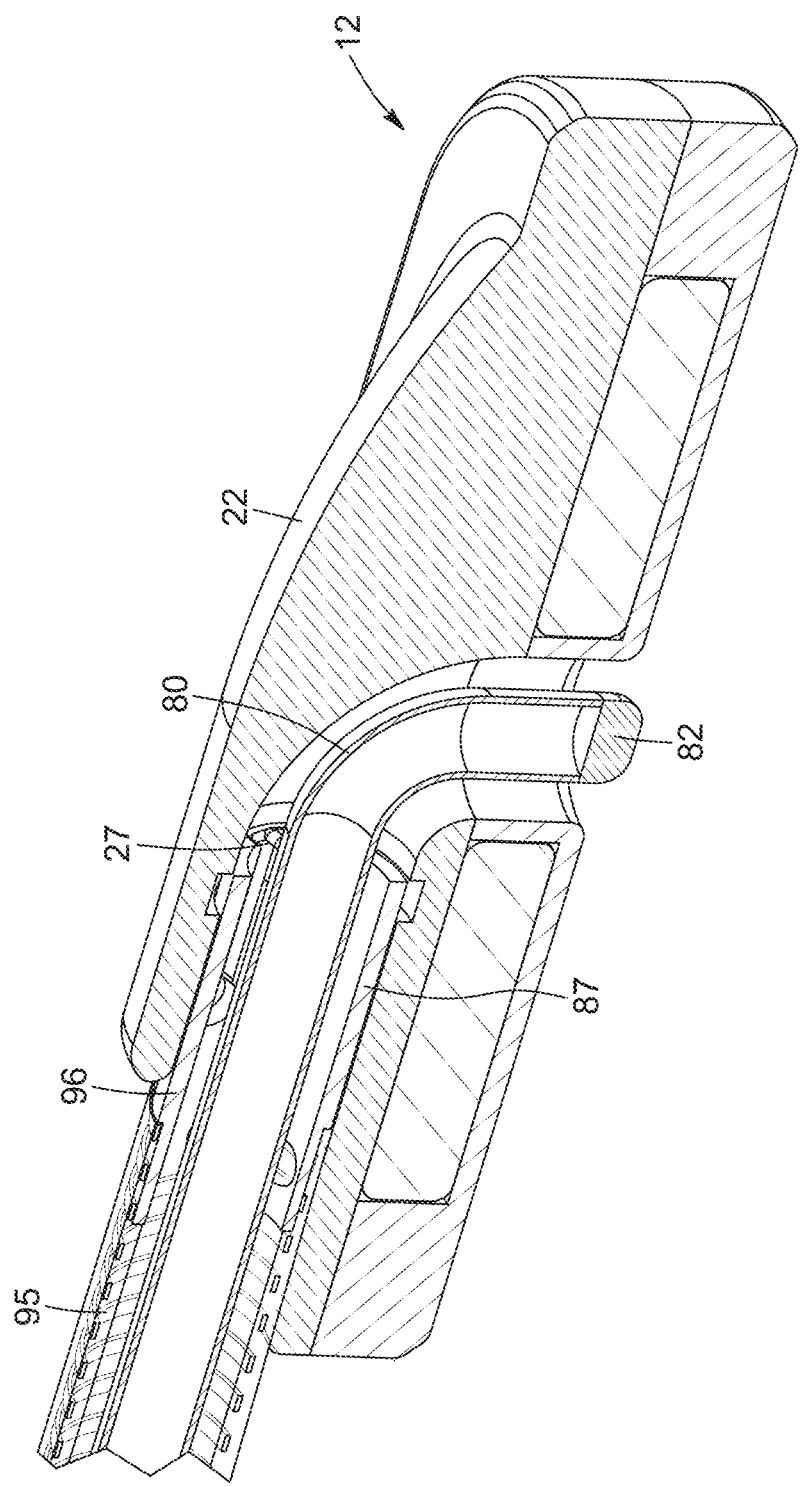
FIG. 23 is a cross-sectional top perspective view of the delivery system, the wire electrode and the magnetic implant of FIG. 18.

Still referring to FIGS. 18 to 23, a first end 96 of a delivery system 95 is shown engaging the first magnetic implant 12. In particular, the delivery system 95 is configured to receive the wire electrode 80 therein and to deliver the wire electrode 80 to the target site of a desired anastomosis with the distal tip 82 of the wire electrode 80 being configured to extend outwardly from the first end 96 of the delivery system 95. When the delivery system 95 is present, the housing 22 of the first magnetic implant 12 can define a wire electrode receiving channel 27 configured to receive a portion of the wire electrode 80 therein. In some implementations, the wire electrode receiving channel 27 of the housing 22 can further comprise an elbow, as shown in FIG. 18 for instance, the wire electrode receiving channel 27 thus redirecting the wire electrode 80 toward the first through-hole 40 of the first magnetic implant 12.

When present, the housing 22 of the first magnetic implant 12 can be electrically insulated to electrically insulate the wire electrode 80 from a remainder of the first magnetic implant and/or the two adjacent side walls. In such implementations, at least a portion of the housing 22 can be made for instance of a material having a high electrical resistivity such as, for instance, rubber-like polymers.

In some implementations, the wire electrode receiving channel 27 can be sized and configured to receive or accommodate the wire electrode 80 and at least a portion of the delivery system 95. For instance, the wire electrode receiving channel 27 can be sized and configured to receive the first end 96 of the delivery system 95 as well as the wire electrode 80. In the implementation shown in FIGS. 18 to 23, the wire electrode receiving channel 27 is configured to receive the first end 96 of the delivery system 95 within a first portion 27A of the wire electrode receiving channel 27. The wire electrode receiving channel 27 is further configured to receive the wire electrode 80 extending beyond the first end 96 of the delivery system 95 within a second portion 27B of the wire electrode receiving channel 27.

In some implementations, the first magnetic implant 12 includes an attachment feature 87 provided within the wire electrode receiving channel 27 to releasably connect the delivery system 95 to the housing 22 of the first magnetic implant 12. The attachment feature 87 can comprise any mechanical feature configured to, with a compatible attachment feature of the delivery system 95, cooperatively retain the delivery system 95 in an engaged configuration with the first magnetic implant 12. For instance, the attachment feature 87 can comprise one of a male and female connector configured to engage the other of the male and female connector of the delivery system 95. In other implementations, the delivery system 95 can be releasably connected to the first magnetic implant 12 through an interference fit. In some implementations, the attachment feature 87 can be configured to release the delivery system 95 from the first magnetic implant 12 when the delivery system 95 is subjected to a suitable pulling force. The pulling force suitable for releasing the delivery system 95 from the attachment feature 87 can be lower than a friction force generated between the tissue-oriented surface 30 of the first magnetic implant 12 and the adjacent wall of the first hollow organ, thus preventing a displacement of the first magnetic implant 12 from the target site when the delivery system 95 is pulled.

In some implementations, when the first magnetic implant 12 comprises a plurality of first through-holes 40 and the second magnetic implant 14 comprises a plurality of second through-holes 41 in accordance with the description above, the distal tip 82 of the wire electrode 80 can be configured to be sequentially inserted within each of the plurality of first through-holes 41 to cut a plurality of openings through the two adjacent walls when in the cutting configuration. In other implementations, the wire electrode 80 can comprise a plurality of distal tips 82, each of the distal tips 82 being insertable into a separate one of the first through-holes 41 of the first magnetic implant 12.

Figure 24:
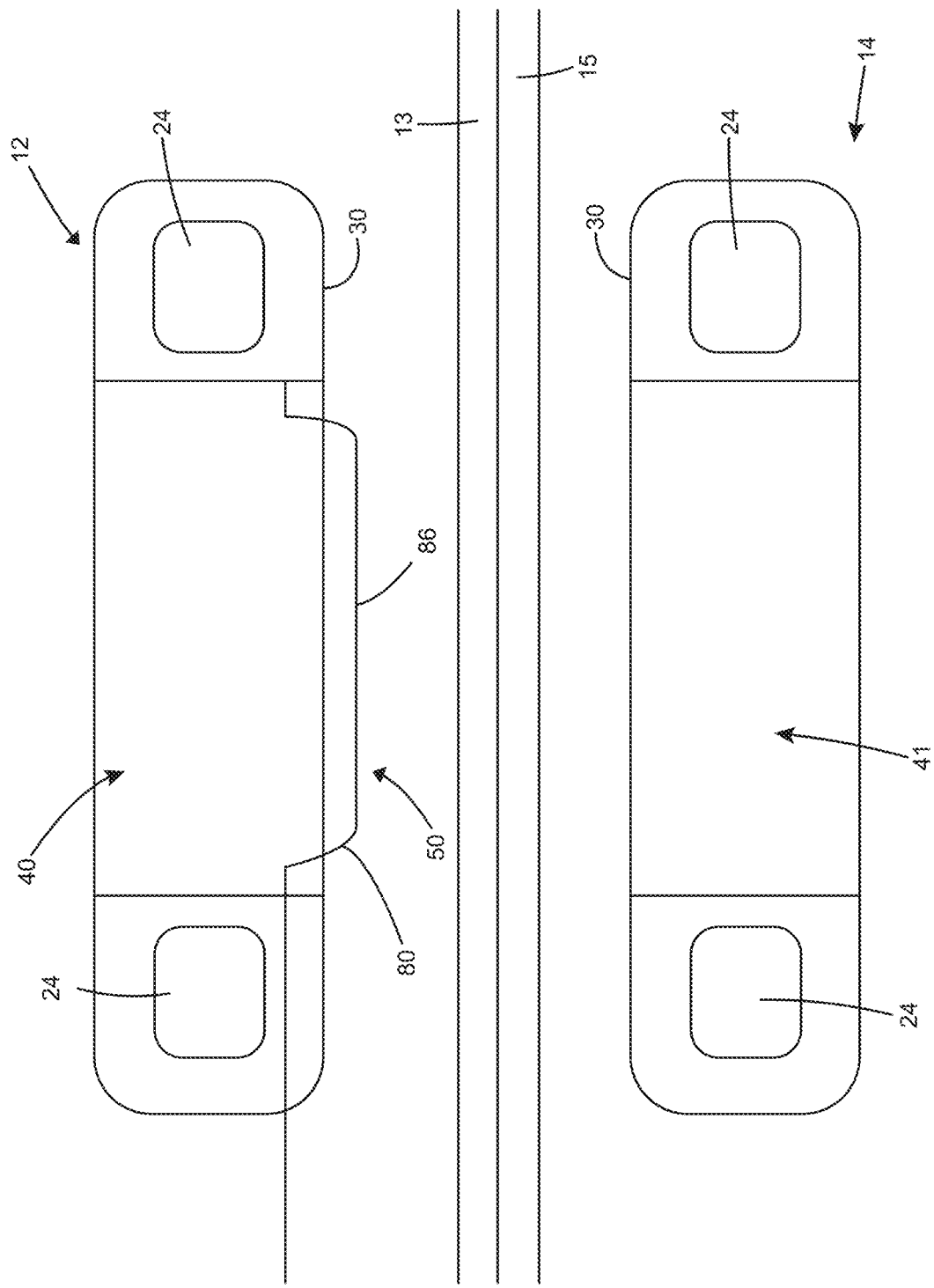
FIG. 24 is cross-sectional side elevation view of a first magnetic implant that includes a through-hole and a wire electrode, in accordance with an implementation.

Referring to FIG. 24, another implementation of the cutting mechanism 50 shown. In this implementation, the cutting mechanism 50 is integrated into the first magnetic implant 12 and comprises a wire electrode 80 extending across the first through-hole 40 of the first magnetic implant 12 to cut through the two adjacent walls in the region located inwardly from the inner periphery of the annular portion when in the cutting configuration to provide fluid communication therethrough. The wire electrode can be coupled to the electrosurgical generator via the delivery system or any other suitable system. In some implementations, the wire electrode 80 can be configured to cut in one of a longitudinal direction and a lateral direction with respect to the first magnetic implant 12.

The cutting mechanism 50 is similarly configurable between a non-cutting configuration wherein a current is not passed through the wire electrode 80, and a cutting configuration wherein a current is passed through the wire electrode 80 to generate heat in the wire electrode 80 suitable for cauterization.

In some implementations, the wire electrode 80 comprises a contact portion 86 configured to abut an inner surface of one of the two adjacent walls when the first and second magnetic implants are magnetically coupled to each other. The contact portion 86 can further be resiliently biased toward the two adjacent walls by, for instance, a resilient member. In some implementations, the biasing of the contact portion 86 can enable forming a substantially continuous cut through the two adjacent walls.

In the implementation shown in FIG. 24, the at least a portion of the contact portion 86 is configured to project beyond the first plane defined by the first tissue-oriented surface 30 of the first magnetic implant 12 when the first and second magnetic implants are magnetically uncoupled. The contact portion 86 of the wire electrode can be configured to exert a pressure toward the second plane when the first and second magnetic implants 12, 14 are magnetically coupled to each other. The pressure exerted toward the second plane when the first and second magnetic implants 12, 14 are coupled can similarly enable forming a substantially continuous cut through the two adjacent walls.

In some implementations, the contact portion 86 can extend along at least 10% of a cross-section of the first through-hole 40 of the first magnetic implant 12. In some implementations, the contact portion 86 can extend at least 20%, at least 30%, at least 40%, or at least 50% of the first through-hole 40 of the first magnetic implant 12. Alternatively, the contact portion 86 can extend along an entire cross-section of the first through-hole 40.

In some implementations, when the first magnetic implant 12 comprises a plurality of first through-holes 40 and the second magnetic implant 14 comprises a plurality of second through-holes 41 in accordance with the description above, the wire electrode 80 can be configured to extend across each of the plurality of first through-holes 41 to cut a plurality of openings through the two adjacent walls when in the cutting configuration. In other implementations, the cutting mechanism 50 can comprise a plurality of wire electrodes 80, each of the wire electrodes 80 extending across a separate one of the plurality of the first through-holes 41 of the first magnetic implant 12.

It will be understood that the above description of various implementations of the cutting mechanism 50 being integrated or integrable into the first magnetic implant 12 is merely provided as an example and that the cutting mechanism 50 can be integrated or integrable into the second magnetic implant 14 or any other suitable structure without departing from the scope of the present application. It is to be noted that when using the terms "integrated" or "integrable" in the present description, it is intended to mean that the cutting mechanism includes at least one feature that cooperates actively with at least one of the magnetic implants. The use of these terms does not require that this feature forms an integral part of the at least one of the magnetic implants.

It will be further understood that the above implementations of the cutting mechanism 50 can be configured to create an opening between the first and second hollow organs having any desirable size. For instance, the cutting mechanism 50 can be configured to create the opening between the first and second hollow organs sized in relation to the cross-sectional area of the first through-hole 40 of the first magnetic implant 12. For instance, a ratio between the cross-sectional area of the first through-hole 40 and the surface area of the opening can be, in some implementations greater than 2.5, in some implementations greater than 5, in some implementations greater than 7.5, and in some implementations greater than 10. Moreover, a ratio between a width of the through-hole 40 of the first magnetic implant 12 taken along a lateral axis of the first magnetic implant 12, and a length of the opening taken along a longitudinal axis of the opening can be, in some implementations greater than 2.5, in some implementations greater than 5, in some implementations greater than 7.5, and in some implementations greater than 10.

Description of a Compression Device

Referring to FIGS. 25 to 28, a system 10 for forming an anastomosis at a target site between two adjacent walls of a digestive tract according to various implementations is shown. As described above, the system 10 includes first and second magnetic implants configured to magnetically couple to each other at the target site, with the first through-hole 40 of the first magnetic implant 12 being at least partially superposable to the second through-hole 41 of the second magnetic implant 14. The anastomosis then forms following the healing time period, during which ischemic pressure necrosis of the anastomosis area, i.e., of the wall tissues located between the first and second magnetic implants 12, 14, occurs.

In the implementations illustrated in FIGS. 25 to 28, the system 10 further includes a compressing device 90 configured to compress a portion of the two adjacent walls that is located inwardly from the inner periphery of the annular portion. More specifically, the compressing device 90 is configured to compress the inwardly located portion of the two adjacent walls that includes both layers of the two adjacent walls. The compression device 90 is configured to cause ischemic pressure necrosis of that portion of the two adjacent walls to form an initial anastomosis through the two adjacent walls prior to the end of the healing time period. In some implementations, the initial anastomosis can be formed for instance a few hours or a few days following the implantation of the first and second magnetic implants 12, 14, such that fluid communication between the two adjacent walls can occur earlier than at the end of the healing time period.

As used herein, the term "compressing device" is intended to refer to any part or system of parts configured to apply a sufficient pressure to the portion of the two adjacent walls located inwardly from the inner periphery of the annular portion to cause ischemic pressure necrosis of that portion of wall tissue, and can be used interchangeably with the expressions "compressive device" or "compressing system", for instance. As briefly mentioned above, the expression "initial anastomosis" is intended to refer to an opening between the two adjacent walls to enable fluid communication between the two adjacent walls and thus between the first and second hollow organs during the healing time period.

In some implementations, the compressing device 90 can be configured to compress the two adjacent walls during the implantation and coupling of the first and second magnetic implants 12, 14. Alternatively, the compressing device can be configured to compress the two adjacent walls at any desirable time following the implantation of the first and second magnetic implants 12, 14 and during the healing time period.

In some implementations, the compressing device 90 can be configurable between an expanded configuration and a compression configuration. In particular, the compressing device 90 can be in an expanded configuration during delivery of the first and second magnetic implants 12, 14 to the target site, and in a compression configuration once the first and second magnetic implants 12, 14 are magnetically coupled at the target site. As will be discussed in further detail below, the compressing device 90 can selectively or automatically transition from the expanded configuration to the compression configuration once the first and second magnetic implants 12, 14 are magnetically coupled to each other to apply the ischemic pressure to the inwardly located portion of the two adjacent walls.

In some implementations, the compressing device 90 is integrable into at least one of the first and second magnetic implants 12, 14. In particular, the compressing device 90 can be releasably connected to, or engageable with, the at least one of the first or second magnetic implants 12, 14, such that when the compressing device 90 is indeed connected or engaged with the at least one of the first or second magnetic implants 12, 14, the compressing device 90 can be operated or released to cause ischemic pressure necrosis of the inwardly located portion of the two adjacent walls and to form the initial anastomosis.

In other implementations, the system 10 can further comprise a carrying mechanism (not shown) for transporting the compression device 90 to the target site. It is to be noted that when referring to a "carrying mechanism", it is intended to encompass a laparoscopic tool, a catheter (including, for instance, an endoscopic catheter), or any other suitable surgical tool suitable for carrying the compressing device 90. In some implementations, the carrying mechanism can be configured to expand the compressing device 90 into the expanded configuration. The carrying mechanism can be further configured to position the compressing device 90 over or around the inwardly located portion of the two adjacent walls and to release the compressing device 90 when in a suitable position to apply the ischemic pressure to the inwardly located portion of the two adjacent walls.

In some implementations, the carrying mechanism can further include a suction tube connectable to a vacuum source. The suction tube can be configured to suction both layers of the two adjacent walls such that the inwardly located portion protrudes outwardly from at least the first tissue-oriented surface 30 of the first magnetic implant 12. In these implementations, the portion of both layers of the two adjacent walls is suctioned out into the first through-hole 40 to enable the compressing device 90 to be positioned around the portion. In some implementations, the suction tube is further configured to suction both layers of the two adjacent walls such that both layers of the two adjacent walls further protrude outwardly from the first lumen-oriented surface 42 of the first magnetic implant 12, as shown in FIG. 26.

In some implementations, the second magnetic implant 14 comprises a movable member (not shown) configured to move both layers the two adjacent walls beyond the first tissue-oriented surface 30 of the first magnetic implant 12. The movable member can include, for instance, a pivoting arm integrable into the second magnetic implant 14 and configured to pivot within the second through-hole 41 towards the two adjacent walls to move both layers the two adjacent walls beyond the first tissue-oriented surface 30 of the first magnetic implant 12. It is to be understood that the movable member can include any other suitable mechanism. In some implementations, the movable member can further be configured to move both layers the two adjacent walls successively beyond the first tissue-oriented surface 30 of the first magnetic implant 12 and further beyond the first lumen-oriented surface 42 of the first magnetic implant 12.

Figure 25:
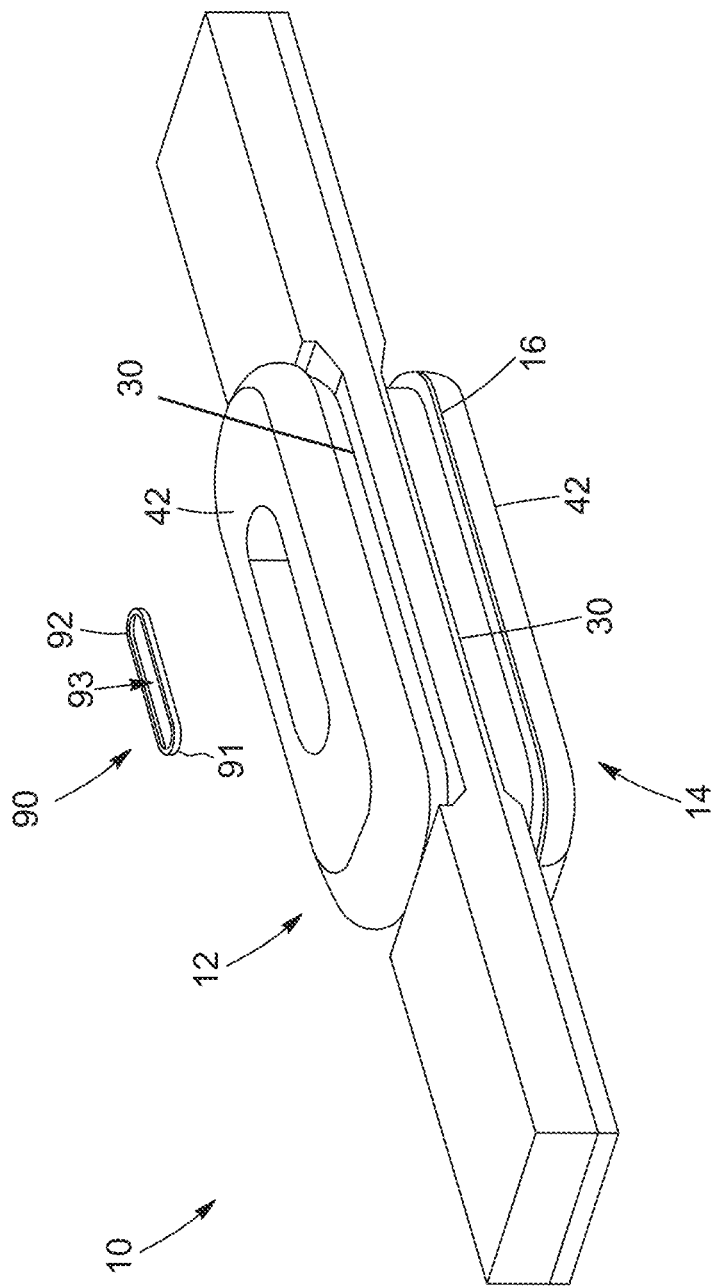
FIG. 25 is a perspective view of a first magnetic implant shown on one side of a desired site of an anastomosis, a second magnetic implant shown on another side of the desired site of the anastomosis, with corresponding vessel walls of first and second hollow organs being shown between the first and second magnetic implants, and a compression device, in accordance with an implementation.
Figure 26:
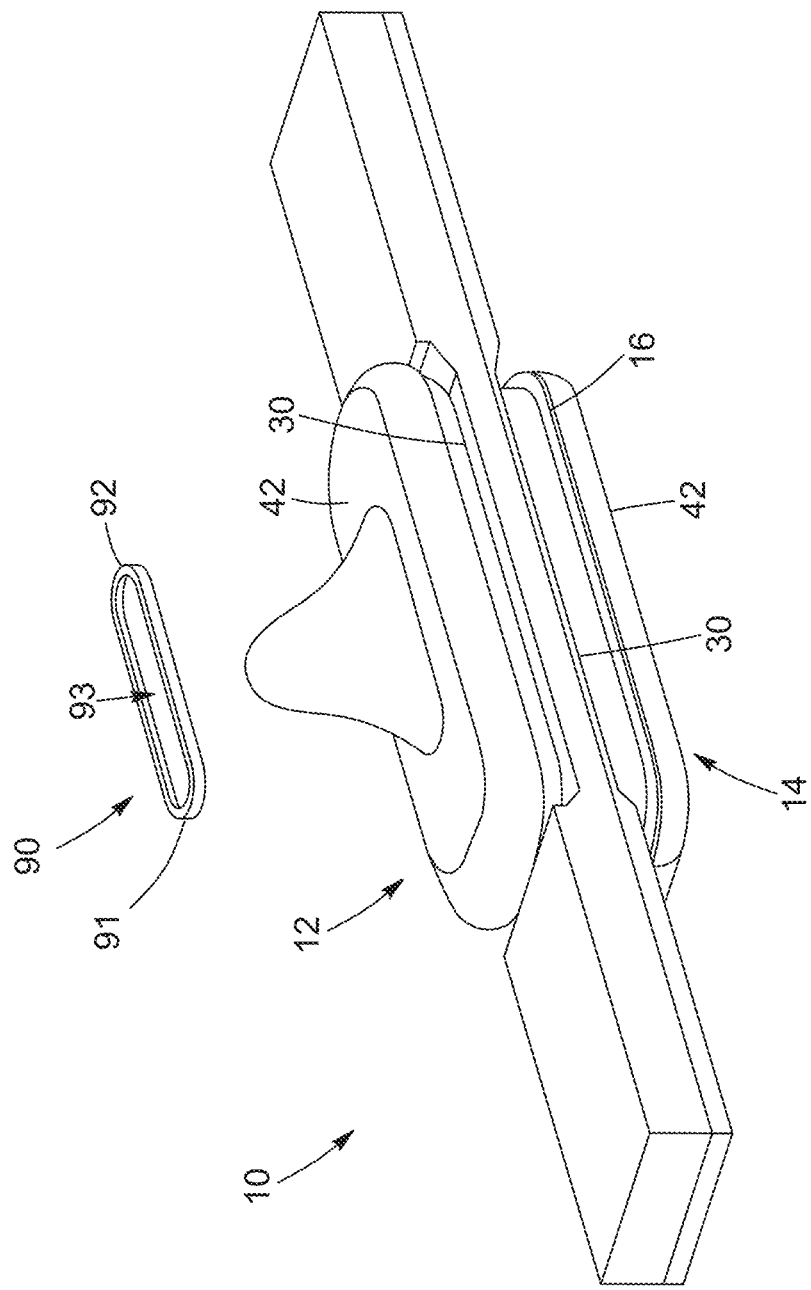
FIG. 26 is a perspective view of the first and second magnetic implants and the compression device shown in FIG. 25, with a portion of the corresponding vessel walls of the first and second hollow organs protruding outwardly through a through-hole of the first magnetic implant and with the compression device shown in an expanded configuration.
Figure 27:
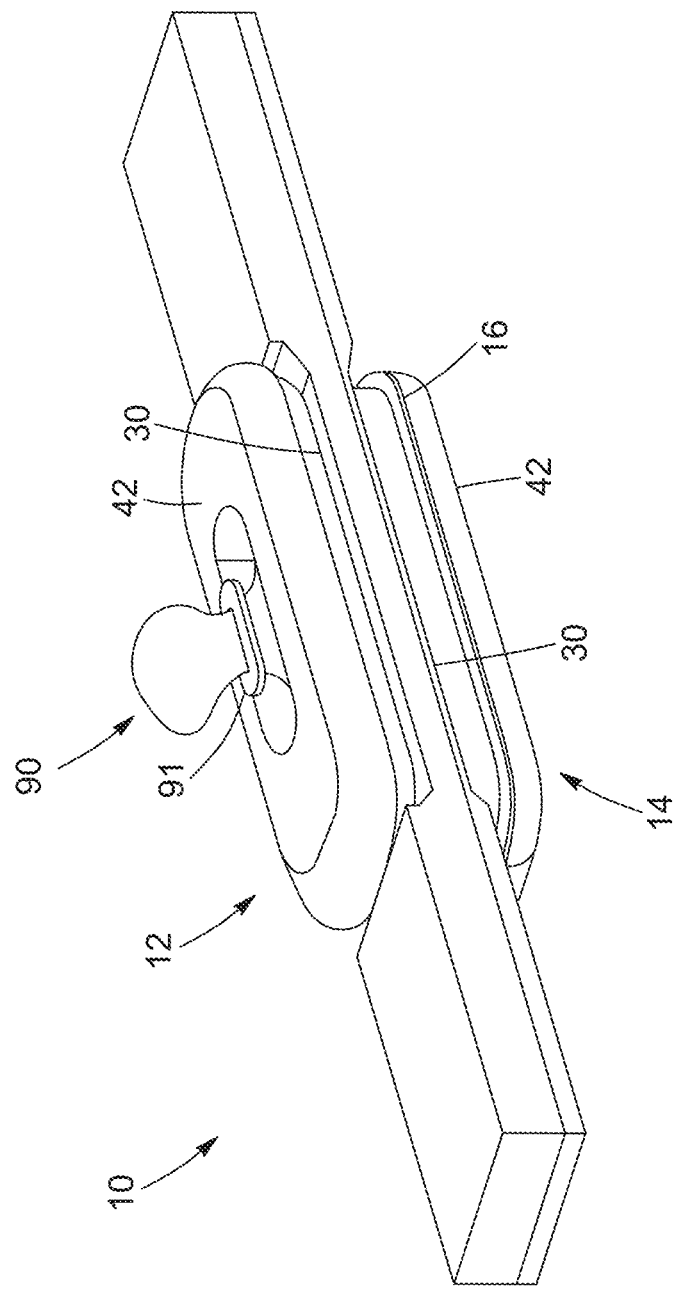
FIG. 27 is a perspective view of the first and second magnetic implants and the compression device shown in FIG. 26, with the compression device shown in a compression configuration around the portion of the corresponding vessel walls of the first and second hollow organs protruding outwardly through the through-hole of the first magnetic implant.

Referring to FIGS. 25 to 27, an implementation of a compressing device 90 is shown. In this implementation, the compressing device 90 comprises an elastic member 91. The elastic member 91 is configured to radially compress the inwardly located portion of the two adjacent walls. In particular, the elastic member 91 is configured to radially compress the portion of wall tissue that includes both layers of the two adjacent walls and that extends beyond the first tissue-oriented surface 30 of the first magnetic implant 12 once moved or suctioned into the first through-hole 40, or beyond the first lumen-oriented surface 42 of the first magnetic implant 12 if the portion of tissue is moved or suctioned further out from the first through-hole 40.

The elastic member 91 can be made of a material having an elasticity enabling an expansion of the elastic member 91 from the compressing configuration to the expanded configuration for positioning the elastic member 91 around the portion of both layers of the two adjacent walls that protrudes from at least the first tissue-oriented surface 30 of the first magnetic implant 12. For instance, the elastic member 91 can be made of a polymer, such as an elastomer. In some implementations, the elastic member 91 can be made of polyisoprene, or rubber.

In the implementation shown, the elastic member 91 has an annular body 92 defining a central opening 93. The size of the elastic member 91 can be determined in accordance with the size of the first and second through-holes 40, 41, and thus in accordance with the size of the portion of wall tissue that will be moved or suctioned into the first through-hole 40. In other words, the smaller the portion of wall tissue around which the elastic member 91 is to be placed, the smaller the outer periphery of the elastic member 91 can be. On the other hand, a smaller elastic member 91 can also be used for a large portion of wall tissues so that the compression force applied radially to the wall tissue can be higher. In some implementations, the elastic member 91 can have an outer periphery of less than 50 mm, less than 40 mm, less than 30 mm, or less than 20 mm. It is to be understood that these dimensions are given for exemplary purposes only, and that in other implementations, the elastic member 91 can have any other suitable size.

Referring to FIG. 26, the elastic member 91 is shown in an expanded configuration. In this implementation, the annular body 92 of the elastic member 91 is expanded sufficiently to enable the portion of wall tissue that includes both layers of the two adjacent walls and that, in the case of FIG. 26, protrudes outwardly past the lumen-oriented surface 26 of the first magnetic implant 12, to be received into the central opening 93.

Referring to FIG. 27, the elastic member 91 is shown positioned around the portion of wall tissue that includes both layers of the two adjacent walls in a compression configuration, with the elastic member 91 being sized to compress the protruded portion of both layers of the two adjacent walls.

In some implementations, the first magnetic implant 12 can include an expansion mechanism (not shown) configured to expand and retain the compression device 91 in the expanded configuration. The expansion mechanism can be further configured to release the compressing device 91 from the expanded configuration to a compression configuration for compressing the inwardly located portion of the two adjacent walls. In some implementations, the expansion mechanism can be bioresorbable and configured to naturally dissolve in the lumen of the first or second hollow organ to release the compressing device 90 from the expanded configuration to the compression configuration. In some implementations, the expansion mechanism is further configured to retain at least a portion of the compressing device 90 in a compression device recess defined in the first magnetic body.

Figure 28:
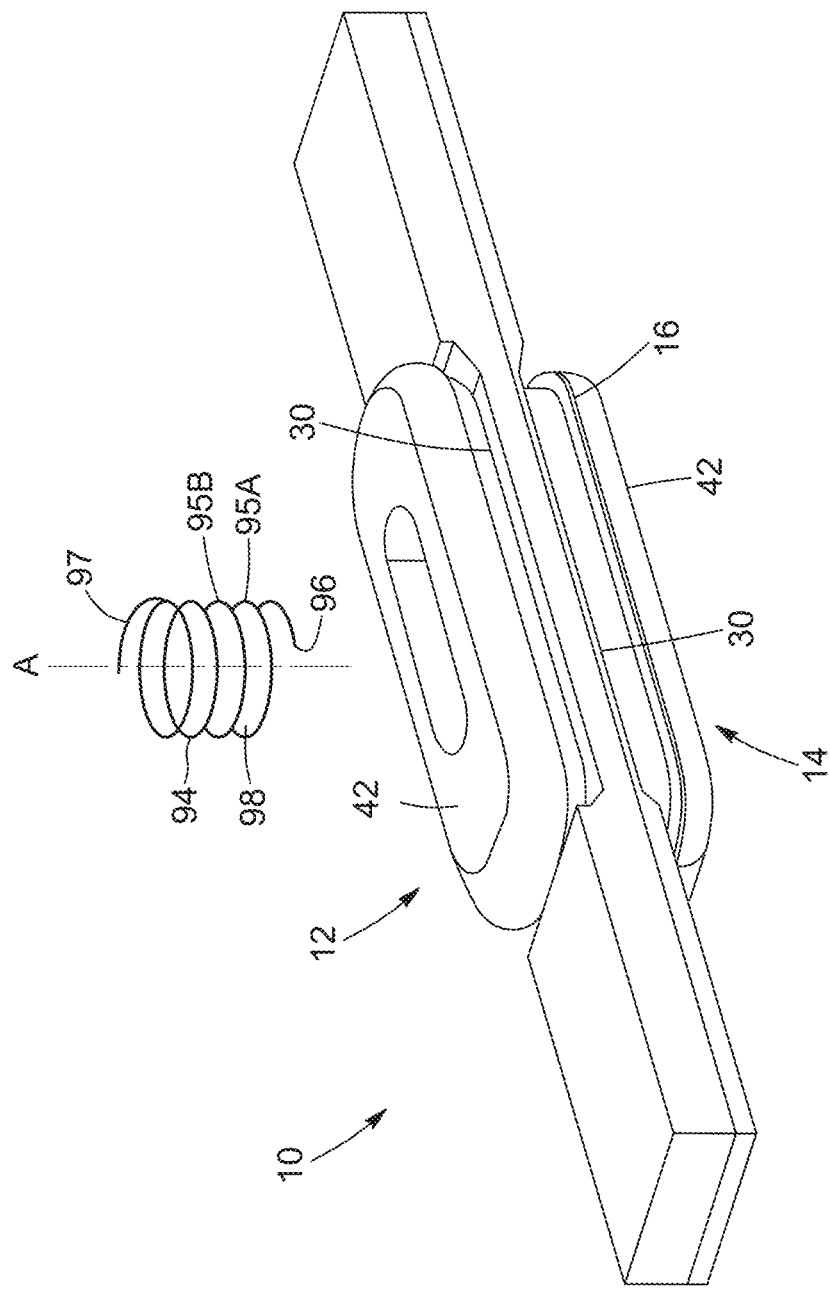
FIG. 28 is a perspective view of a first magnetic implant shown on one side of a desired site of an anastomosis, a second magnetic implant shown on another side of the desired site of the anastomosis, with corresponding vessel walls of first and second hollow organs being shown between the first and second magnetic implants, and a compression device, in accordance with another implementation.

Referring to FIG. 28, another implementation of a compressing device 90 is shown. In this implementation, the compressing device 90 comprises a compressive coiled member 94 defined by a helical body 97 having a longitudinal axis A. The helical body 97 of the compressive coiled member 94 is sized and configured to be inserted into the first through-hole 40 of the first magnetic implant 12, and comprises a first loop 95A and a second loop 95B adjacent to the first loop 95A. The compressive coil member 94 has a pitch 98 sized to receive the portion of wall tissue that includes both layers of the two adjacent walls such that the compressive coiled member 94 can exert a compressive force onto the wall tissue. Once the portion of wall tissue is compressed by the compressive coiled member 94, the initial anastomosis can be formed through the two adjacent walls via ischemic pressure necrosis.

In the implementation shown in FIG. 28, the helical body 97 of the compressive coiled member 94 is represented as a single wire (which can be made of metal or polymer, for instance) wound in a coil shape, and the first and second loops 95A, 95B are coaxial and formed to have a similar loop diameter. It is to be understood that, in other implementations, the helical body 97 can be formed of any other number of wires made of any other suitable material and defining any other number of loops and tissue compressing interstices.

In some implementations, the first loop 95A comprises a tissue piercing end 96 at a lower end of the first loop 95A. The tissue piercing end 96 is configured to pierce through both layers of the two adjacent walls. In particular, the piercing end 96 is configured to pierce the two adjacent walls and to project successively beyond the respective tissue-oriented surfaces 30 of the first and second magnetic implants 12, 14.

In operation, the helical body 97 of the compressive coiled member 94 is insertable into the first through-hole 40 of the first magnetic implant 12 in a direction that is substantially parallel to its longitudinal axis A. Then, the compressive coiled member 94 can be rotated about the longitudinal axis A to enable the tissue piercing end 96 to pierce through both layers of the two adjacent walls and project beyond the second tissue-oriented surface 30 of the second magnetic implant 14. Due to the coil shape of the helical body 97, the compressive coiled member 94 can be further rotated to insert at least a portion of the first loop 95A across both layers of the two adjacent walls to position the at least a portion of the first loop 95A into the second through-hole 41 of the second magnetic implant 14. When in this configuration, the compressive coiled member 94 can be considered as being removably secured to the two adjacent walls with both layers of the two adjacent walls being received within the pitch 98 of the helical body 87 and compressed by the compressive coiled member 94.

In some implementations, the first and second magnetic implants described herein can be configured as single-use implants, to ensure that each time a pair of first and second magnetic implants is implanted in a patient, their configuration is as initially designed, and their functionality is as initially intended. For instance, in some implementations, one or more components of each of the first and second magnetic implants 12, 14 can be configured to intentionally be structurally altered during the healing time period. For instance, one or more components of the system 10 (such as, for example, at least a portion of the housing 22 or at least a portion of the retention member 16) can include a bioresorbable feature configured to be degraded at the conditions existing in the hollow organ into which it is implanted, i.e., within the lumen of the first or second hollow organ.

Description of a Surgical Cutting Instrument

Figure 39:
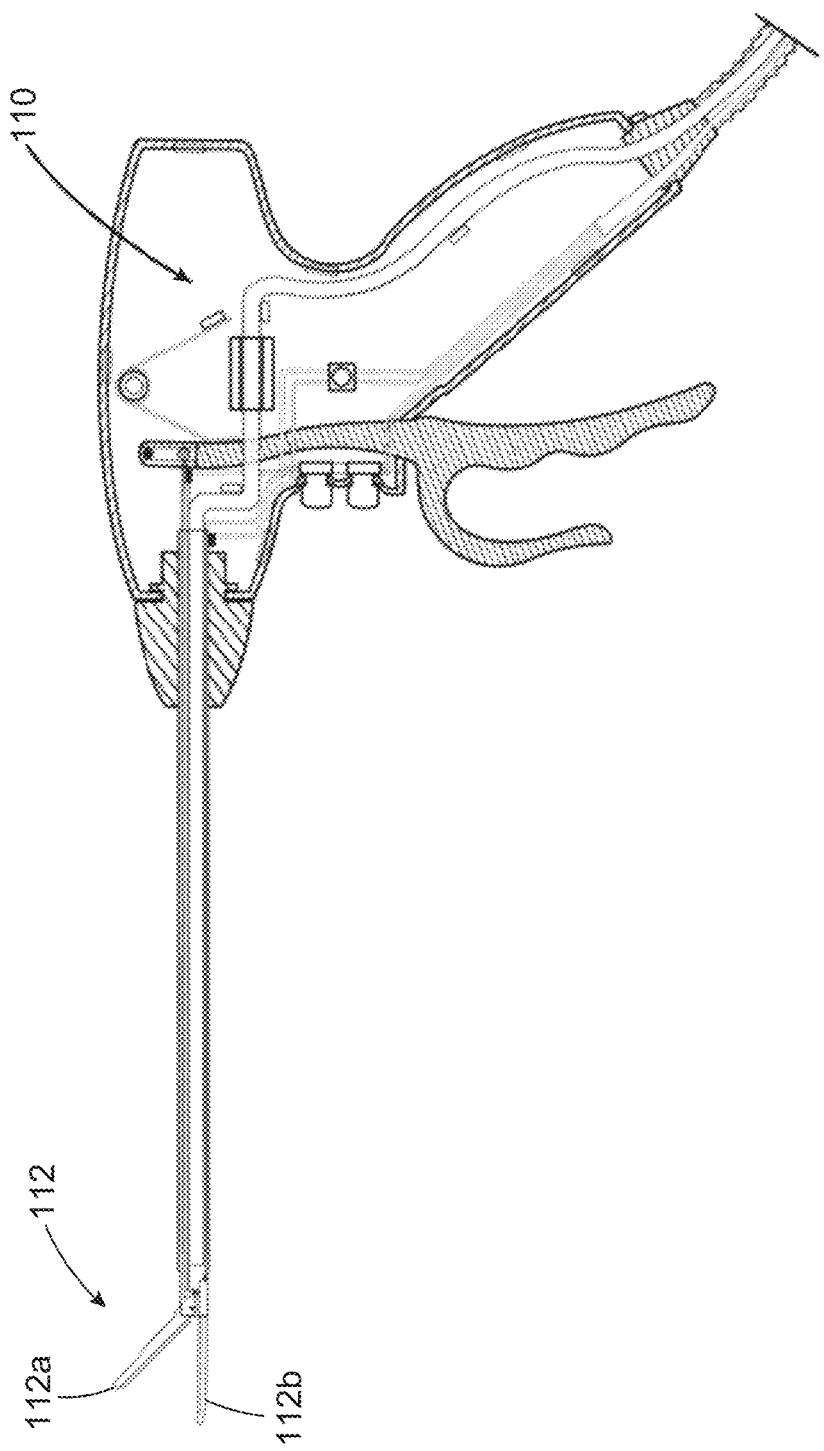
FIG. 39 is a side elevation cross-sectional view of an electrosurgical cutting instrument.

Referring to FIG. 39, a surgical cutting instrument 110 for use in association with a system for forming an anastomosis between two adjacent walls of hollow organs of the digestive tract is shown. The surgical cutting instrument 110 is configured to cut through the two adjacent walls in a region located inwardly from an inner periphery of the annular portion once the first and second elongated magnetic implants 12, 14 are magnetically coupled at the desired site of the anastomosis to provide fluid communication therethrough. The surgical cutting instrument 110 includes a cutting tip 112 insertable within the through-hole 40, 41 of at least one of the first and second elongated magnetic implants 12, 14.

In the implementation shown, the surgical cutting instrument 110 is an electrosurgical cutting instrument comprising a cutting tip 112 being couplable to an electrosurgical generator. In some implementations, the cutting tip 112 of the electrosurgical cutting instrument 110 is configured to receive an alternating electrical current with a continuous frequency of at least 100 kHz so as to achieve a cellular vaporisation of a portion of the tissue of the adjacent walls that is located inwardly from the inner periphery of the annular portion, to form the preliminary passageway.

In the implementation shown in FIG. 39, the electrosurgical cutting instrument 110 is configured to be operated as a bipolar electrosurgical instrument. The electrosurgical cutting instrument 110 thus includes a cutting tip 112 having an active electrode 112a and a return electrode 112b forming cutting forceps configured to grasp a portion of tissue of the wall of the hollow organ, and subject the portion of tissue to an alternating electrical current to cut the portion of tissue between the active and return electrodes 112a, 112b. In this implementation, the alternating electrical current received by the cutting tip 112 is directed from the active electrode 112a and through the tissue grasped therebetween to the return electrode 112b. In such implementations, at least one of the first and second through-holes 40, 41 can be sized to receive the active and return electrodes 112a, 112b of the cutting tip 112 therein.

In other implementations, the electrosurgical cutting instrument 110 can be operated as a monopolar electrosurgical instrument. In such implementations, the cutting tip 112 can include a tissue cutting electrode, and the electrosurgical cutting instrument can further include a dispersive electrode configured to be secured on the human body at a location remote from the desired site of the anastomosis such as, for instance, on the surface of the patient's skin. The dispersive electrode can dissipate the current generated by the electrosurgical generator and passing through the tissue cutting electrode. In some implementations, the tissue cutting electrode of the cutting tip 112 can include a pointed distal tip configured to be inserted into the through-hole 40, for instance if the through-hole is particularly small.

In other implementations, the surgical cutting instrument can include any other non-electrical instrument configured to cut tissue. Examples of surgical cutting instruments can include, for instance, a scalpel, a needle knife, and scissors, among others.

In implementations where the surgical cutting instrument 110 is an electrosurgical cutting instrument, each of the first and second elongated magnetic implants 12, 14 can be electrically non-conductive to electrically insulate the first and second elongated magnetic implants 12, 14 from the cutting tip 112 of the electrosurgical cutting instrument 110. In some implementations, the housing 22 can be an electrically non-conductive housing configured to electrically insulate the magnet 24. In some implementations, the electrically non-conductive housing 22 can be of a polymer material including, for instance, silicone, polyvinylchloride (PVC), polyethylene (PE), polypropylene (PP), polytetrafluoroethylene (PTFE), polymethylmethacrylate (PMMA), trimethylcarbonate, and TMC NAD-lactide. In some implementations, for instance when the housing 22 is not present, each of the first and second electrically non-conductive magnetic implants 12, 14 can include a magnet 24 that is electrically non-conductive. For instance, the magnet 24 can be made of a ferrite material, which can include one or more of strontium ferrite, barium ferrite, magnesium-zinc ferrite, nickel-zinc ferrite, and cobalt ferrite.

Description of a Magnetic Implant with a Hinge

Referring to FIGS. 30 to 32, another implementation of a first magnetic implant 120 is shown. In this implementation, the first magnetic implant 120 is configurable between a delivery configuration and an anastomosis configuration. The delivery configuration can contribute to facilitating the delivery of the first magnetic implant 120 at the desired site of the anastomosis, by modifying a dimension and/or a shape of the magnetic body 170 (e.g., by reducing the overall width of the first magnetic implant 120). The first magnetic implant 120 can be configured in a delivery configuration during delivery of the first magnetic implant 120 to the desired site of the anastomosis, and in an anastomosis configuration once the first magnetic implant 120 is positioned at the desired site of the anastomosis. It will be understood that, while the following description is provided in relation to the first magnetic implant 120, the second magnetic implant 14 can also be configurable between a delivery configuration and an anastomosis configuration and include all or at least some of the features described below.

In the implementation shown, the first magnetic implant 120 includes a magnetic body 170 comprising first and second subdivisions 172, 174, the first and second subdivisions 172, 174 being foldable onto one another. In some implementations, each of the first and second subdivisions 172, 174 can be elongated and extend adjacently and substantially parallel to one another along a longitudinal axis A of the magnetic body 170. The first subdivision 172 defines a first subdivision interface 171 in each of the first and second end portions 32, 33, and the second subdivision 174 defines a second division interface 173 in each of the first and second end portions 32, 33, the first subdivision interface 171 and the second subdivision interface 173 facing each other when the first magnetic implant 12 is in the anastomosis configuration (as shown in FIG. 30), and the first and second subdivisions 171, 173 bisecting each of the first and second end portions 32, 33.

In the implementation shown in FIG. 30, each of the first and second subdivisions 172, 174 is a generally C-shaped subdivision with an inner periphery 177 of the C-shaped subdivision defining the through-hole 40 of the first magnetic implant 120. In the implementation shown, when the first magnetic implant 120 is in the anastomosis configuration, i.e., when the first and second subdivisions 172, 174 are unfolded, the first and second subdivisions 172, 174 define the though-hole 40. It is to be noted that although FIG. 30 illustrates a transverse arm width $T_A$ of the first and second arms 34a, 34b being larger than a transverse through-hole width $T_H$ of the though-hole 40, such as described above with reference to FIGS. 4B and 33, the magnetic implant 120 can alternatively be sized and configured such that the transverse arm width $T_A$ is smaller than the transverse through-hole width $T_H$.

In some implementations, when the first magnetic implant 120 is in the delivery configuration, a dimension of the magnetic body 170 is decreased and/or a shape of the magnetic body 170 is modified to facilitate an endoscopic or laparoscopic delivery of the first magnetic implant 120 to the desired site of the anastomosis. For instance, in some implementations, the first magnetic implant 120 can be delivered endoscopically and the delivery configuration of the first magnetic implant 120 can enable a healthcare provider to use an endoscope with a working channel smaller, e.g., narrower, than if the magnetic implant was not configurable in the delivery configuration. Similarly, if a minimally invasive approach is chosen to deliver the first magnetic implant 120 to the desired site of the anastomosis, the first magnetic implant 120 can be passed through a smaller percutaneous incision than if the first magnetic implant 120 was not configurable in a delivery configuration.

In some implementations, the reduced dimension or the modified shape of the first magnetic implant 120 can be achieved by folding the first and second subdivisions 172, 174 onto one another, such that the overall width of the magnetic body 170, when the magnetic implant is in the delivery configuration, is decreased compared to the overall width of the magnetic body 170 when the magnetic implant 12 is in the anastomosis configuration. Reducing the overall width of the magnetic body 170 can facilitate the delivery of the first magnetic implant 120 to the implantation site, at least because an object having a smaller width can be easier to navigate through the digestive tract using conventional endoscopic or laparoscopic tools, without inducing potential trauma to surrounding tissues, i.e., the tissues of the digestive tract.

Referring to FIG. 32, the first magnetic implant 120 is shown in a transition state between the delivery configuration and the anastomosis configuration. The magnetic body 170 includes a hinge 175 engaging the first and second subdivisions 172, 174 together and enabling the first and second subdivisions 172, 174 to be folded onto one another or unfolded. In the implementation shown, the hinge 175 includes two hinge portions 175a, 175b, each of the hinge portions 175a, 175b being secured to both of the first and second subdivisions 172, 174 to engage the first and second subdivisions 172, 174 together at respective end portions 32, 33. The hinge portions 175a, 175b are each configured to pivot about a pivot pin. In other implementations, the hinge 175 can include a living hinge being unitary with the first and second subdivisions 172, 174.

In the implementation shown, the first tissue-oriented surface 30 is folded onto itself when the first magnetic implant 120 is in the delivery configuration, thereby reducing the overall width of the magnetic body 170, and thus the surface area of the resulting external surface 176. It will be understood that, in other implementations, the first lumen-oriented surface 42 can be folded onto itself when the first magnetic implant 120 is in the delivery configuration.

In order to fold the first and second subdivisions 172, 174 onto one another to reduce the resulting external surface 176 remaining after the folding and thus place the first magnetic implant 120 in the delivery configuration, the hinge 175 is located between the first subdivision interface 171 and the second subdivision interface 173. Accordingly, when the first and second subdivision interfaces 171, 173 each extends along a longitudinal axis of the magnetic body 170 as shown FIG. 30, the hinge 175 defines a pivot axis A of the first and second subdivisions 172, 174 that is collinear with a longitudinal axis of the magnetic body 170.

In some implementations, each of the first and second subdivisions 172, 174 can include a corresponding magnet element 177, 179 (shown in FIG. 31) that is axially magnetized. Each of the magnet elements 177, 179 can provide opposite magnetic poles located proximate the tissue-oriented surface 30 and the lumen-oriented surface 42, respectively. In some implementations, the magnet element of each of the first and second subdivisions 172, 174 includes a same magnetic pole distribution such that, when the first magnetic implant 120 is in the delivery configuration, the magnet element 177 of the first subdivision 172 is magnetically repelled by the magnet element 179 of the second subdivision 174, as shown in FIG. 31. In such implementations, the magnet element 177 of the first subdivision 172 and the magnet element 179 of the second subdivision 174 together result in a common magnet that is axially magnetized when the first magnetic implant 120 is in the anastomosis configuration. The axially magnetized common magnet can enable a coupling of the first magnetic implant 120 with a second magnetic implant 14 having a similar axially magnetized magnet, i.e., a non-foldable second magnetic implant 14.

Referring to FIGS. 30 and 31, the first magnetic implant 120 can further include a closure feature 128 enabling the first and second subdivisions 172, 174 to remain folded onto one another in the delivery configuration until release to the anastomosis configuration becomes suitable. In some implementations, the closure feature 178 can include a first closure feature 178a associated with the first subdivision 172 and configured to cooperatively engage a second closure feature 178b associated with the second subdivision 174 to retain the first magnetic implant 120 in the delivery configuration. In the implementation shown, the closure feature 178 includes a latch. In other implementations, the closure can include, for instance, a cam lock, a pawl or any other mechanism suitable for selectively retaining the first and second subdivisions 172, 174 in the delivery configuration.

In some implementations, the first magnetic implant 120 can be navigated to the desired site of the anastomosis site when in the delivery configuration, with a delivery system. The engagement of the first magnetic implant 120 and the delivery system can be achieved via the connecting member 18 described above. In some implementations, the delivery system can be configured to selectively deploy the first magnetic implant 120 into the anastomosis configuration once delivered to the desired anastomosis site by, for instance, releasing the closure feature 178.

In other implementations, the magnet element of each of the first and second subdivisions 172, 174 can include opposite magnetic pole distributions such that, when the first magnetic implant 120 is in the delivery configuration, the magnet element 177 of the first subdivision 172 is magnetically attracted to the magnet element 179 of the second subdivision 174. In such implementations, when the first magnetic implant 120 is in the delivery configuration, the hinge 175 can be configured to resiliently bias the first magnetic implant 12 into the anastomosis configuration. In order to do so, the hinge 175 can be configured to apply a rotational force to the first and second subdivisions 172, 174 to counteract the magnetic attractive force between the magnet elements of the first and second subdivisions, to facilitate a transition of the first magnetic implant 120 into the anastomosis configuration.

Methods for Forming an Anastomosis in the Digestive Tract

A method for forming an anastomosis between two adjacent walls of a digestive tract of a patient will now be described in further detail. The method can include delivering a first magnetic implant into the digestive tract of a patient to a first location, on one side of a desired anastomose site, and delivering a second magnetic implant into the digestive tract of the patient to a second location on another side of the desired anastomose site, the first and second magnetic implants including a first and second through-hole, respectively. The method further includes magnetically coupling the first and second magnetic implants together through the two adjacent vessel walls of the digestive tract to at least partially superpose the first and second through-holes and to compress an annular portion of the two adjacent walls therebetween.

In some implementations, the method can further include cutting an opening through the two adjacent walls, inwardly from the inner periphery of the annular portion, to provide preliminary fluid communication, a preliminary passageway between the first and second hollow organs. As discussed above, the preliminary passageway can contribute to enable a flow of liquid, gas and/or solid matter through the digestive tract, thus alleviating some discomfort that can potentially be experienced by the patient.

Methods of Operating an Electrosurgical Cutting Instrument

Various techniques can be used to cut an opening through the two adjacent walls. For instance, in some implementations, an electrosurgical cutting instrument can be inserted into the through-hole of one of the first and second magnetic implants to cut though the two adjacent walls in a cutting region located inwardly from the inner periphery of the annular portion, once the first and second elongated magnetic implants are magnetically coupled, to provide fluid communication therethrough. In some implementations, operating the electrosurgical cutting instrument includes providing an alternating electric current with a continuous frequency of at least 100 kHz to the cutting tip of the electrosurgical cutting instrument to at least cause vaporisation of the cells in a selected location within the cutting region.

In some implementations, operating the electrosurgical cutting instrument can include cutting through the two adjacent walls along at least a portion of a chord extending across the cutting region by, for instance, translating the cutting tip along the chord extending across the cutting region, while the alternating electric current is supplied to the cutting tip of the electrosurgical instrument. In other implementations, cutting through the two adjacent walls can include displacing the cutting tip of the electrosurgical cutting instrument axially from the first through-hole of the first magnetic implant to the second through-hole of the second magnetic implant, i.e., in an axial direction of the through-hole of the magnetic implant.

In some implementations, the electrosurgical cutting instrument can be a monopolar cutting instrument, and the method can further include securing a dispersive electrode to the patient and connecting the dispersive electrode to the electrosurgical generator. In other implementations, the electrosurgical cutting instrument can be a bipolar cutting instrument, and the method can further include operating electrosurgical forceps of the cutting tip to cut through the two adjacent walls without the use of a dispersive electrode.

Methods of Operating an Integrated Cutting Mechanism

In some implementations, the method can include operating a cutting mechanism integrated into at least one of the first and second magnetic implants between a non-cutting configuration and a cutting configuration to cut though the two adjacent walls located inwardly from the inner periphery of the annular portion, once the first and second magnetic implants are magnetically coupled, and the cutting mechanism is in the cutting configuration.

In some implementations, operating the cutting mechanism can include translating the cutting mechanism axially from the first through-hole of the first magnetic implant to the second through-hole of the second magnetic implant to transition from the non-cutting configuration to the cutting configuration. For instance, in some implementations, operating the cutting mechanism can include driving a punch toward the two adjacent walls in the cutting region to cut through the two adjacent walls, for example, by selectively releasing the punch once the first and second magnetic implants are magnetically coupled. In some implementations, driving the punch toward the two adjacent walls in the cutting region can provide securing the first and second magnetic implants together when in the cutting configuration. Securing the first and second magnetic implants can contribute to restrict a relative displacement between the first and second magnetic implants when the punch is extended within the second through-hole of the second magnetic implant.

In other implementations, operating the cutting mechanism can include cutting through the two adjacent walls along at least a portion of a chord extending across the cutting region. In some implementations, a cut along the portion of the chord extending across the cutting region can be achieved by displacing a blade through the two adjacent walls. In such implementations, the method can further include releasing the blade from a blade receiving cavity defined in the first magnetic implant and guiding the blade along a predetermined path to enable controlling a displacement of the blade as it cuts through the two adjacent walls.

In some implementations, operating the cutting mechanism can include inserting a distal tip of a wire electrode into the first through-hole of the first magnetic implant and translating the distal tip of the wire electrode along the at least a portion of the chord extending across the cutting region. Alternatively, in other implementations, the distal tip of a wire electrode can be displaced axially from the first through-hole of the first magnetic implant to the second through-hole of the second magnetic implant to achieve the cutting of the adjacent walls. In some implementations, the method can further include releasing the wire electrode from the first magnetic implant after the cut has been performed.

In some implementations, the cutting mechanism can include a wire electrode extending across the first through-hole, and operating the cutting mechanism can include providing an electric current to the wire electrode once the first and second magnetic implants are magnetically coupled, such that the generated heat can achieve varying degrees of tissue destruction, including cutting through the tissue. In some implementations, the method can further comprise biasing the wire electrode toward the two adjacent walls in the cutting region to promote the formation of a substantially continuous cut through the two adjacent walls.

In some implementations, magnetically coupling the first and second magnetic implants together can include at least partially superposing a plurality of first through-holes and a plurality of second through-holes and operating the cutting mechanism within each through-hole of the plurality of first through-holes or, alternatively, operating a plurality of cutting mechanisms, each of the plurality of cutting mechanisms being operated within a respective one of the plurality of first through-holes.

In some implementations, the method can include compressing an inwardly located portion of the two adjacent walls located inwardly from the inner periphery of the annular portion to cause ischemic pressure necrosis and form an initial anastomosis through the two adjacent walls during the healing time period.

In some implementations, the method can further include the step of suctioning both layers of the two adjacent walls by, for instance, operating a suction tube connectable to a vacuum source, such that the inwardly located portion protrudes outwardly from a first tissue-oriented surface or a first lumen-oriented surface of the first magnetic implant.

In order to compress the inwardly located portion of the two adjacent walls, in some implementations, the method can further include expanding a compression device around the inwardly located portion of the two adjacent walls by, for instance, engaging the compression device with an expansion mechanism coupled to the first magnetic implant. The compression device can then be released once the first and second magnetic implants are magnetically coupled to radially compress the inwardly located portion of the two adjacent walls.

In some implementations, the method can include piercing the two adjacent walls by introducing a first end of a compression device beyond a second tissue-oriented surface of the second magnetic implant and axially rotating the compression device to position a first loop of the compression device on a first side of the portion of the two adjacent walls and a second loop of the compression device on a second side of the portion of the two adjacent walls opposite the first side to compress the portion of the two adjacent walls.

In some implementations, the method can include axially translating a screw within the first-through hole of the first magnetic implant to cut through the two adjacent walls. In some implementations, axially translating the screw within the first through-hole can be performed endoscopically or laparoscopically. The screw includes an elongated screw body extending between a tissue-contacting end and a lumen-facing end, the tissue-contacting end defining the cutting edge. In such implementations, the first magnetic body can include a first sidewall defining the first through-hole. The first sidewall can include sidewall threads and the screw can include screw threads configured to engage the sidewall threads of the first magnetic implant. In some implementations, the screw is configured to translate axially within the first through-hole of the first magnetic implant upon engagement of the screw threads with the sidewall threads of the first magnetic implant when the screw is rotated about a longitudinal axis thereof to drive the screw from the non-cutting configuration to the cutting configuration. In some implementations, the screw can include a screw bore extending between the tissue-contacting end and the lumen-facing end to enable the fluid communication through the two adjacent walls when the cutting mechanism is in the cutting configuration.

Several alternative implementations and examples have been described and illustrated herein. The implementations of the technology described above are intended to be exemplary only. A person of ordinary skill in the art would appreciate the features of the individual implementations, and the possible combinations and variations of the components. A person of ordinary skill in the art would further appreciate that any of the implementations could be provided in any combination with the other implementations disclosed herein. It is understood that the technology may be embodied in other specific forms without departing from the central characteristics thereof. The present implementations and examples, therefore, are to be considered in all respects as illustrative and not restrictive, and the technology is not to be limited to the details given herein. Accordingly, while the specific implementations have been illustrated and described, numerous modifications come to mind.

Other possible item(s), aspect(s), object(s), embodiment(s), variant(s), item(s) and/or advantage(s) of the present disclosure/invention, all being preferred and/or optional, are briefly summarized hereinbelow:

1. A system for forming an anastomosis at a target site between two adjacent walls of a digestive tract, the system comprising:
    a first magnetic implant comprising a first magnetic body having a first tissue-oriented surface and a first lumen-oriented surface, the first magnetic body defining a first through-hole extending between the first tissue-oriented surface and the first lumen-oriented surface;
    a second magnetic implant comprising a second magnetic body having a second tissue-oriented surface and a second lumen-oriented surface, the second magnetic body defining a second through-hole extending between the second tissue-oriented surface and the second lumen-oriented surface;
    the first and second magnetic implants being configured to magnetically couple to each other through the two adjacent walls of the digestive tract with the first and second through-holes being at least partially superposable to each other to compress an annular portion of the two adjacent walls therebetween; and
    a cutting mechanism integrated into the first magnetic implant and configurable between a non-cutting configuration during delivery of the first and second magnetic implants to the target site and a cutting configuration once the first and second magnetic implants are coupled at the target site, the cutting mechanism comprising a cutting edge configured to cut through the two adjacent walls in a region located inwardly from an inner periphery of the annular portion when in the cutting configuration to provide fluid communication therethrough.
2. The system of item 1, wherein the cutting edge of the cutting mechanism is configured to project beyond a first plane defined by the first tissue-oriented surface of the first magnetic implant when in the cutting configuration.
3. The system of item 2, wherein the cutting edge of the cutting mechanism is configured to project successively beyond the first plane and a second plane defined by the second tissue-oriented surface of the second magnetic implant when in the cutting configuration.
4. The system of item 3, wherein the cutting edge of the cutting mechanism is configured to extend beyond the second plane and into the second through-hole of the second magnetic implant when in the cutting configuration.
5. The system of any one of items 1 to 4, wherein the cutting mechanism comprises a punch having a tissue-contacting end defining the cutting edge.
6. The system of item 5, wherein the punch comprises an annular body.
7. The system of any one of items 5 or 6, wherein the second magnetic implant defines a die configured to receive the punch.
8. The system of any one of items 5 to 7, wherein the cutting mechanism further comprises a resilient member configured to selectively drive the punch from the non-cutting configuration to the cutting configuration.
9. The system of any one of item 5 to 8, wherein the cutting mechanism is configured to translate axially from the first through-hole of the first magnetic implant to the second through-hole of the second magnetic implant, thereby transitioning from the non-cutting configuration to the cutting configuration.
10. The system of any one of items 5 to 8, wherein the punch is configured to toggle axially from the first through-hole of the first magnetic implant to the second through-hole of the second magnetic implant and back to the first through-hole of the first magnetic implant, thereby transitioning from the non-cutting configuration to the cutting configuration and back to the non-cutting configuration.
11. The system of item 9 or 10, wherein the punch is mechanically driven from the non-cutting configuration to the cutting configuration.
12. The system of item 9 or 10, wherein the punch is configured to be cam actuated.
13. The system of item 9 or 10, wherein the cutting mechanism further comprises a carriage engageable with the punch and configured to translate along at least one of a longitudinal axis and a lateral axis of the first magnetic implant, the carriage comprising one of a pin and a slot and the punch comprising the other of a pin and a slot, the pin being translatable along a cam path defined by the slot such as to translate the carriage and drive the punch from the non-cutting configuration to the cutting configuration.
14. The system of item 9 or 10, wherein the punch is spring-loaded into the first magnetic implant.
15. The system of item 9, wherein the punch is magnetically driven.
16. The system of item 15, wherein the first magnetic implant comprises a stopper configured to retain the punch in the non-cutting configuration, the stopper being further configured to be retracted to release the punch from the non-cutting configuration into the cutting configuration.
17. The system of item 16, wherein the stopper is spring-loaded into the first magnetic implant and configured to be released when the first and second magnetic implants are magnetically coupled to each other.
18. The system of item 14 or 15, wherein the first magnetic implant comprises a bioresorbable stopper configured to temporarily retain the punch in the non-cutting configuration.
19. The system of item 18, wherein the bioresorbable stopper is made of a resorbable material configured to dissolve in the digestive tract to release the punch from the non-cutting configuration into the cutting configuration.
20. The system of any one of items 5 to 19, wherein the punch comprises superomniphobic surfaces to discharge a punched-out portion of the two adjacent walls.
21. The system of any one of items 1 to 4, further comprising a delivery wire coupled to the cutting mechanism, the cutting mechanism comprising a blade provided at a distal end of the delivery wire and defining the cutting edge.

22. The system of item 21, wherein the delivery wire is insertable into a delivery wire receiving channel or a delivery wire receiving recess provided within the first body of the first magnetic implant.

23. The system of item 21 or 22, wherein the first magnetic implant comprises a blade receiving cavity configured to receive the blade when the cutting mechanism is in the non-cutting configuration.

24. The system of any one of items 21 to 23, wherein in the cutting configuration, the delivery wire is configured to be pulled out to displace the blade through the two adjacent walls.

25. The system of item 24, wherein the blade is configured to be displaced along a predetermined cutting path.

26. The system of item 25, wherein the predetermined cutting path extends longitudinally with respect to the first magnetic body of the first magnetic implant.

27. The system of item 25 or 26, wherein the first magnetic body of the first magnetic implant comprises a slotted path defined in a sidewall defining the first through-hole.

28. The system of item 27, wherein at least one of the delivery wire and the blade comprises a first pin configured to be moved within the slotted path according to the predetermined cutting path of the blade.

29. The system of item 28, wherein at least one of the delivery wire and the blade comprises a second pin configured to be moved within the slotted path to limit a pivoting of the blade while in the cutting configuration.

30. The system of any one of item 21 to 29, wherein the blade comprises a retractable blade.

31. The system of any one of items 1 to 30, wherein the cutting mechanism is configured to secure the first magnetic implant to the second magnetic implant when in the cutting configuration.

32. The system of any one of items 1 to 31, wherein the first magnetic implant comprises a first magnet and a first housing configured to receive the first magnet therein, the first magnet and the first housing together forming the first magnetic body.

33. The system of item 32, wherein the second magnetic implant comprises a second magnet and a second housing configured to receive the second magnet therein, the second magnet and the second housing together defining the second magnetic body.

34. The system of item 33, wherein the first and second magnets generate first and second magnetic fields, respectively, the first magnetic field being configured to interact with the second magnetic field to attract the first and second magnetic implants and magnetically couple the first and second magnetic implants.

35. The system of any one of item 1 to 34, wherein the first magnetic implant comprises a plurality of first through-holes and the second magnetic implant comprises a plurality of second through-holes, each first through-hole of the plurality of first through-holes being superposable to a corresponding second through-hole of the plurality of second through-holes when the first and second magnetic implants are magnetically coupled to each other.

36. The system of item 35, further comprising a plurality of cutting mechanisms, each cutting mechanism of the plurality of cutting mechanisms being integrated into a corresponding first through-hole of the plurality of first through-holes of the first magnetic implant.

37. The system of any one of item 1 to 34, wherein the first though-hole of the first magnetic implant comprises a plurality of first through-holes superposable to the second through-hole of the second magnetic implant.

38. A system for forming an anastomosis at a target site between two adjacent walls of a digestive tract, the system comprising:
   a first magnetic implant comprising a first magnetic body having a first tissue-oriented surface and a first lumen-oriented surface, the first magnetic body defining a first through-hole extending between the first tissue-oriented surface and the first lumen-oriented surface;
   a second magnetic implant comprising a second magnetic body having a second tissue-oriented surface and a second lumen-oriented surface, the second magnetic body defining a second through-hole extending between the second tissue-oriented surface and the second lumen-oriented surface;
   the first and second magnetic implants being configured to magnetically couple to each other through the two adjacent walls of the digestive tract with the first and second through-holes being at least partially superposable to each other to compress an annular portion of the two adjacent walls therebetween; and
   a cutting mechanism integrable into the first magnetic implant and being configurable between a non-cutting configuration during delivery of the first and second magnetic implants to the target site and a cutting configuration once the first and second magnetic implants are coupled at the target site, the cutting mechanism comprising a wire electrode couplable to an electrosurgical generator, the wire electrode comprising a distal tip having a distal tip cross-section covering at least 10% of a through-hole cross-section of the first through-hole, the wire electrode being insertable into the first through-hole to cut through the two adjacent walls via cauterization when in the cutting configuration to provide fluid communication therethrough.

39. The system of item 38, wherein the distal tip of the wire electrode is configured to translate axially from the first through-hole of the first magnetic implant to the second through-hole of the second magnetic implant.

40. The system of item 38 or 39, wherein the distal tip of the wire electrode is further configured to be insertable within the second through-hole to cut through the two adjacent walls via cauterization.

41. The system of any one of items 38 to 40, wherein the cutting mechanism is configured to be releasably engageable with the first magnetic implant.

42. The system of item 41, wherein the cutting mechanism is configured to be released from the first magnetic implant when in the non-cutting configuration.

43. The system of any one of items 38 to 42, wherein the wire electrode is resiliently biasable toward a region located inwardly from an inner periphery of the annular portion.

44. The system of any one of items 38 to 43, further comprising a delivery system releasably connectable to the first magnetic implant, the wire electrode being insertable within the delivery system.

45. The system of item 44, wherein the delivery system comprises first and second ends, the distal tip of the wire electrode extending outwardly from the first end of the delivery system.

46. The system of item 44 or 45, wherein the first magnetic implant further comprises a housing defining a wire electrode receiving channel to receive a portion of the wire electrode therein.

47. The system of item 46, wherein the first magnetic implant further comprises an attachment feature provided within the wire electrode receiving channel to releasably connect the delivery system to the housing of the first magnetic implant.

48. The system of item 47, wherein the wire electrode receiving channel of the housing comprises an elbow.

49. The system of item 47 or 48, wherein the housing is electrically insulated to electrically insulate the wire electrode from a remainder of the first magnetic implant.

50. The system of any one of items 38 to 49, wherein the distal tip is configured to be translated along at least one of a longitudinal direction and a lateral direction when in the cutting configuration.

51. The system of item 50, wherein the wire electrode is configured to be translated along the at least one of the longitudinal direction and the lateral direction of the first magnetic implant when in the cutting configuration to form a substantially linear cut through the two adjacent walls.

52. The system of anyone one of items 38 to 51, wherein the distal tip of the wire electrode comprises a metal probe configured to be heated by an electric current generated by the electrosurgical generator.

53. The system of any one of items 38 to 51, wherein the cutting mechanism is configured to be laparoscopically controlled.

54. The system of any one of item 38 to 53, wherein the first magnetic implant comprises a plurality of first through-holes and the second magnetic implant comprises a plurality of second through-holes, each first through-hole of the plurality of first through-holes being superposable to a corresponding second through-hole of the plurality of second through-holes when the first and second magnetic implants are magnetically coupled to each other.

55. The system of item 54, wherein the distal tip of the wire electrode is configured to be sequentially inserted within each of the plurality of first through-holes to cut a plurality of openings through the two adjacent walls when in the cutting configuration.

56. The system of item 54, wherein the wire electrode comprises a plurality of distal tips, each of the distal tips being insertable into a separate one of the first through-holes of the first magnetic implant.

57. The system of item 54, further comprising a plurality of cutting mechanisms, each cutting mechanism of the plurality of cutting mechanisms being insertable into a corresponding first through-hole of the plurality of first through-holes of the first magnetic implant.

58. A system for forming an anastomosis at a target site between two adjacent walls of a digestive tract, the system comprising:
a first magnetic implant comprising a first magnetic body having a first tissue-oriented surface and a first lumen-oriented surface, the first magnetic body defining a first through-hole extending between the first tissue-oriented surface and the first lumen-oriented surface;
a second magnetic implant comprising a second magnetic body having a second tissue-oriented surface and a second lumen-oriented surface, the second magnetic body defining a second through-hole extending between the second tissue-oriented surface and the second lumen-oriented surface;
the first and second magnetic implants being configured to magnetically couple to each other through the two adjacent walls of the digestive tract with the first and second through-holes being at least partially superposable to each other to compress an annular portion of the two adjacent walls therebetween; and
a cutting mechanism integrated into the first magnetic implant and being configurable between a non-cutting configuration during delivery of the first and second magnetic implants to the target site and a cutting configuration once the first and second magnetic implants are coupled at the target site, the cutting mechanism comprising a wire electrode couplable to an electrosurgical generator, the wire electrode extending across the first through-hole to cut through the two adjacent walls in a region located inwardly from an inner periphery of the annular portion when in the cutting configuration to provide fluid communication therethrough.

59. The system of item 58, wherein the wire electrode is configured to cut in a longitudinal direction with respect to the first magnetic implant.

60. The system of item 58 or 59, wherein the wire electrode is resiliently biasable.

61. The system of any one of items 58 to 60, wherein the wire electrode comprises a contact portion configured to project beyond a first plane defined by the first tissue-oriented surface of the first magnetic implant when the first and second magnetic implants are uncoupled.

62. The system of item 61, wherein the contact portion of the wire electrode is configured to exert a pressure toward a second plane defined by the second tissue-oriented surface of the second magnetic implant when the first and second magnetic implants are magnetically coupled to each other.

63. The system of any one of items 58 to 60, wherein the wire electrode is configured to abut an inner surface of one of the two adjacent walls when the first and second magnetic implants are magnetically coupled to each other.

64. The system of any one of items 61 to 63, wherein the contact portion extends along at least 10% of a cross-section of the first through-hole.

65. The system of any one of items 61 to 64, wherein the contact portion extends along an entire cross-section of the first through-hole.

66. The system of any one of items 58 to 65, further comprising a delivery system configured to deliver the first magnetic implant to the target site, the wire electrode being couplable to the electrosurgical generator via the delivery system.

67. The system of any one of items 58 to 66, wherein the first magnetic implant further comprises a housing engageable with a portion of the delivery system.

68. The system of item 67, wherein the housing is electrically insulated to electrically insulate the wire electrode from a remainder of the first magnetic implant.

69. A system for forming an anastomosis at a target site between two adjacent walls of a digestive tract, the system comprising:
a first magnetic implant comprising a first magnetic body having a first tissue-oriented surface and a first lumen-oriented surface, the first magnetic body defining a first through-hole extending between the first tissue-oriented surface and the first lumen-oriented surface;
a second magnetic implant comprising a second magnetic body having a second tissue-oriented surface and a second lumen-oriented surface, the second magnetic body defining a second through-hole extending between the second tissue-oriented surface and the second lumen-oriented surface;
the first and second magnetic implants being configured to magnetically couple to each other through the two adjacent walls of the digestive tract with the first and second through-holes being at least partially superposable to each other to compress an annular portion of the two adjacent walls therebetween such that a central region; and
a cutting mechanism integrable into at least one of the first and second magnetic implants and configurable between a non-cutting configuration during delivery of the first and second magnetic implants to the target site and a cutting configuration once the first and second magnetic implants are at the target site, the cutting mechanism being configured to cut along at least a portion of a chord extending across a region located inwardly of an inner periphery of the annular portion through the two adjacent walls to provide fluid communication therethrough.

70. The system of item 69, wherein the chord extends radially.

71. The system of item 69, wherein the chord extends between a first point located at a first location and a second point located at a second location, the first and second locations being located on the inner periphery of the annular portion.

72. The system of any one of items 69 to 71, wherein the first through-hole has a substantially circular cross-section, and the chord extends along a diameter of the substantially circular cross-section.

73. The system of any one of items 69 to 71, wherein the first through-hole has a substantially oblong cross-section, and the chord extends along a longest axis of the substantially oblong cross-section.

74. The system of any one of items 69 to 71, wherein the first through-hole has a substantially rectangular cross-section, and the chord extends along a longest axis of the substantially rectangular cross-section.

75. A method for forming an anastomosis between two adjacent walls of a digestive tract of a patient, the method comprising:
delivering a first magnetic implant comprising a first through-hole into the digestive tract to a first location on one side of a desired anastomose site;
delivering a second magnetic implant comprising a second through-hole into the digestive tract to a second location on another side of the desired anastomose site;
magnetically coupling the first and second magnetic implants together through the two adjacent vessel walls of the digestive tract to at least partially superpose the first and second through-holes and to compress an annular portion of the two adjacent walls therebetween;
operating a cutting mechanism integrable into at least one of the first and second magnetic implants and configurable between a non-cutting configuration and a cutting configuration to cut though the two adjacent walls in a cutting region located inwardly from an inner periphery of the annular portion, once the first and second magnetic implants are magnetically coupled, and the cutting mechanism is in the cutting configuration.

76. The method of item 75, wherein operating the cutting mechanism comprises translating the cutting mechanism axially from the first through-hole of the first magnetic implant to the second through-hole of the second magnetic implant to transition from the non-cutting configuration to the cutting configuration.

77. The method of item 75 or 76, wherein transitioning from the non-cutting configuration to the cutting configuration comprises mechanically driving a punch toward the two adjacent walls in the cutting region.

78. The method of item 75 or 76, wherein transitioning from the non-cutting configuration to the cutting configuration comprises magnetically driving a punch toward the two adjacent walls in the cutting region.

79. The method of item 78, further comprising selectively releasing the punch once the first and second magnetic implants are magnetically coupled.

80. The method of any one of items 75 to 79, wherein driving the punch toward the two adjacent walls in the cutting region comprises securing the first magnetic implant to the second magnetic implant.

81. The method of item 75, wherein operating the cutting mechanism comprises cutting through the two adjacent walls along at least a portion of a chord extending across the cutting region.

82. The method of item 81, wherein cutting through the two adjacent walls along the at least a portion of the chord comprises displacing a blade through the two adjacent walls.

83. The method of item 82, wherein transitioning from the non-cutting configuration to the cutting configuration comprises releasing the blade from a blade receiving cavity defined in the first magnetic implant.

84. The method of item 82 or 83, wherein displacing the blade comprises guiding the blade along a predetermined path.

85. The method of item 81, wherein operating the cutting mechanism comprises translating a distal tip of a wire electrode along the at least a portion of the chord extending across the cutting region.

86. The method of item 81, wherein operating the cutting mechanism comprises inserting a distal tip of a wire electrode into the first through-hole of the first magnetic implant, and displacing the distal tip axially from the first through-hole of the first magnetic implant to the second through-hole of the second magnetic implant.

87. The method of item 85 or 86, further comprising releasing the wire electrode from the first magnetic implant.

88. The method of item 69 or 75, wherein operating the cutting mechanism comprises providing an electric current to a wire electrode extending across the first through-hole, once the first and second magnetic implants are magnetically coupled.
89. The method of item 88, further comprising biasing the wire electrode toward the two adjacent walls in the cutting region.
90. The method of item 75, wherein magnetically coupling the first and second magnetic implants together comprises at least partially superposing a plurality of first through-holes and a plurality of second through-holes.
91. The method of item 90, further comprising operating the cutting mechanism within each through-hole of the plurality of first through-holes.
92. The method of item 91, wherein operating the cutting mechanism comprises operating a plurality of cutting mechanisms, each of the plurality of cutting mechanisms being operated within a respective one of the plurality of first through-holes.
93. A system for forming an anastomosis at a target site between two adjacent walls of a digestive tract, the system comprising:
a first magnetic implant comprising a first magnetic body having a first tissue-oriented surface and a first lumen-oriented surface, the first magnetic body defining a first through-hole extending between the first tissue-oriented surface and the first lumen-oriented surface;
a second magnetic implant comprising a second magnetic body having a second tissue-oriented surface and a second lumen-oriented surface, the second magnetic body defining a second through-hole extending between the second tissue-oriented surface and the second lumen-oriented surface;
the first and second magnetic implants being configured to magnetically couple to each other through the two adjacent walls of the digestive tract with the first and second through-holes being at least partially superposable to each other to compress an annular portion of the two adjacent walls therebetween during a healing time period; and
a compression device configured to compress an inwardly located portion of the two adjacent walls located inwardly from an inner periphery of the annular portion and comprising both layers of the two adjacent walls to cause ischemic pressure necrosis and form an initial anastomosis through the two adjacent walls during the healing time period.
94. The system of item 93, further comprising a carrying mechanism for transporting the compression device to the target site, the carrying mechanism being configured to expand the compression device for positioning around the inwardly located portion of the two adjacent walls.
95. The system of item 94, wherein the carrying mechanism comprises a suction tube connectable to a vacuum source to suction both layers of the two adjacent walls such that the inwardly located portion protrudes outwardly at least from the first tissue-oriented surface of the first magnetic implant.
96. The system of item 94 or 95, wherein the suction tube is configured to suction both layers of the two adjacent walls such that the inwardly located portion protrudes outwardly from the first lumen-oriented surface of the first magnetic implant.
97. The system of any one of items 93 to 96, wherein the first magnetic implant comprises an expansion mechanism configured to expand the compression device in an expanded configuration, the expansion mechanism being further configured to release the compression device from the expanded configuration to a compression configuration for compressing the inwardly located portion of the two adjacent walls.
98. The system of item 97, wherein the expansion mechanism is bioresorbable.
99. The system of any one of items 97 or 98, wherein the expansion mechanism is further configured to retain at least a portion of the compression device in a compression device recess defined in the first magnetic body.
100. The system of any one of items 93 to 99, wherein the second magnetic implant comprises a movable member configured to move both layers the two adjacent walls beyond the first tissue-oriented surface of the first magnetic implant.
101. The system of item 100, wherein the movable member is further configured to move both layers the two adjacent walls beyond the first lumen-oriented surface of the first magnetic implant.
102. The system of any one of items 93 to 101, wherein the compression device comprises an elastic member.
103. The system of item 102, wherein the elastic member is configured to radially compress the inwardly located portion.
104. The system of item 93, wherein the compression device comprises a compressive coiled member comprising a first loop and a second loop adjacent to the first loop, the first loop comprising a tissue piercing end configured to pierce through both layers of the two at the inwardly located portion.
105. The system of item 104, wherein the first loop is configured to extend beyond the second tissue-oriented surface of the second magnetic implant and the compressive coiled member is configured to compressingly receive the portion of the two adjacent walls between the first and second loops.
106. The system of any one of items 93 to 105, wherein the first magnetic implant comprises a first magnet and a first housing configured to receive the first magnet therein, the first magnet and the first housing together forming the first magnetic body.
107. The system of any one of items 93 to 106, wherein the second magnetic implant comprises a second magnet and a second housing configured to receive the second magnet therein, the second magnet and the second housing together defining the second magnetic body.
108. The system of any one of items 93 to 107, wherein the first and second magnets generate first and second magnetic fields, respectively, the first magnetic field being configured to interact with the second magnetic field to attract the first and second magnetic implants and magnetically couple the first and second magnetic implants.
109. A method for forming an anastomosis between two adjacent walls of a digestive tract of a patient, the method comprising:
delivering a first magnetic implant comprising a first through-hole into the digestive tract to a first location on one side of a desired anastomose site;
delivering a second magnetic implant comprising a second through-hole into the digestive tract to a second location on another side of the desired anastomose site;

magnetically coupling the first and second magnetic implants together through the two adjacent vessel walls of the digestive tract to at least partially superpose the first and second through-holes and to compress an annular portion of the two adjacent walls therebetween during a healing time period;

compressing an inwardly located portion of the two adjacent walls located inwardly from an inner periphery of the annular portion and comprising both layers of the two adjacent walls to cause ischemic pressure necrosis and form an initial anastomosis through the two adjacent walls during the healing time period.

110. The method of item 109, further comprising suctioning both layers of the two adjacent walls such that the inwardly located portion protrudes outwardly from a first tissue-oriented surface of the first magnetic implant.

111. The method of item 109 or 110, further comprising suctioning both layers of the two adjacent walls such that the inwardly located portion protrudes outwardly from a first lumen-oriented surface of the first magnetic implant.

112. The method of any one of items 109 to 111, further comprising expanding a compression device around the inwardly located portion of the two adjacent walls.

113. The method of any one of items 109 to 112, further comprising engaging the compression device with an expansion mechanism coupled to the first magnetic implant.

114. The method of item 112 or 113, wherein compressing the inwardly located portion of the two adjacent walls comprises releasing the compression device once the first and second magnetic implants are magnetically coupled.

115. The method of any one of items 112 to 114, wherein compressing the inwardly located portion of the two adjacent walls is performed radially.

116. The method of item 112, further comprising piercing the two adjacent walls by introducing a first end of the compression device beyond a second tissue-oriented surface of the second magnetic implant.

117. The method of item 116, wherein compressing the inwardly located portion of the two adjacent walls further comprises axially rotating the compression device to position a first loop of the compression device on a first side of the portion of the two adjacent walls and a second loop of the compression device on a second side of the portion of the two adjacent walls opposite the first side to compress the portion of the two adjacent walls.

118. The method of any one of items 1 to 4, wherein the cutting mechanism comprises a screw having an elongated screw body extending between a tissue-contacting end and a lumen-facing end, the tissue-contacting end defining the cutting edge.

119. The method of item 118, wherein the first magnetic body comprises a first sidewall defining the first through-hole, the first sidewall comprising sidewall threads and the screw comprises screw threads, the screw threads being configured to engage the sidewall threads of the first magnetic implant.

120. The method of item 119, wherein the screw is configured to translate axially within the first through-hole of the first magnetic implant upon engagement of the screw threads with the sidewall threads of the first magnetic implant when the screw is rotated about a longitudinal axis thereof to drive the screw from the non-cutting configuration to the cutting configuration.

121. The method of any one of items 118 to 120, wherein the screw comprises a screw bore extending between the tissue-contacting end and the lumen-facing end to enable the fluid communication through the two adjacent walls when the cutting mechanism is in the cutting configuration.

122. The method of any one of items 118 to 121, wherein the screw is configured to be transition from the non-cutting configuration to the cutting configuration endoscopically or laparoscopically.

123. A system for forming an anastomosis at a target site between two adjacent walls of a digestive tract, the system comprising:

first and second elongated magnetic implants, each comprising a magnetic body having a tissue-oriented surface and a lumen-oriented surface and defining a through-hole extending therebetween, the through-hole having a transverse through-hole width measured along a transverse axis of the magnetic body, the magnetic body comprising:

first and second end portions longitudinally spaced-apart from each other; and an intermediate portion fixedly extending between the first and second end portions, the intermediate portion comprising first and second arms partially defining the through-hole and each having a transverse arm width measured along the transverse axis of the magnetic body, the transverse arm width of each of the first and second arms being greater than the transverse trough-hole width;

the first and second elongated magnetic implants being configured to magnetically couple to each other through the two adjacent walls of the digestive tract with the respective through-holes being at least partially superposable to each other to compress an annular portion of the two adjacent walls therebetween.

124. The system of item 123, wherein the transverse trough-hole width of the through-hole is substantially constant along a longitudinal axis of the magnetic body.

125. The system of item 123, wherein the transverse arm width of the first and second arms is substantially constant along a longitudinal axis of the magnetic body.

126. The system of item 123 or 124, wherein each of the first and second arms includes an outer sidewall curved outwardly.

127. The system of any one of items 123 to 126, wherein a ratio between the transverse arm width of at least one of the first and second arms and the transverse through-hole width is at least 1.25:1.

128. The system of any one of items 123 to 126, wherein a ratio between the transverse arm width of at least one of the first and second arms and the transverse through-hole width is at least 1.5:1.

129. The system of any one of items 123 to 126, wherein a ratio between the transverse arm width of at least one of the first and second arms and the transverse through-hole width is at least 2:1.

130. The system of any one of items 123 to 129, wherein a surface area of the tissue-contacting surface is greater than a cross-sectional area of the through-hole measured on a plane being coplanar with the tissue-contacting surface.

131. The system of item 130, wherein the surface area of the tissue-contacting surface is at least 25% greater than the cross-sectional area of the through-hole.
132. The system of item 130, wherein the surface area of the tissue-contacting surface is at least 50% greater than the cross-sectional area of the through-hole.
133. The system of item 130, wherein the surface area of the tissue-contacting surface is at least 100% greater than the cross-sectional area of the through-hole.
134. The system of any one of items 123 to 133, wherein a longitudinal length of each of the first and second end portions is at least 50% of a through-hole length.
135. The system of any one of items 123 to 133, wherein a longitudinal length of each of the first and second end portions is at least 75% of a through-hole length.
136. The system of any one of items 123 to 133, wherein a longitudinal length of each of the first and second end portions is greater than a through-hole length.
137. The system of any one of items 123 to 136, wherein the through-hole of at least one of the first and second elongated magnetic implants is sized to receive a cutting tip of a surgical cutting instrument.
138. The system of item 137, wherein the through-hole is configured so that the cutting tip of the surgical cutting instrument travels along a chord extending across a cutting region located inwardly of an inner periphery of the annular portion.
139. The system of any one of items 123 to 137, wherein the through-hole is an elongated through-hole defined in a same orientation as the first and second elongated magnetic implants.
140. The system of any one of items 123 to 139, wherein the first and second elongated magnetic implants are configured to interlock with each other to increase a stability of the first and second elongated magnetic implants when magnetically coupled to each other.
141. The system of any one of items 123 to 140, wherein the intermediate portion is integral with the first and second end portions.
142. A system for forming an anastomosis at a target site between two adjacent walls of a digestive tract, the system comprising:
first and second electrically non-conductive magnetic implants, each comprising a magnetic body having a tissue-oriented surface and a lumen-oriented surface and defining a through-hole extending therebetween;
the first and second magnetic implants being configured to magnetically couple to each other through the two adjacent walls of the digestive tract with the respective through-holes being at least partially superposable to each other to compress an annular portion of the two adjacent walls therebetween.
143. The system of item 142, wherein the through-hole of at least one of the first and second electrically non-conductive magnetic implants is sized to receive a cutting tip of an electrosurgical cutting instrument, the first and second electrically non-conductive magnetic implants being electrically insulated from the cutting tip of the electrosurgical cutting instrument.
144. The system of item 142 or 143, wherein the through-hole of at least one of the first and second electrically non-conductive magnetic implants is sized to receive an active electrode and a return electrode of the electrosurgical cutting instrument operated as a bipolar electrosurgical cutting instrument.
145. The system of any one of items 142 to 144, wherein each of the first and second electrically non-conductive magnetic implants comprises a magnet and a housing configured to receive the magnet therein, the magnet and the housing together defining the magnetic body.
146. The system of item 145, wherein the housing is an electrically non-conductive housing configured to electrically insulate the magnet.
147. The system of item 145 or 146, wherein the electrically non-conductive housing comprises a polymer material.
148. The system of item 147, wherein the polymer material comprises one or more of polyvinylchloride (PVC), polyethylene (PE), polypropylene (PP), polytetrafluoroethylene (PTFE), polymethylmethacrylate (PMMA), trimethylcarbonate, and TMC NAD-lactide.
149. The system of item 147, wherein the polymer material comprises silicone.
150. The system of any one of items 142 to 146, wherein each of the first and second electrically non-conductive magnetic implants comprises an electrically non-conductive magnet.
151. The system of item 150, wherein the electrically non-conductive magnet comprises a ferrite magnet.
152. The system of item 151, wherein the ferrite magnet is made of one or more of strontium ferrite, barium ferrite, magnesium-zinc ferrite, nickel-zinc ferrite, and cobalt ferrite.
153. The system of any one of items 150 to 151, wherein the magnetic body further comprises a housing configured to receive the electrically non-conductive magnet therein, the electrically non-conductive magnet and the housing together defining the magnetic body.
154. A system for forming an anastomosis at a target site between two adjacent walls of a digestive tract, the system comprising:
first and second elongated magnetic implants, each comprising a magnetic body having a tissue-oriented surface and a lumen-oriented surface and defining a through-hole extending therebetween;
the first and second elongated magnetic implants being configured to magnetically couple to each other through the two adjacent walls of the digestive tract with the respective through-holes being at least partially superposable to each other to compress an annular portion of the two adjacent walls therebetween; and
an electrosurgical cutting instrument comprising a cutting tip couplable to an electrosurgical generator, the cutting tip being insertable within the through-hole of at least one of the first and second elongated magnetic implants and configured to cut through the two adjacent walls in a region located inwardly from an inner periphery of the annular portion once the first and second elongated magnetic implants are coupled at the target site to provide fluid communication therethrough.
155. The system of item 154, wherein the cutting of the electrosurgical cutting instrument is configured to receive an alternating electrical current with a continuous frequency of at least 100 KHz.
156. The system of item 155, wherein the cutting tip of the electrosurgical cutting instrument is configured to enable cellular vaporization of the two adjacent walls in the region located inwardly from the inner periphery of the annular portion when receiving the alternating electrical current to cut through the two adjacent walls.
157. The system of any one of items 154 to 156, wherein each of the first and second elongated magnetic implants is electrically non-conductive to electrically insulate the first and second elongated magnetic implants from the cutting tip of the electrosurgical cutting instrument.

158. The system of any one of items 154 to 157, wherein the electrosurgical surgical instrument is a bipolar electrosurgical instrument and the cutting tip of the bipolar electrosurgical instrument is a bipolar tip.

159. The system of item 158, wherein the bipolar tip comprises an active electrode and a return electrode.

160. The system of item 159, wherein the bipolar tip comprises electrosurgical forceps, the electrosurgical forceps comprising a first tine defining the active electrode, and a second tine defining the return electrode.

161. The system of any one of items 154 to 157, wherein the electrosurgical surgical instrument is a monopolar electrosurgical instrument.

162. The system of item 161, wherein the cutting tip of the electrosurgical cutting instrument is a tissue cutting electrode, the electrosurgical cutting instrument further comprising a dispersive electrode.

163. The system of item 162, wherein the tissue cutting electrode comprises a pointed distal tip.

164. The system of any one of items 160 to 163, wherein the through-hole is configured so that the cutting tip of the surgical cutting instrument travels along a chord extending across a cutting region located inwardly of an inner periphery of the annular portion.

165. The system of any one of items 154 to 164, further comprising a delivery system releasably connectable to an attachment feature of at least one of the first and second elongated magnetic implants, the electrosurgical cutting instrument being engageable with the delivery system.

166. The system of item 165, wherein the electrosurgical cutting instrument is couplable to the electrosurgical generator via the delivery system.

167. A method for forming an anastomosis between two adjacent walls of a digestive tract of a patient, the method comprising:
delivering a first magnetic elongated implant comprising a first through-hole into the digestive tract to a first location on one side of a desired anastomose site;
delivering a second elongated magnetic implant comprising a second through-hole into the digestive tract to a second location on another side of the desired anastomose site;
magnetically coupling the first and second elongated magnetic implants together through the two adjacent vessel walls of the digestive tract to at least partially superpose the first and second through-holes and to compress an annular portion of the two adjacent walls therebetween;
operating an electrosurgical cutting instrument comprising a cutting tip being insertable into a through-hole of at least one of the first and second elongated magnetic implants to cut though the two adjacent walls in a cutting region located inwardly from an inner periphery of the annular portion, once the first and second elongated magnetic implants are magnetically coupled, to provide fluid communication therethrough.

168. The method of item 167, wherein operating the electrosurgical cutting instrument comprises providing an alternating electric current with a continuous frequency of at least 100 kHz to the cutting tip of the electrosurgical cutting instrument.

169. The method of item 167 or 168, wherein operating the electrosurgical cutting instrument comprises cutting through the two adjacent walls along at least a portion of a chord extending across the cutting region.

170. The method of item 169, wherein operating the electrosurgical cutting instrument comprises translating the cutting tip along the at least a portion of the chord extending across the cutting region.

171. The method of item 169 or 170, wherein operating the electrosurgical cutting instrument further comprises displacing the cutting tip axially from the first through-hole of the first magnetic implant to the second through-hole of the second magnetic implant.

172. The method of any one of items 169 to 171, further comprising securing a dispersive electrode to the patient.

173. The method of item 167 or 168, wherein operating the electrosurgical cutting instrument comprises operating electrosurgical forceps of the cutting tip.

174. A system for forming an anastomosis at a target site between two adjacent walls of a digestive tract, the system comprising:
first and second magnetic implants, each comprising:
a magnet; and
a housing having a tissue-oriented surface and a lumen-oriented surface and being configured to receive the magnet therein, the magnet and the housing together defining a through-hole extending between the tissue-oriented surface and the lumen-oriented surface, the housing comprising:
first and second end portions longitudinally spaced-apart from each other; and
an intermediate portion extending between the first and second end portions;
wherein the housing has a thickness defined between the tissue-oriented surface and the lumen-oriented surface, the thickness of the housing being continuously reduced over the longitudinal extent of the first end portion moving away from the intermediate portion to enable self-alignment of the first and second magnetic implants;
the first and second magnetic implants being configured to magnetically couple to each other through the two adjacent walls of the digestive tract with the respective through-holes being at least partially superposable to each other to compress an annular portion of the two adjacent walls therebetween.

175. The system of item 174, wherein the first and second magnetic implants are elongated magnetic implants.

176. The system of item 175, wherein the through-hole is an elongated through-hole defined in a same orientation as the first and second elongated magnetic implants.

177. The system of any one of items 174 to 176, wherein the thickness of the housing is continuously reduced over the longitudinal extent of the second end portion moving away from the intermediate portion.

178. The system of any one of items 174 to 177, wherein the thickness of the housing is reduced by having the tissue-oriented surface converging toward the lumen-oriented surface.

179. The system of any one of items 174 to 178, wherein the thickness of the housing is reduced by having the tissue-oriented surface and the lumen-oriented surface of the first end portion converging toward each other, such that the first end portion forms a truncated triangle.
180. The system of any one of items 174 to 179, wherein the thickness of the housing is reduced by having the tissue-oriented surface and the lumen-oriented surface of the second end portion converging toward each other, such that the second end portion forms a truncated triangle.
181. The system of any one of items 174 to 180, wherein the self-alignment of the first and second implants is a longitudinal self-alignment.
182. The system of any one of items 174 to 181, wherein a thickness reduction factor over the longitudinal extent ranges between about 80% and about 90%.
183. The system of any one of items 174 to 181, wherein a thickness reduction factor over the longitudinal extent ranges between about 70% and about 80%.
184. The system of any one of items 174 to 181, wherein a thickness reduction factor over the longitudinal extent ranges between about 50% and about 60%.
185. The system of any one of items 174 to 184, wherein the longitudinal extent of each of the first and second end portions is at least 50% of an intermediate portion length.
186. The system of any one of items 174 to 184, wherein the longitudinal extent of each of the first and second end portions is at least 75% of an intermediate portion length.
187. The system of any one of items 174 to 184, wherein the longitudinal extent of each of the first and second end portions is greater than an intermediate portion length.
188. The system of any one of items 174 to 187, wherein the thickness of the intermediate portion is substantially constant.
189. The system of any one of items 174 to 188, wherein the intermediate portion includes a peripheral sidewall curved outwardly.
190. The system of any one of items 174 to 189, wherein the magnet is shaped as a rectangular prism contained within the intermediate portion.
191. A system for forming an anastomosis at a target site between two adjacent walls of a digestive tract, the system comprising:
  first and second magnetic implants, each comprising:
    a magnet having a tissue-oriented surface and a lumen-oriented surface, the magnet comprising:
      first and second end portions longitudinally spaced-apart from each other; and
      an intermediate portion extending between the first and second end portions, the intermediate portion defining a through-hole extending between the tissue-oriented surface and the lumen-oriented surface;
    wherein the magnet has a thickness defined between the tissue-oriented surface and the lumen-oriented surface, the thickness of the magnet being continuously reduced over the longitudinal extent of the first end portion moving away from the intermediate portion to enable self-alignment of the first and second magnetic implants;
  the first and second magnetic implants being configured to magnetically couple to each other through the two adjacent walls of the digestive tract with the respective through-holes being at least partially superposable to each other to compress an annular portion of the two adjacent walls therebetween.
192. The system of item 191, wherein the first and second magnetic implants are elongated magnetic implants.
193. The system of item 192, wherein the through-hole is an elongated through-hole defined in a same orientation as the first and second elongated magnetic implants.
194. The system of any one of items 191 to 193, wherein the thickness of the magnet is continuously reduced over the longitudinal extent of the second end portion moving away from the intermediate portion.
195. The system of any one of items 191 to 194, wherein the thickness of the magnet is reduced by having the tissue-oriented surface converging toward the lumen-oriented surface.
196. The system of any one of items 191 to 195, wherein the thickness of the magnet is reduced by having the tissue-oriented surface and the lumen-oriented surface of the first end portion converging toward each other, such that the first end portion forms a truncated triangle.
197. The system of any one of items 191 to 196, wherein the thickness of the magnet is reduced by having the tissue-oriented surface and the lumen-oriented surface of the second end portion converging toward each other, such that the second end portion forms a truncated triangle.
198. The system of any one of items 191 to 197, wherein the self-alignment of the first and second implants is a longitudinal self-alignment.
199. The system of any one of items 191 to 198, wherein at least one of the first and second magnetic implants further comprises a housing enclosing the magnet.
200. The system of item 199, wherein the housing is shaped as a rectangular prism with atraumatic edges.
201. The system of item 199, wherein the housing adopts a shape of the magnet.
202. The system of any one of items 191 to 201, wherein a thickness reduction factor over the longitudinal extent ranges between about 80% and about 90%.
203. The system of any one of items 191 to 201, wherein a thickness reduction factor over the longitudinal extent ranges between about 70% and about 80%.
204. The system of any one of items 191 to 201, wherein a thickness reduction factor over the longitudinal extent ranges between about 50% and about 60%.
205. The system of any one of items 191 to 204, wherein the longitudinal extent of each of the first and second end portions is at least 50% of an intermediate portion length.
206. The system of any one of items 191 to 204, wherein the longitudinal extent of each of the first and second end portions is at least 75% of an intermediate portion length.
207. The system of any one of items 191 to 204, wherein the longitudinal extent of each of the first and second end portions is greater than an intermediate portion length.
208. The system of any one of items 191 to 207, wherein the thickness of the intermediate portion is substantially constant.
209. The system of any one of items 191 to 208, wherein the intermediate portion includes a peripheral sidewall curved outwardly.
210. A system for forming an anastomosis at a target site between two adjacent walls of a digestive tract, the system comprising:

first and second magnetic implants each configured to selectively adopt a delivery configuration and an anastomosis configuration, the first and second magnetic implants each comprising:
   a magnetic body having a tissue-oriented surface and a lumen-oriented surface, the magnetic body comprising:
     first and second subdivisions;
     a hinge engaging the first and second subdivisions together and enabling the first and second subdivisions to be folded onto one another or unfolded, wherein when the first and second subdivisions are unfolded, the first and second subdivisions define a though-hole extending between the tissue-oriented surface and the lumen-oriented surface;
   the first and second magnetic implants being configured to be delivered to the target site in the delivery configuration when the first and second subdivisions are folded onto one another, and subsequently be unfolded to the anastomosis configuration in order to magnetically couple to each other through the two adjacent walls of the digestive tract with the respective through-holes being at least partially superposable to each other to compress an annular portion of the two adjacent walls therebetween.

211. The system of item 210, wherein each of the first and second subdivisions comprises a magnet element that is axially magnetized thereby providing opposite magnetic poles proximate the tissue-oriented surface and the lumen-oriented surface, respectively.

212. The system of item 211, wherein the magnet element of each of the first and second subdivisions comprises a same magnetic pole distribution such that, when the magnetic body is in the delivery configuration, the magnet element of the first subdivision being configured to be magnetically repelled by the magnet element of the second subdivision.

213. The system of item 212, wherein when the magnetic body is in the anastomosis configuration, the magnet element of the first subdivision and the magnet element of the second subdivision together result in a common magnet that is axially magnetized.

214. The system of any one of items 210 to 213, wherein each of the first and second magnetic implants further comprises a closure feature enabling the first and second subdivisions to remain folded onto one another in the delivery configuration.

215. The system of item 214, wherein, when the magnetic body is in the delivery configuration, the hinge is configured to resiliently bias the magnetic body into the anastomosis configuration.

216. The system of item 214 or 215, wherein at least one of the first and second magnetic implants further comprises an attachment feature releasably engageable with a delivery system configured to deliver the at least one of the first and second magnetic implants at the target site in the delivery configuration and to release the closure feature for the at least one of the first and second magnetic implants to adopt the anastomosis configuration.

217. The system of any one of items 210 to 216, wherein, when the magnetic body is in the delivery configuration, the tissue-oriented surface is folded onto itself.

218. The system of any one of items 210 to 217, wherein the magnetic body is an elongated magnetic body comprising first and second end portions longitudinally spaced-apart from each other, the hinge being provided in a central region of the first and second end portions.

219. The system of item 218, wherein the hinge defines a pivot axis collinear with a longitudinal axis of the magnetic body.

220. The system of any one of items 210 to 219, wherein at least one of the first and second subdivisions is a C-shaped subdivision, an inner periphery of the C-shaped subdivision partially defining the through-hole.

221. A system for forming an anastomosis at a target site between two adjacent walls of a digestive tract, the system comprising:
   a first magnetic implant comprising a first magnetic body having a first tissue-oriented surface and a first lumen-oriented surface, the first magnetic body defining a first through-hole extending between the first tissue-oriented surface and the first lumen-oriented surface, the first magnetic implant comprising:
     a first unitary magnet having a first multipole structure with magnetic poles provided according to a first pre-determined spatial arrangement to define a first resulting magnetic field;
   a second magnetic implant comprising a second magnetic body having a second tissue-oriented surface and a second lumen-oriented surface, the second magnetic body defining a second through-hole extending between the second tissue-oriented surface and the second lumen-oriented surface, the second magnetic implant comprising:
     a second unitary magnet having a second multipole structure with magnetic poles provided according to a second pre-determined spatial arrangement to define a second resulting magnetic field;
   the first and second magnetic implants being configured to self-align with each other in accordance with the first and second resulting magnetic fields and magnetically couple through the two adjacent walls of the digestive tract to at least partially superpose the first and second through-holes and compress an annular portion of the two adjacent walls therebetween.

222. The system of item 221, wherein the first unitary magnet comprises discrete magnet elements each having a given magnetic pole distribution to achieve the first pre-determined spatial arrangement of magnetic poles.

223. The system of item 222, wherein the discrete magnet elements are permanent magnets.

224. The system of item 221, wherein the first unitary magnet comprises a coded magnet having magnet zones that are individually magnetised to achieve the first pre-determined spatial arrangement of magnetic poles.

225. The system of any one of items 221 to 224, wherein at least one of the first magnetic implant and the second magnetic implant is configured to maintain a same configuration during delivery and once implanted at the target site.

The invention claimed is:

1. A system for forming an anastomosis at a target site between two adjacent walls of a digestive tract, the system comprising:
   first and second elongated magnetic implants, each comprising a magnetic body having a tissue-oriented surface and a lumen-oriented surface and defining a through-hole extending therebetween, the through-hole having a transverse through-hole width measured along a transverse axis of the magnetic body, the magnetic body comprising:

first and second end portions longitudinally spaced-apart from each other; and an intermediate portion fixedly extending between the first and second end portions, the intermediate portion comprising first and second arms at least partially defining the through-hole and each having a transverse arm width measured along the transverse axis of the magnetic body, the transverse arm width of each of the first and second arms being greater than the transverse through-hole width;

the first and second elongated magnetic implants being configured to magnetically couple to each other through the two adjacent walls of the digestive tract with the respective through-holes being at least partially superposable to each other to compress an annular portion of the two adjacent walls therebetween.

2. The system of claim 1, wherein the transverse trough-hole width of the through-hole is substantially constant along a longitudinal axis of the magnetic body.

3. The system of claim 1, wherein the transverse arm width of the first and second arms is substantially constant along a longitudinal axis of the magnetic body.

4. The system of claim 1, wherein each of the first and second arms includes an outer sidewall curved outwardly.

5. The system of claim 1, wherein a surface area of the tissue-contacting surface is greater than a cross-sectional area of the through-hole measured on a plane being coplanar with the tissue-contacting surface.

6. The system of claim 1, wherein the through-hole of at least one of the first and second elongated magnetic implants is sized to receive a cutting tip of a surgical cutting instrument.

7. The system of claim 6, wherein the through-hole is configured so that the cutting tip of the surgical cutting instrument travels along a chord extending across a cutting region located inwardly of an inner periphery of the annular portion.

8. The system of claim 1, wherein the through-hole is an elongated through-hole defined in a same orientation as the first and second elongated magnetic implants.

9. The system of claim 1, wherein the first and second elongated magnetic implants are configured to interlock with each other to increase a stability of the first and second elongated magnetic implants when magnetically coupled to each other.

10. The system of claim 1, wherein the intermediate portion is integral with the first and second end portions.

11. The system of claim 1, wherein a longitudinal length of each of the first and second end portions is greater than a through-hole length.

12. A system for forming an anastomosis at a target site between two adjacent walls of a digestive tract, the system comprising:

first and second magnetic implants, each comprising:

a magnet having a compression surface and a lumen-oriented surface opposite the compression surface, the magnet comprising:

first and second end portions longitudinally spaced-apart from each other; and an intermediate portion fixedly extending between the first and second end portions, the intermediate portion defining a through-hole extending between the compression surface and the lumen-oriented surface;

wherein the magnet has a thickness defined between the compression surface and the lumen-oriented surface, the thickness of the magnet being continuously reduced over the longitudinal extent of the first end portion moving away from the intermediate portion to enable self-alignment of the first and second magnetic implants;

the first and second magnetic implants being configured to magnetically couple to each other through the two adjacent walls of the digestive tract with the respective through-holes being at least partially superposable to each other to compress an annular portion of the two adjacent walls therebetween.

13. The system of claim 12, wherein the first and second magnetic implants are elongated magnetic implants.

14. The system of claim 13, wherein the through-hole is an elongated through-hole defined in a same orientation as the first and second elongated magnetic implants.

15. The system of claim 12, wherein the thickness of the magnet is continuously reduced over the longitudinal extent of the second end portion moving away from the intermediate portion.

16. The system of claim 12, wherein the thickness of the magnet is reduced by having the compression surface converging toward the lumen-oriented surface.

17. The system of claim 12, wherein the thickness of the magnet is reduced by having the compression surface and the lumen-oriented surface of the first end portion converging toward each other, such that the first end portion forms a truncated triangle.

18. The system of claim 12, wherein at least one of the first and second magnetic implants further comprises a housing enclosing the magnet.

19. The system of claim 18, wherein the housing is shaped as a rectangular prism with atraumatic edges.

20. The system of claim 18, wherein the housing adopts a shape of the magnet.

21. The system of claim 12, wherein the thickness of the intermediate portion is substantially constant.

22. The system of claim 12, wherein the intermediate portion includes a peripheral sidewall curved outwardly.

23. The system of claim 12, wherein the self-alignment of the first and second implants is a longitudinal self-alignment.

24. The system of claim 11, wherein the longitudinal extent of each of the first and second end portions is greater than an intermediate portion length.

* * * * *